(12) United States Patent  
Shibutani et al.

(10) Patent No.: US 10,658,650 B2  
(45) Date of Patent: May 19, 2020

(54) SECONDARY BATTERY

(71) Applicant: MURATA MANUFACTURING CO., LTD., Kyoto (JP)

(72) Inventors: Koji Shibutani, Fukushima (JP); Takaaki Matsui, Fukushima (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 134 days.

(21) Appl. No.: 15/753,457

(22) PCT Filed: Jul. 14, 2016

(86) PCT No.: PCT/JP2016/070863  
§ 371 (c)(1),  
(2) Date: Feb. 19, 2018

(87) PCT Pub. No.: WO2017/043178  
PCT Pub. Date: Mar. 16, 2017

(65) Prior Publication Data  
US 2018/0241026 A1    Aug. 23, 2018

(30) Foreign Application Priority Data

Sep. 9, 2015 (JP) .................................. 2015-177271

(51) Int. Cl.  
*H01M 2/34* (2006.01)  
*H01M 2/02* (2006.01)  
(Continued)

(52) U.S. Cl.  
CPC ............. *H01M 2/34* (2013.01); *H01M 10/04* (2013.01); *H01M 10/0468* (2013.01);  
(Continued)

(58) Field of Classification Search  
CPC ............ H01M 2/02; H01M 2/12; H01M 2/34; H01M 10/04; H01M 10/0587  
See application file for complete search history.

(56) References Cited

U.S. PATENT DOCUMENTS

2006/0046137 A1    3/2006  Kodama  
2010/0035144 A1    2/2010  Oh et al.  
(Continued)

FOREIGN PATENT DOCUMENTS

CN         1744346 A     3/2006  
CN       101615694 A    12/2009  
(Continued)

OTHER PUBLICATIONS

International Search Report and Written Opinion of PCT Application No. PCT/JP2016/070863, dated Oct. 18, 2016, 09 pages.

(Continued)

*Primary Examiner* — Kenneth J Douyette  
(74) *Attorney, Agent, or Firm* — Chip Law Group

(57) ABSTRACT

A secondary battery includes at least: a laminated electrode body 20 in which an electrode member 21 and a separator 26 are laminated, in which a suppressing member 31A suppressing a movement of the separator 26 with respect to the electrode member 21 is disposed between a portion 21A of the electrode member 21 and a portion of the separator 26, in an uneven portion 27A existing in the laminated electrode body 20.

15 Claims, 8 Drawing Sheets

(51) Int. Cl.
   *H01M 10/04*     (2006.01)
   *H01M 10/0587*   (2010.01)
   *H01M 10/05*     (2010.01)
   *H01M 10/058*    (2010.01)
   *H01M 10/0585*   (2010.01)

(52) U.S. Cl.
   CPC ......... *H01M 10/05* (2013.01); *H01M 10/058* (2013.01); *H01M 10/0585* (2013.01); *H01M 10/0587* (2013.01)

(56) References Cited

U.S. PATENT DOCUMENTS

| | | |
|---|---|---|
| 2012/0034513 A1 | 2/2012 | Kim |
| 2012/0270036 A1* | 10/2012 | Kiuchi .................. C09J 133/066 428/336 |
| 2013/0260203 A1 | 10/2013 | Yoshida et al. |

FOREIGN PATENT DOCUMENTS

| | | |
|---|---|---|
| CN | 102376974 A | 3/2012 |
| EP | 2139057 A1 | 12/2009 |
| EP | 2416406 A1 | 2/2012 |
| JP | 2000-323128 A | 11/2000 |
| JP | 2006-073243 A | 3/2006 |
| JP | 2010-003697 A | 1/2010 |
| JP | 2010-073580 A | 4/2010 |
| JP | 2011-181441 A | 9/2011 |
| JP | 2011-243553 A | 12/2011 |
| JP | 2012-038705 A | 2/2012 |
| JP | 2014-143051 A | 8/2014 |
| JP | 2015-088253 A | 5/2015 |
| KR | 10-2006-0053888 A | 5/2006 |
| KR | 10-2009-0132925 A | 12/2009 |
| KR | 10-2012-0013877 A | 2/2012 |
| WO | 2012/090726 A1 | 7/2012 |

OTHER PUBLICATIONS

Office Action for JP Patent Application No. 2017-538898, dated Apr. 9, 2019, 03 pages of Office Action and 4 pages of English Translation.

* cited by examiner

SECONDARY BATTERY

CROSS REFERENCE TO RELATED APPLICATIONS

This application is a U.S. National Phase of International Patent Application No. PCT/JP2016/070863 filed on Jul. 14, 2016, which claims priority benefit of Japanese Patent Application No. JP 2015-177271 filed in the Japan Patent Office on Sep. 9, 2015. Each of the above-referenced applications is hereby incorporated herein by reference in its entirety.

TECHNICAL FIELD

The present disclosure relates to a secondary battery.

BACKGROUND ART

A secondary battery, for example, includes a laminated electrode body in which an electrode member and a separator are laminated, a lead portion attached to the electrode member, an electrolytic solution, and a battery can. Then, a strip-like laminated electrode body is stored in the battery can in a wound state. Specifically, in the laminated electrode body, for example, a strip-like positive electrode member in which a positive electrode active material layer is formed on a positive electrode current collector, and a strip-like negative electrode member in which a negative electrode active material layer is formed on a negative electrode current collector, are laminated through the separator. The lead portion includes a positive electrode lead portion attached to the positive electrode current collector and a negative electrode lead portion attached to the negative electrode current collector. In general, the thickness of the lead portion is greater than the thickness of the positive electrode active material layer or the negative electrode active material layer. Accordingly, convexities and concavities are generated in a portion of the laminated electrode body in which the lead portion is disposed. In addition, a configuration or a structure of an end portion of the laminated electrode body is frequently different from that of a portion of the laminated electrode body other than the end portion, and thus, convexities and concavities are generated even in the end portion of the laminated electrode body. Furthermore, the portion of the laminated electrode body will be referred to as an "uneven portion". Then, the cohesion of the separator with respect to the electrode member in the uneven portion is frequently insufficient compared to the cohesion of the separator with respect to the electrode member in the portion other than the uneven portion.

In a case where a short circuit or the like occurs in an external circuit to which the secondary battery is connected, and a large current flows into the secondary battery, an internal temperature of the secondary battery increases. As a result thereof, the separator contracts, and the separator does not partially exist between the positive electrode member and the negative electrode member, and thus, there is a concern that a short circuit occurs between the positive electrode member and the negative electrode member.

CITATION LIST

Patent Document

Patent Document 1: Japanese Patent Application Laid-Open No. 2011-243553

Patent Document 2: Japanese Patent Application Laid-Open No. 2011-181441

SUMMARY OF THE INVENTION

Problems to be Solved by the Invention

A secondary battery preventing an electrode assembly from being moved in a case is known from Japanese Patent Application Laid-Open No. 2011-243553. The secondary battery includes the electrode assembly, an electrolytic solution, a movement preventing tape attached to at least a part of an external surface of the electrode assembly, and the case containing the electrode assembly, the movement preventing tape includes a base material layer of which at least a part exhibits pressure-sensitive adhesiveness in a case of being in contact with the electrolytic solution, and at least a part of the base material layer exhibiting the pressure-sensitive adhesiveness, is in contact with the internal surface of the case. In addition, a cylindrical non-aqueous electrolyte battery having a backlash preventing effect of a wound electrode body and a fixing effect in a battery can is known from Japanese Patent Application Laid-Open No. 2011-181441. In such a cylindrical non-aqueous electrolyte battery, an adhesive member is disposed to cover a wound terminal portion of a laminated electrode body positioned on a wound outer circumference side of the wound electrode body. However, in such Patent Documents, a technology of preventing the movement of the separator with respect to the electrode member is not mentioned at all.

Accordingly, an object of the present disclosure is to provide a secondary battery having a configuration and a structure in which a movement of a separator with respect to an electrode member can be prevented.

Solutions to Problems

A secondary battery of the present disclosure to achieve the object includes at least: a laminated electrode body in which an electrode member and a separator are laminated, in which a suppressing member suppressing a movement of the separator with respect to the electrode member is disposed between a portion of the electrode member and a portion of the separator, in an uneven portion existing in the laminated electrode body.

Effects of the Invention

According to the secondary battery of the present disclosure, the suppressing member suppressing the movement of the separator with respect to the electrode member is disposed between the portion of the electrode member and the portion of the separator, in the uneven portion (a asymmetric portion or region of the laminated electrode body in a thickness direction) which exists in the laminated electrode body, and is insufficient for the cohesion of the separator with respect to the electrode member, and thus, even in a case where an internal temperature of the secondary battery increases, the separator is prevented from being in contract with the secondary battery, and as a result thereof, it is possible to provide a secondary battery having high reliability. Furthermore, the effect described herein is merely an example, is not intended to be limited, and may include an additional effect.

MODE FOR CARRYING OUT THE INVENTION

Figure 1A:
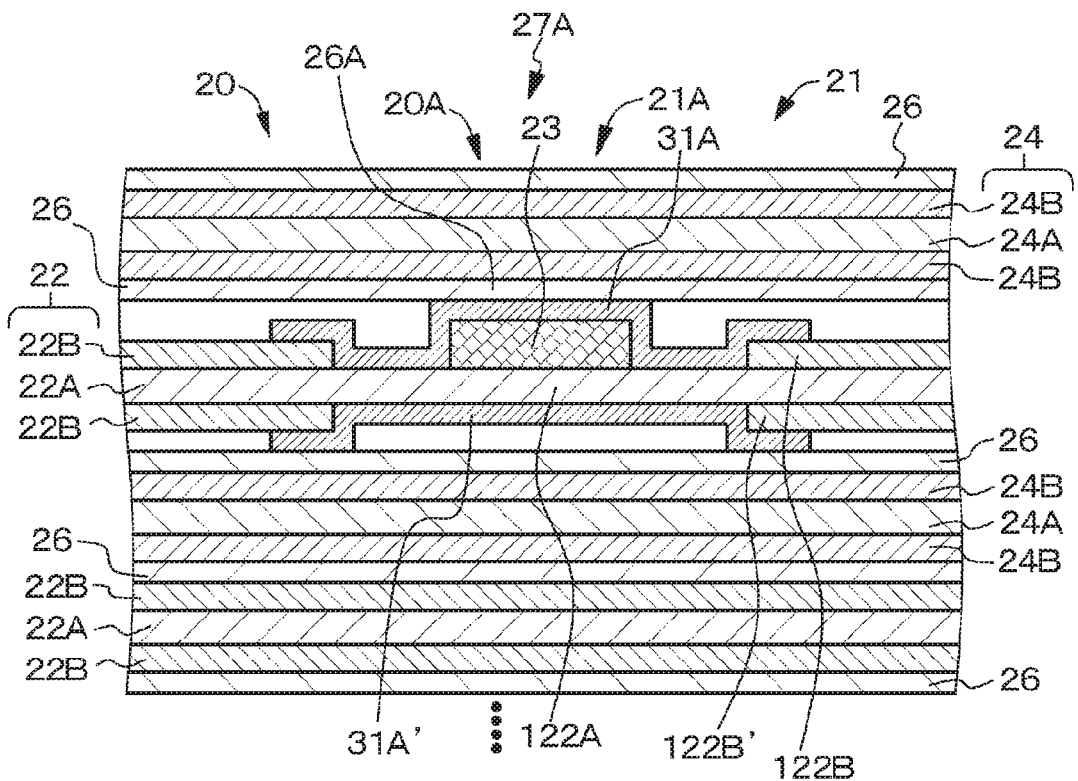
FIG. 1A and FIG. 1B are respectively a schematic partial sectional view of a laminated electrode body along a longitudinal direction in which an electrode member and a separator configuring a secondary battery of Example 1 are laminated and a diagram schematically illustrating arrangement of a suppressing member and the like, and FIG. 1C is a schematic partial sectional view of the suppressing member.

Hereinafter, the present disclosure will be described on the basis of examples with reference to the drawing, but the present disclosure is not limited to the examples, and various numerical values or materials in the examples are an example. Furthermore, the present disclosure will be described in the following order.

1. Secondary Battery of Present Disclosure, and General Description
2. Example 1 (Secondary Battery of Present Disclosure)
3. Example 2 (Modification of Example 1)
4. Example 3 (Application Example of Secondary Battery of Example 1 and Example 2)
5. Others <Secondary Battery of Present Disclosure, and General Description>

In a secondary battery of the present disclosure, it is possible to set an aspect in which a suppressing member includes a tape-like base material, and an adhesive layer disposed on one surface of the base material, and the suppressing member adheres to a laminated electrode body through the adhesive layer. The base material can be set to a material layer of a single layer, and can be set to have a configuration in which a plurality of material layers are laminated (for example, bonded). Then, in this case, the secondary battery further includes an electrolytic solution, and thus, it is possible to set an aspect in which the other surface of the base material exhibits pressure-sensitive adhesiveness (adhesiveness) by being in contact with the electrolytic solution, and the other surface of the base material pressure-sensitively adheres (adheres) to a separator, or to set an aspect in which the other surface of the base material swells by being in contact with the electrolytic solution, and the other surface of the base material coheres to the separator.

In the secondary battery of the present disclosure including various preferred aspects described above, it is possible to set an embodiment in which the secondary battery further includes a laminated electrode body storage member, the strip-like laminated electrode body is stored in the laminated electrode body storage member in a wound state. Then, in this case, it is possible to set an embodiment in which an outer shape of the laminated electrode body storage member is a cylindrical shape or a square shape (a planar shape). Further, in this case, it is possible to set a configuration in which an end portion of the laminated electrode body is included in an uneven portion. Alternatively, the secondary battery can be a laminated (a laminated film type) secondary battery.

Further, in the secondary battery of the present disclosure including various preferred aspects and embodiments described above, it is possible to set an embodiment in which the secondary battery further includes a lead portion attached to the laminated electrode body, the lead portion is included in the uneven portion, and the suppressing member is disposed between a portion of the electrode member and the lead portion, and a portion of the separator, in the uneven portion.

Alternatively, in the secondary battery of the present disclosure including various preferred aspects and embodiments described above, it is possible to set an embodiment in which the secondary battery further includes a lead portion attached to the laminated electrode body, and the uneven portion is positioned in the vicinity of the portion of the electrode member to which the lead portion is attached.

Further, in the secondary battery of the present disclosure including various preferred aspects and embodiments described above, it is possible to set an embodiment in which the secondary battery further includes a lead portion attached to the laminated electrode body, and the lead portion includes a positive electrode lead portion attached to a positive electrode current collector and a negative electrode lead portion attached to a negative electrode current collector.

Further, in the secondary battery of the present disclosure including various preferred aspects and embodiments described above, it is possible to set an embodiment in which in the laminated electrode body, a positive electrode member in which a positive electrode active material layer is formed on the positive electrode current collector, and a negative electrode member in which a negative electrode active material layer is formed on the negative electrode current collector, are laminated through the separator.

Alternatively, in the secondary battery of the present disclosure including various preferred aspects described above, it is possible to set an aspect in which in the laminated electrode body, the positive electrode member in which the positive electrode active material layer is formed on the positive electrode current collector, and the negative electrode member in which the negative electrode active material layer is formed on the negative electrode current collector, are laminated through the separator, the laminated electrode body further includes the lead portion including the positive electrode lead portion attached to the positive electrode current collector and the negative electrode lead portion attached to the negative electrode current collector, and the laminated electrode body storage member, the laminated electrode body is stored in the laminated electrode body storage member in the wound state, the positive electrode lead portion is attached to a portion of the positive electrode current collector positioned by being separated from an end portion of the positive electrode member, and the suppressing member is disposed between the positive electrode lead portion, the portion of the positive electrode current collector positioned in the vicinity of the positive electrode lead portion, and a portion of the positive electrode active material layer adjacent to the portion of the positive electrode current collector positioned in the vicinity of the positive electrode lead portion, and the separator.

Alternatively, in the secondary battery of the present disclosure including various preferred aspects described above, it is possible to set an aspect in which in the laminated electrode body, the positive electrode member in which the positive electrode active material layer is formed on the positive electrode current collector, and the negative electrode member in which the negative electrode active material layer is formed on the negative electrode current collector, are laminated through the separator, the laminated electrode body further includes the lead portion including the positive electrode lead portion attached to the positive electrode current collector and the negative electrode lead portion attached to the negative electrode current collector, and the laminated electrode body storage member, the laminated electrode body is stored in the laminated electrode body storage member in the wound state, the end portion of the laminated electrode body includes an end portion of the negative electrode current collector, and when a direction separated from the end portion of the laminated electrode body is set to an inside direction, an end portion of the negative electrode active material layer is disposed by being separated from the end portion of the negative electrode current collector in the inside direction, an end portion of the positive electrode active material layer and an end portion of the positive electrode current collector are disposed by being separated from the end portion of the negative electrode active material layer in the inside direction, the negative electrode lead portion is attached in the vicinity of the end portion of the negative electrode current collector, and the suppressing member is disposed between a region between the negative electrode lead portion and the end portion of the negative electrode active material layer, and the separator.

The laminated electrode body may be in a stacked state in addition to being in the wound state.

The secondary battery includes a lithium ion battery, or for example, includes a magnesium ion battery, a metal air secondary battery including a negative electrode containing a negative electrode active material such as a metal and an alloy material (for example, an alkali metal such as lithium, sodium, and potassium; a second group element such as magnesium and calcium; a thirteenth group element such as aluminum; a transition metal such as zinc and iron; or an alloy material or a compound containing such metals can be exemplified as the metal and the alloy material which can be used in the negative electrode active material), a lithium-sulfur secondary battery, a sodium-sulfur secondary battery, a sodium-nickel chloride secondary battery, a sodium ion secondary battery, a polyvalent cation secondary battery, various organic secondary batteries, and a nickel-hydrogen secondary battery.

In the secondary battery of the present disclosure including various preferred aspects, embodiments, and configurations described above (hereinafter, for convenience, collectively referred to as "the secondary battery or the like of the present disclosure"), examples of the base material exhibiting the pressure-sensitive adhesiveness by being in contact with the electrolytic solution are capable of including various plastic films such as a polystyrene (PS) film containing oriented polystyrene (OPS), a polyamide film, a polyacrylonitrile film, a polyvinyl alcohol film, a polycarbonate film, and a polyethylene vinyl acetate film. Then, in this case, the thickness of the base material can be 10 μm to 50 μm. In addition, examples of a material used in the adhesive layer are capable of including an acrylic resin, specifically, a polymethyl methacrylate (PMMA) resin, a polyethyl methacrylate (PEMA) resin, and a polybutyl methacrylate (PBMA) resin. Then, in this case, 1 μm to 30 μm can be exemplified as the thickness of the adhesive layer.

In addition, examples of the base material swelling by being in contact with the electrolytic solution are capable of including a base material formed by mixing resin material having high swelling properties (hereinafter, referred to as a "highly swellable resin material") and a resin material having a high melting point (hereinafter, referred to as a "high-melting-point resin material") together. It is desirable that a swelling degree of the highly swellable resin material is greater than or equal to 5%, and preferably greater than or equal to 11%, with respect to propylene carbonate (PC). Furthermore, the swelling degree is measured on the basis of JIS K 6258-2003. Specifically, a mass change rate in a case of immersing a material piece of the base material having a diameter of 20 mm under a condition where an immersion solvent is propylene carbonate (PC), an immersion temperature is 45° C., and immersion time is 24 hours, is set to the swelling degree. By using a material having such a swelling degree, the base material absorbs the electrolytic solution and swells to the extent of sufficiently filling a gap between the portion of the electrode member and the portion of the separator in the uneven portion. It is preferable that a melting point of the high-melting-point resin material is higher than or equal to 60° C. By using a material having such a melting point, it is possible to prevent the base material from being softened and melted when an internal temperature of the secondary battery increases. It is preferable that the highly swellable resin material and the high-melting-point resin material further have resistance (corrosion resistance or the like) with respect the electrolytic solution.

A polymer compound having a polar group such as a halogen group, or an ester group and a carboxy group can be used as the highly swellable resin material. Among them, in particular, a fluorine-based resin material is preferable, and examples of such a material are capable of including at least one type of material selected from the group consisting of a copolymer containing polyvinylidene fluoride and vinylidene fluoride as a main component, polybutadiene, polyisoprene, a tetrafluoroethylene-ethylene copolymer (ETFE), a tetrafluoroethylene-hexafluoropropylene copolymer (EPE), a tetrafluoroethylene-perfluoroalkyl vinyl ether copolymer (PEA), a tetrafluoroethylene-hexafluoropropylene copolymer (FEP), a tetrafluoroethylene-hexafluoropropylene-vinylidene fluoride ternary copolymer (THV), and the like.

A polymer substance having a hydrophobic non-polar group, and a polar group such as an ester group or a carboxy group can be used as the high-melting-point resin material. Examples of such a material are capable of including one type of material selected from the group consisting of polyethylene (PE), polypropylene (PP), polyimide (PI), polytetrafluoroethylene (PTFE), polyethylene terephthalate (PET), polybutylene terephthalate (PBT), acrylic rubber (ACM), and the like.

The highly swellable resin material and the high-melting-point resin material are used by being mixed together. It is preferable that a mixing ratio of the highly swellable resin material to the high-melting-point resin material is in a range of 10:90 to 97:3 at a mass ratio. In a case where the mixing ratio of the highly swellable resin material is less than the range, there is a concern that the base material does not sufficiently swell. In addition, in a case where the mixing ratio of the high-melting-point resin material is less than the range, there is a concern that it is not possible to sufficiently prevent the separator from being in contract with the secondary battery when the internal temperature of the secondary battery increases. In general, the thickness of the base material may be a thickness which can be used in the secondary battery, and for example, can be greater than or equal to 1 µm. In a case where the base material is excessively thin, there is a concern that it is not possible to ensure a necessary strength as the suppressing member.

It is preferable that the adhesive layer configuring the suppressing member swelling by being in contact with the electrolytic solution has excellent adhesiveness with respect to each of the base material and the separator, and has electrolyte resistance. Examples of the adhesive layer are capable of including an acrylic adhesive agent such as an acrylate ester copolymer, a rubber-based adhesive agent such as natural rubber, a silicone-based adhesive agent such as silicone rubber, an urethane-based adhesive agent such as an urethane resin, an α-olefin-based adhesive agent, an ether-based adhesive agent, an ethylene-vinyl acetate resin-based adhesive agent, an epoxy resin-based adhesive agent, a vinyl chloride resin-based adhesive agent, a chloroprene rubber-based adhesive agent, a cyanoacrylate-based adhesive agent, an aqueous polymer-isocyanate-based adhesive agent, a styrene-butadiene rubber-based adhesive agent, a nitrile rubber-based adhesive agent, a nitrocellulose-based adhesive agent, a reactive hot-melt adhesive agent, a phenolic resin-based adhesive agent, a modified silicone-based adhesive agent, a polyamide resin-based adhesive agent, a polyimide-based adhesive agent, a polyurethane resin-based adhesive agent, a polyolefin resin-based adhesive agent, a polyvinyl acetate resin-based adhesive agent, a polystyrene resin solvent-based adhesive agent, a polyvinyl alcohol-based adhesive agent, a polyvinyl pyrrolidone resin-based adhesive agent, a polyvinyl butyral resin-based adhesive agent, a polybenzimidazole-based adhesive agent, a polymethacrylate resin-based adhesive agent, a melamine resin-based adhesive agent, an urea resin-based adhesive agent, a resorcinol-based adhesive agent, and the like.

Furthermore, it is preferable that a peeling strength of the adhesive layer with respect to the base material is greater than or equal to 0.1 N/mm. This is because it is difficult to peel the base material and the adhesive layer from each other.

Hereinafter, the constituent of the lithium secondary battery (the lithium ion battery), in which capacitance of a negative electrode can be obtained by occlusion or release of lithium, which is an electrode reactive substance, will be described.

In the lithium ion battery, it is possible to set an embodiment in which a positive electrode active material contains a lithium atom. In the positive electrode member, the positive electrode active material layer is formed on one surface or both surfaces of the positive electrode current collector. For example, a conductive material such as an alloy containing aluminum (Al), nickel (Ni), magnesium (Mg), titanium (Ti), iron (Fe), cobalt (Co), zinc (Zn), germanium (Ge), indium (In), gold (Au), platinum (Pt), silver (Ag), palladium (Pd), and the like, or any one thereof, and stainless steel can be exemplified as a material configuring the positive electrode current collector. The positive electrode active material layer contains a positive electrode material which is capable of occluding or releasing lithium, as the positive electrode active material. Further, the positive electrode active material layer may contain a positive electrode binder, a positive electrode conductive agent, or the like. Examples of the positive electrode material are capable of including a lithium-containing compound (a compound containing a lithium atom), and it is preferable to use a lithium-containing composite oxide and a lithium-containing phosphate compound from the viewpoint of obtaining a high energy density. The lithium-containing composite oxide is an oxide containing lithium, and one or two or more elements (hereinafter, referred to as "other elements", and here, lithium is excluded) as a constituent element, and has a bedded salt type crystal structure or a spinel type crystal structure. Specifically, for example, a lithium-cobalt-based material, a lithium-nickel-based material, a spinel manganese-based material, and a superlattice structure material can be included. Alternatively, the lithium-containing phosphate compound is a phosphate compound containing lithium, and one or two or more elements (the other elements) as a constituent element, and has an olivine type crystal structure.

In the negative electrode member, the negative electrode active material layer is formed on one surface or both surfaces of the negative electrode current collector. A conductive material such as an alloy containing copper (Cu), aluminum (Al), nickel (Ni), magnesium (Mg), titanium (Ti), iron (Fe), cobalt (Co), zinc (Zn), germanium (Ge), indium (In), gold (Au), platinum (Pt), silver (Ag), palladium (Pd), and the like, or any one thereof, and stainless steel can be exemplified as a material configuring the negative electrode current collector. The negative electrode active material layer contains a negative electrode material which is capable of occluding or releasing lithium, as the negative electrode active material. Further, the negative electrode active material layer may contain a negative electrode binder, a negative electrode conductive agent, or the like. The negative electrode binder and the negative electrode conductive agent can be similar to the positive electrode binder and the positive electrode conductive agent. It is preferable that a front surface of the negative electrode current collector is roughened on the basis of a so-called anchor effect, from the viewpoint of improving cohesiveness of the negative electrode active material layer with respect to the negative electrode current collector. In this case, at least the front surface of the negative electrode current collector in a region where the negative electrode active material layer is formed, may be roughened. Examples of a roughening method are capable of including a method of forming fine particles by using an electrolytic treatment. The electrolytic treatment is a method in which the fine particles are formed on the front surface of the negative electrode current collector in an electrolytic tank by using an electrolytic method, and thus, convexities and concavities are provided on the front surface of the negative electrode current collector. Alternatively, the negative electrode member is capable of including a lithium foil, a lithium sheet, and a lithium plate.

The negative electrode active material layer, for example, can be formed on the basis of a coating method, a gas phase method, a liquid phase method, a spraying method, and a calcining method (a sintering method). The coating method is a method in which a particle (a powder)-like negative electrode active material is mixed with a negative electrode binder or the like, and then, a mixture is dispersed in a solvent such as an organic solvent, and is applied onto the negative electrode current collector. The gas phase method is a physical gas phase growth method (a PVD method) such as a vacuum vapor deposition method, a sputtering method, an ion plating method, and a laser application method, or various chemical gas phase growth methods (CVD methods) including a plasma CVD method. Examples of the liquid phase method are capable of including an electrolytic plating method or an electroless plating method. The spraying method is a method in which the negative electrode active material in a melted state or a semi-melted state is sprayed onto the negative electrode current collector. The calcining method, for example, is a method in which the mixture dispersed in the solvent by using a coating method is applied onto the negative electrode current collector, and then, is subjected to a heat treatment at a temperature higher than a melting point of the negative electrode binder or the like, and examples of the calcining method are capable of including an atmosphere calcining method, a reaction calcining method, and a hot press calcining method.

In order to prevent lithium from being accidentally precipitated on the negative electrode while being charged, it is preferable that chargeable capacitance of the negative electrode material is larger than discharge capacitance of the positive electrode material. That is, it is preferable that an electrochemical equivalent of the negative electrode material which is capable of occluding or releasing lithium, is larger than an electrochemical equivalent of the positive electrode material. Furthermore, lithium precipitated on the negative electrode, for example, is a lithium metal in a case where the electrode reactive substance is lithium.

The positive electrode lead portion can be attached to the positive electrode current collector on the basis of spot welding or ultrasonic welding. It is desirable that the positive electrode lead portion is a metal foil, and a mesh-like metal, but the positive electrode lead portion may be other than the metal insofar as being electrochemically and chemically stable, and obtaining conduction. Examples of a material of the positive electrode lead portion are capable of including aluminum (Al) and the like.

The negative electrode lead portion can be attached to the negative electrode current collector on the basis of spot welding or ultrasonic welding. It is desirable that the negative electrode lead portion is a metal foil or a mesh-like metal, but the negative electrode lead portion may be other than the metal insofar as being electrochemically and chemically stable, and obtaining conduction. Examples of a material of the negative electrode lead portion are capable of including copper (Cu), nickel (Ni), and the like.

The separator isolates the positive electrode member from the negative electrode member, and allows a lithium ion to pass therethrough while preventing a short circuit of a current caused by contact between the positive electrode member and the negative electrode member. The separator, for example, includes a porous film including a synthetic resin such as a polyolefin-based resin (a polypropylene resin or a polyethylene resin), a polyimide resin, a polytetrafluoroethylene resin, a polyvinylidene fluoride resin, a polyphenylene sulfide resin, and an aromatic polyamide; a porous film such as ceramic; a glass fiber; an unwoven cloth including a liquid crystal polyester fiber or an aromatic polyamide fiber, and a cellulose-based fiber, a ceramic unwoven cloth, and the like, and among them, the porous film such as polypropylene and polyethylene is preferable. Alternatively, the separator can include a laminated film in which two or more types of porous films are laminated, and a separator coated with the inorganic substance layer or an inorganic substance-containing separator can be used. The thickness of the separator is preferably greater than or equal to 5 μm and less than or equal to 50 μm, and is more preferably greater than or equal to 7 μm and less than or equal to 30 μm. In a case where the separator is excessively thick, a filling amount of the active material decreases, battery capacitance decreases, and ion conductivity decreases, and current characteristics decrease. In contrast, in a case where the separator is excessively thin, a mechanical strength of the separator decreases.

Examples of a lithium salt configuring an non-aqueous electrolytic solution suitable to be used in the lithium ion battery are capable of including $LiPF_6$, $LiClO_4$, $LiBF_4$, $LiAsF_6$, $LiSbF_6$, $LiTaF_6$, $LiNbF_6$, $LiAlCl_4$, $LiCF_3SO_3$, $LiCH_3SO_3$, $LiN(CF_3SO_2)_2$, $LiC(CF_3SO_2)_3$, $LiC_4F_9SO_3$, $Li(FSO_2)_2N$, $Li(CF_3SO_2)_2N$, $Li(C_2F_6SO_2)_2N$, $Li(CF_3SO_2)_3C$, $LiBF_3(C_2F_5)$, $LiB(C_2O_4)_2$, $LiB(C_6F_5)_4$, $LiPF_3(C_2F_5)_3$, $½Li_2B_{12}F_{12}$, $Li_2SiF_6$, LiCl, LiBr, and LiI, and the lithium salt is not limited thereto. In addition, examples of the organic solvent are capable of including cyclic carbonate ester such as ethylene carbonate (EC), propylene carbonate (PC), and butylene carbonate (BC); chain carbonate ester such as dimethyl carbonate (DMC), ethyl methyl carbonate (EMC), diethyl carbonate (DEC), dipropyl carbonate (DPC), propyl methyl carbonate (PMC), and propyl ethyl carbonate (PEC); cyclic ether such as tetrahydrofuran (THF), 2-methyl tetrahydrofuran (2-MeTHF), 1,3 dioxolan (DOL), and 4-methyl-1,3 dioxolan (4-MeDOL); chain ether such as 1,2 dimethoxy ethane (DME) and 1,2 diethoxy ethane (DEE); cyclic ester such as γ-butyrolactone (GBL) and γ-valerolactone (GVL); and chain ester such as methyl acetate, ethyl acetate, propyl acetate, methyl formate, ethyl formate, propyl formate, methyl butyrate, methyl propionate, ethyl propionate, and propyl propionate. Alternatively, examples of the organic solvent are capable of including tetrahydropyrane, 1,3 dioxane, 1,4 dioxane, N,N-dimethyl formamide (DMF), N,N-dimethyl acetoamide (DMA), N-methyl pyrrolidinone (NMP), N-methyl oxazolidinone (NMO), N,N'-dimethyl imidazolidinone (DMI), dimethyl sulfoxide (DMSO), trimethyl phosphate (TMP), nitromethane (NM), nitroethane (NE), sulfolane (SL), methyl sulfolane, acetonitrile (AN), anisole, propionitrile, glutaronitrile (GLN), adiponitrile (ADN), methoxy acetonitrile (MAN), 3-methoxy propionitrile (MPN), and diethyl ether. Alternatively, an ionic liquid can be used. A known ionic liquid of the related art can be used as the ionic liquid, and the ionic liquid may be selected as necessary.

The electrolyte layer can also include a non-aqueous electrolytic solution and a retaining polymer compound. The non-aqueous electrolytic solution, for example, is retained by the retaining polymer compound. In such an embodiment, the electrolyte layer is a gel electrolyte, a high ion conductance rate (for example, greater than or equal to 1 mS/cm at room temperature) is obtained, and a liquid leakage of the non-aqueous electrolytic solution is prevented. The electrolyte can be a liquid electrolyte, or can be a gel electrolyte.

Specifically, polyacrylonitrile, polyvinylidene fluoride, polytetrafluoroethylene, polyhexafluoropropylene, polyethylene oxide, polypropylene oxide, polyphosphazene, polysiloxane, polyvinyl fluoride (PVF), polychlorotrifluoroethylene (PCTFE), a perfluoroalkoxy fluorine resin (PFA), an ethylene tetrafluoride-propylene hexafluoride copolymer (FEP), an ethylene-ethylene tetrafluoride copolymer (ETFE), an ethylene-chlorotrifluoroethylene copolymer (ECTFE), polyvinyl acetate, polyvinyl alcohol, polymethyl methacrylate, polyacrylate, polymethacrylate, styrene-butadiene rubber, nitrile-butadiene rubber, polystyrene, polycarbonate, and vinyl chloride can be exemplified as the retaining polymer compound. Such compounds may be independently used, or may be used by being mixed together. In addition, the retaining polymer compound may be a copolymer. Specifically, a copolymer of vinylidene fluoride and hexafluoropyrene, and the like can be exemplified as the copolymer, and among them, polyvinylidene fluoride is preferable as a homopolymer, and a copolymer of vinylidene fluoride and hexafluoropyrene is preferable as a copolymer, from the viewpoint of electrochemical stability. In addition, a compound having high heat resistance, such as $Al_2O_3$, $SiO_2$, $TiO_2$, and boron nitride (BN), may be contained as a filler.

Examples of a material of the laminated electrode body storage member (a battery can) configuring a cylindrical secondary battery are capable of including iron (Fe), nickel (Ni), aluminum (Al), titanium (Ti), and the like, or an alloy thereof, stainless steel (SUS), and the like. In order to prevent electrochemical corrosion according to charge and discharge of the secondary battery, for example, it is preferable that the battery can is plated with nickel or the like. It is preferable that an exterior member of a laminated (a laminated film type) secondary battery has a laminated structure of a plastic material layer (a fused layer), a metal layer, and a plastic material layer (a surface protective layer), that is, is a laminated film. In a case of the laminated film type secondary battery, for example, the exterior member is folded back such that the fused layers face each other through the laminated electrode body, and then, outer circumferential edge portions of the fused layers are fused. Here, the exterior member may be formed by bonding two laminated films together through an adhesive agent or the like. The fused layer, for example, includes a film of an olefin resin such as polyethylene, polypropylene, modified polyethylene, modified polypropylene, and a polymer thereof. The metal layer, for example, includes an aluminum foil, a stainless steel foil, a nickel foil, and the like. The surface protective layer, for example, includes nylon, polyethylene terephthalate, and the like. Among them, it is preferable that the exterior member is an aluminum laminated film in which a polyethylene film, an aluminum foil, and a nylon film are laminated in this order. Here, the exterior member may be a laminated film having other laminated structures, may be a polymer film such as polypropylene, or may be a metal film.

The secondary battery of the present disclosure, for example, can be used as a driving power source or an auxiliary power source of a note-type personal computer, a portable information terminal (PDA), a mobile phone, a smart phone, a main phone or a cordless headset of a cordless phone, a video movie, a digital still camera, an electronic book, an electronic dictionary, a portable music player, a radio, a headphone, a game machine, a navigation system, a memory card, a cardiac pacemaker, an acoustic aid, an electric tool, an electric shaver, a refrigerator, an air conditioner, a television receiver, a stereo, a water heater, a microwave, a dish washer, a laundry machine, a drying machine, a lighting equipment, toys, a medical equipment, a robot, a road conditioner, a traffic light, a rail vehicle, a caddie cart, an electric cart, an electric vehicle (including a hybrid car), and the like. In addition, the secondary battery can be used to be mounted in buildings including a house, a power source for power storage of a power generation equipment, or the like, or to supply power thereto. In the electric vehicle, a conversion device converting power into a driving force by supplying power is generally a motor. A control device performing information processing relevant to vehicle control includes a control device of displaying a residual amount of the secondary battery on the basis of information associated with the residual amount of the secondary battery, or the like. In addition, the secondary battery can be used in an electric storage device of a so-called smart grid. Such an electric storage device is capable of not only supplying power, but also performing electric storage by receiving power supplied from the other power source. For example, thermal power generation, atomic power generation, hydraulic power generation, a solar battery, wind power generation, geothermal power generation, a fuel battery (including a biofuel battery), and the like can be used as the other power source.

The secondary battery or the like of the present disclosure can be applied to a secondary battery of a battery pack including the secondary battery, a control unit performing control relevant to the secondary battery, and an exterior including the secondary battery therein. In the battery pack, the control unit, for example, performs control of charge and discharge relevant to the secondary battery, and over discharge or over charge.

The secondary battery or the like of the present disclosure can be applied to a secondary battery of an electronic device receiving power supplied from a secondary battery.

The secondary battery or the like of the present disclosure can be applied to a secondary battery in an electric vehicle including a conversion device converting power into a driving force of a vehicle by receiving power supplied from the secondary battery and a control device performing information processing relevant to vehicle control on the basis of information associated with the secondary battery. In the electric vehicle, the conversion device is typically drives a motor by receiving power supplied from the secondary battery, and generates the driving force. Regenerative energy can be used for driving the motor. In addition, the control device, for example, performs the information processing relevant to the vehicle control on the basis of a battery residual amount of the secondary battery. In the electric vehicle, for example, a so-called hybrid car is included in addition to an electric vehicle, an electric motorcycle, an electric bicycle, a rail vehicle, and the like.

The secondary battery or the like of the present disclosure can be applied to a secondary battery of a power system configured to receive power supplied from the secondary battery and/or to supply power to the secondary battery from a power source. The power system may be any power system insofar as using power, and also includes a mere power device. The power system, for example, includes a smart grid, a home energy management system (HEMS), a vehicle, and the like, and is also capable of performing electric storage.

The secondary battery or the like of the present disclosure can be applied to a secondary battery of a power source for power storage including the secondary battery and configured to be connected with an electronic device to which power is supplied. The power source for power storage can be basically used even in any power system or power device regardless of the application of the power source for power storage, and for example, can be used in a smart grid.

Example 1

Figure 1B:
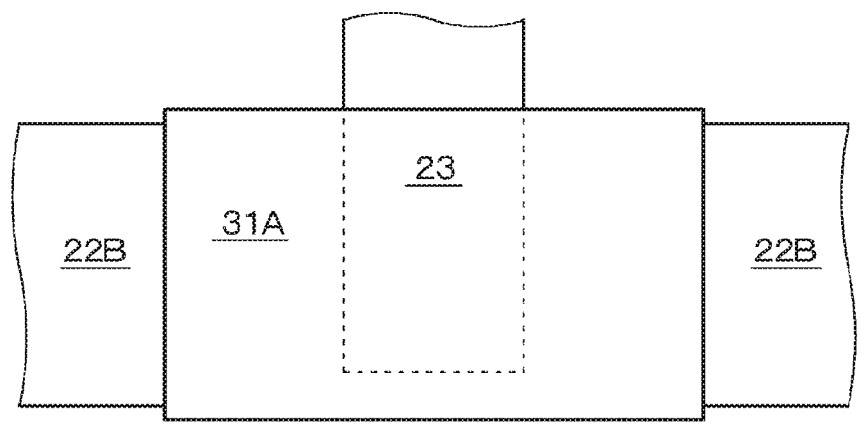
Figure 1C:
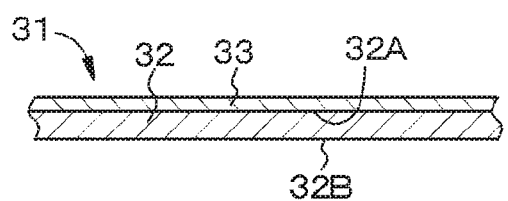
Figure 2A:
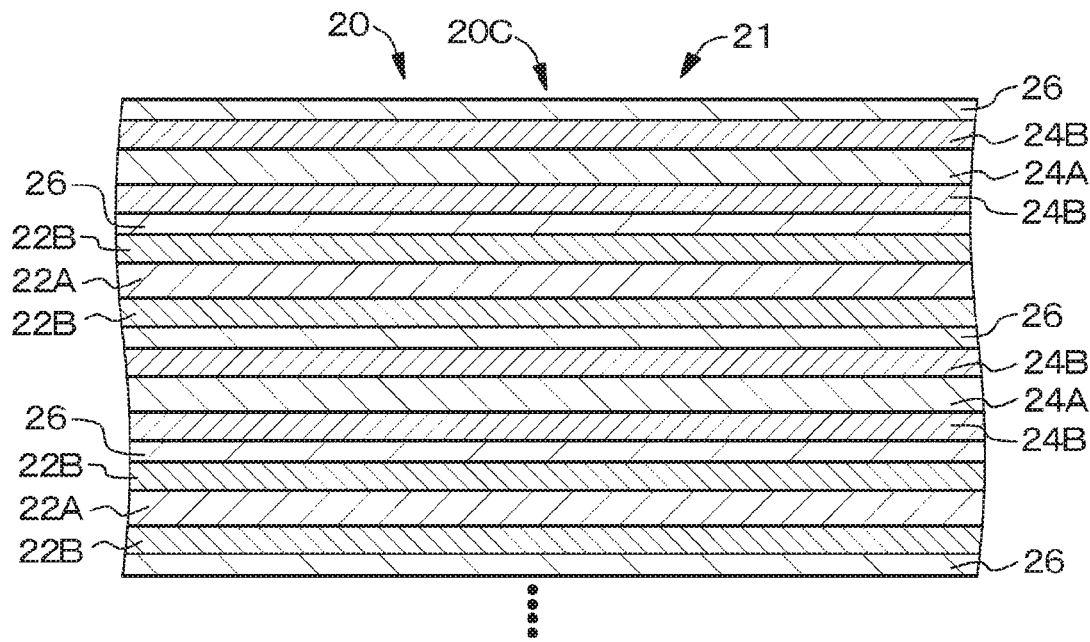
FIG. 2A and FIG. 2B are schematic partial sectional views of the laminated electrode body along the longitudinal direction in which the electrode member and the separator configuring the secondary battery of Example 1 are laminated.
Figure 2B:
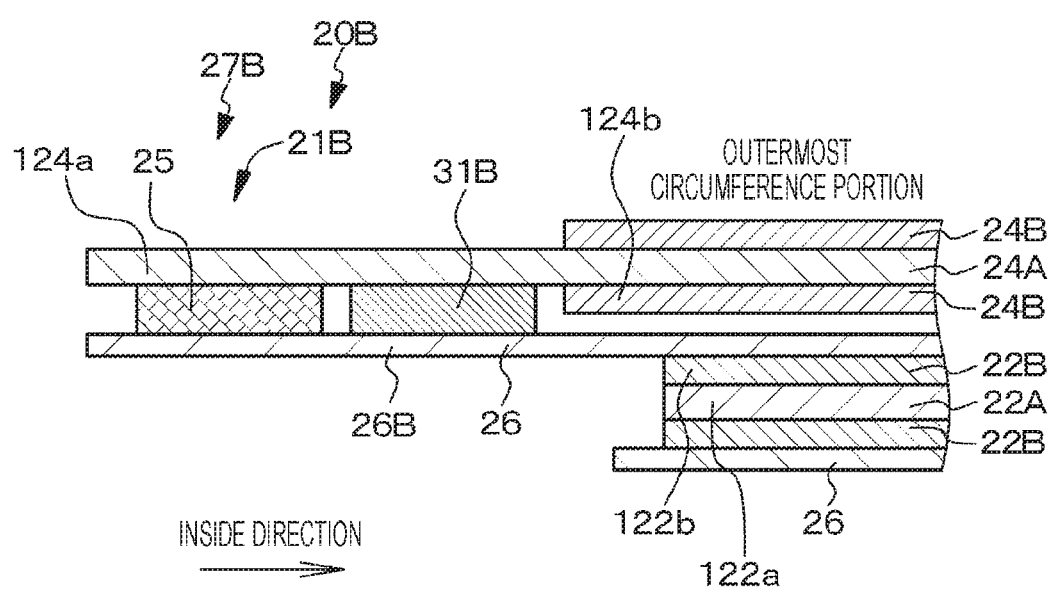
Figure 3:
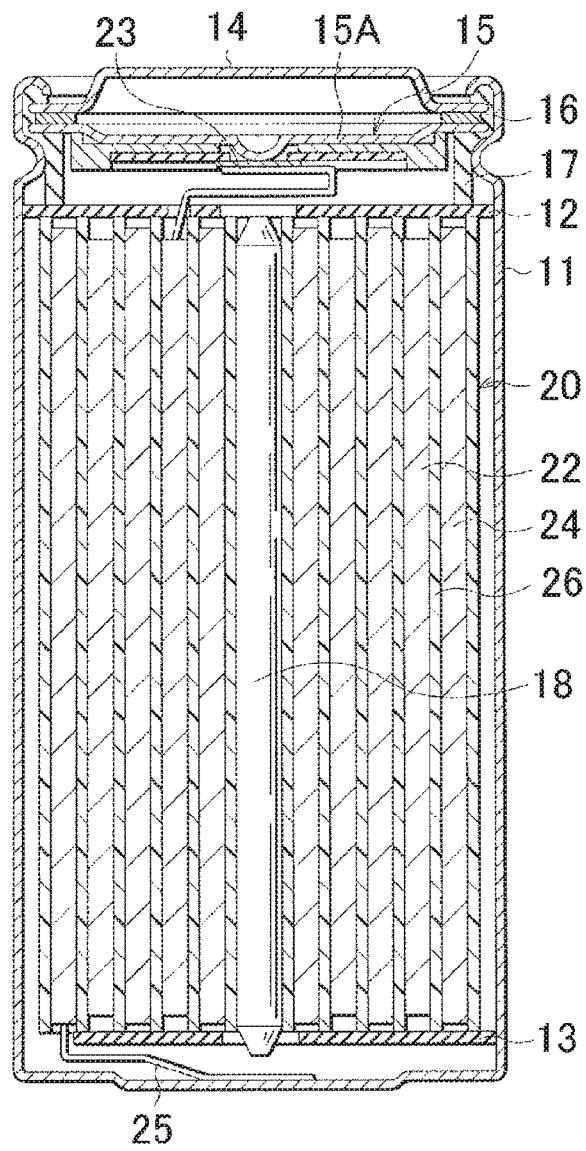
FIG. 3 is a schematic sectional view of a cylindrical secondary battery (a lithium ion battery) of Example 1.

Example 1 relates to the secondary battery of the present disclosure. Specifically, a secondary battery of Example 1 includes a cylindrical lithium ion battery. FIG. 1A, FIG. 2A, and FIG. 2B illustrate schematic partial sectional views of a laminated electrode body configuring the secondary battery of Example 1, in which an electrode member and a separator are laminated, in a longitudinal direction, and FIG. 1B schematically illustrates arrangement of a suppressing member and the like. Furthermore, FIG. 1A and FIG. 1B are a schematic partial sectional view and a schematic arrangement diagram of a portion where a positive electrode lead portion is disposed, FIG. 2B is a schematic partial sectional view of a portion where a negative electrode lead portion is disposed, and FIG. 2A is a schematic partial sectional view of a portion where the positive electrode lead portion and the negative electrode lead portion are not disposed. In FIG. 1A and FIG. 1B, in order to simplify the drawings, the laminated electrode body is illustrated as being flat, but in practice, the laminated electrode body is wound, or is curved. In addition, FIG. 2B is a schematic partial sectional view illustrating a region of an end portion of the laminated electrode body, and illustrates the laminated electrode body in an unfolded state. Further, FIG. 1C illustrates a schematic partial sectional view of the suppressing member. In addition, FIG. 3 illustrates a schematic sectional view of a cylindrical secondary battery (a lithium ion battery) of Example 1.

In the lithium ion battery of Example 1, a laminated electrode body 20 and a pair of insulating plates 12 and 13 are stored in an approximately hollow cylindrical laminated electrode body storage member 11. For example, a laminated electrode body is obtained by laminating a positive electrode member 22 and a negative electrode member 24 through a separator 26, and then, the laminated electrode body is wound, and thus, the laminated electrode body 20 can be prepared.

The laminated electrode body storage member (a battery can) 11 has a hollow structure in which one end portion is closed, and the other end portion is opened, and is prepared from iron <Fe>, aluminum <Al>, or the like. A front surface of the laminated electrode body storage member 11 may be plated with nickel <Ni> or the like. The pair of insulating plates 12 and 13 is arranged to interpose the laminated electrode body 20 therebetween, and to extend to be perpendicular to a wound circumferential surface of the laminated electrode body 20. An opening end portion of the laminated electrode body storage member 11 is caulked with a battery lid 14, a safety valve mechanism 15, and a positive temperature coefficient element (a PTC element) 16 through a gasket 17, and thus, the laminated electrode body storage member 11 is sealed. The battery lid 14, for example, is prepared from a material similar to that of the laminated electrode body storage member 11. The safety valve mechanism 15 and the positive temperature coefficient element 16 are disposed inside the battery lid 14, and the safety valve mechanism 15 is electrically connected to the battery lid 14 through the positive temperature coefficient element 16. In the safety valve mechanism 15, in a case where an internal pressure is greater than or equal to a certain level due to an internal short circuit, heating from the outside, or the like, a disk plate 15A is reversed. Then, according to this, the electric connection between the battery lid 14 and the laminated electrode body 20 is broken. In order to prevent abnormal heat generation due to a large current, the resistance of the positive temperature coefficient element 16 increases according to an increase in a temperature. The gasket 17, for example, is prepared from an insulating material. A front surface of the gasket 17 may be coated with asphalt or the like.

A center pin 18 is inserted into the center of the wound laminated electrode body 20. Here, the center pin 18 may not be inserted into the center of the wound laminated electrode body. A positive electrode lead portion 23 prepared from a conductive material such as aluminum is connected to the positive electrode member 22. A negative electrode lead portion 25 prepared from a conductive material such as copper is connected to the negative electrode member 24. The negative electrode lead portion 25 is welded to the laminated electrode body storage member 11, and is electrically connected to the laminated electrode body storage member 11. The positive electrode lead portion 23 is welded to the safety valve mechanism 15, and is electrically connected to the battery lid 14. Furthermore, in an example illustrated in FIG. 3, the negative electrode lead portion 25 is disposed in one portion (the outermost circumference portion of the wound laminated electrode body), but there is also a case where the negative electrode lead portion 25 is disposed two portions (the outermost circumference portion and the innermost circumference portion of the wound laminated electrode body).

The secondary battery of Example 1 at least includes the laminated electrode body 20 in which an electrode member 21 and a separator 26 are laminated. Then, suppressing members (movement preventing members) 31A and 31B (may be collectively referred to as a "suppressing member 31") suppressing a movement of the separator 26 with respect to the electrode member 21 are disposed between portions 20A and 20B of the electrode member and portions 26A and 26B of the separator, in uneven portions 27A and 27B existing in the laminated electrode body 20. Furthermore, FIG. 1A and FIG. 2B are schematic partial sectional views of the portions 20A and 20B of the laminated electrode body 20 in which the uneven portions 27A and 27B exist, and FIG. 2A is a schematic partial sectional view of a portion 20C of the laminated electrode body 20 (a symmetric portion or region of the laminated electrode body 20 in a thickness direction) in which the uneven portions 27A and 27B do not exist.

Here, as described above, the secondary battery of Example 1 further includes the laminated electrode body storage member 11, and a strip-like laminated electrode body 20 is stored in the laminated electrode body storage member 11 in a wound state. An outer shape of the laminated electrode body storage member 11 is a cylindrical shape or a square shape (a planar shape), and specifically, is a cylindrical shape in Example 1.

Then, the secondary battery of Example 1 further includes a lead portion attached to the laminated electrode body 20, and the lead portion includes the positive electrode lead portion 23 attached to a positive electrode current collector 22A (refer to FIG. 1A) and the negative electrode lead portion 25 attached to a negative electrode current collector 24A (refer to FIG. 2B). In addition, in the laminated electrode body 20, the positive electrode member 22 in which a positive electrode active material layer 22B is formed on the positive electrode current collector 22A (specifically, both surfaces of the positive electrode current collector 22A), and the negative electrode member 24 in which a negative electrode active material layer 24B is formed on the negative electrode current collector 24A (specifically, both surfaces of the negative electrode current collector 24A) are laminated through the separator 26. The positive electrode active material layer 22B is not formed in a region of the positive electrode current collector 22A where the positive electrode lead portion 23 is attached, and the negative electrode active material layer 24B is not formed in a region of the negative electrode current collector 24A where the negative electrode lead portion 25 is attached.

Then, as illustrated in FIG. 1A, the lead portion (specifically, the positive electrode lead portion 23) is included in the uneven portion 27A, and the suppressing member 31A is disposed between a portion 21A of the electrode member and the lead portion (specifically, the positive electrode lead portion 23), and a portion of the separator 26, in the uneven portion 27A. Alternatively, as illustrated in FIG. 2B, the secondary battery of Example 1 further includes a lead portion (specifically, the negative electrode lead portion 25) attached to the laminated electrode body 20, and the uneven portion 27B is positioned in the vicinity of a portion 21B of the electrode member to which the lead portion (specifically, negative electrode lead portion 25) is attached. An end portion of the laminated electrode body 20 is included in the uneven portion 27B.

Specifically, as illustrated in FIG. 1A, in the laminated electrode body 20, as described above, the positive electrode member 22 in which the positive electrode active material layer 22B is formed on the positive electrode current collector 22A (specifically, both surfaces of the positive electrode current collector 22A), and the negative electrode member 24 in which the negative electrode active material layer 24B is formed on the negative electrode current collector 24A (specifically, both surfaces of the negative electrode current collector 24A) are laminated through the separator 26. The secondary battery further includes the lead portions 23 and 25 including the positive electrode lead portion 23 attached to the positive electrode current collector 22A and the negative electrode lead portion 25 attached to the negative electrode current collector 24A, and the laminated electrode body storage member 11. Then, the laminated electrode body 20 is stored in the laminated electrode body storage member 11 in the wound state, the positive electrode lead portion 23 is attached to a portion 122A of the positive electrode current collector 22A positioned by being separated from an end portion of the positive electrode member 22, and the suppressing member 31A is disposed between the positive electrode lead portion 23, the portion 122A of the positive electrode current collector positioned in the vicinity of the positive electrode lead portion 23, and a portion 122B of the positive electrode active material layer adjacent to the portion 122A of the positive electrode current collector positioned in the vicinity of the positive electrode lead portion 23, and the separator 26. Furthermore, such arrangement of the suppressing member 31A, for convenience, will be referred to as "arrangement of the suppressing member with respect to a region -A of the laminated electrode body". In FIG. 1A and FIG. 2B, a gap exists between the suppressing members 31A and 31B and the separator 26, but in practice, there is almost no gap.

Alternatively, specifically, as illustrated in FIG. 2B, the end portion of the laminated electrode body 20 includes an end portion 124a of the negative electrode current collector 24A. Here, when a direction separated from the end portion of the laminated electrode body 20 is set to an inside direction, an end portion 124b of the negative electrode active material layer is disposed by being separated from the end portion 124a of the negative electrode current collector in the inside direction, an end portion 122b of the positive electrode active material layer and an end portion 122a of the positive electrode current collector are disposed by being separated from the end portion 124b of the negative electrode active material layer in the inside direction, the negative electrode lead portion 25 is attached in the vicinity of the end portion 124a of the negative electrode current collector, and the suppressing member 31B is disposed between a region of the negative electrode lead portion 25 and the end portion 124b of the negative electrode active material layer, and the separator 26. Furthermore, such arrangement of the suppressing member 31B with respect to the outermost circumference portion of the wound laminated electrode body illustrated in FIG. 2B, for convenience, will be referred to as "arrangement of the suppressing member with respect to a region -B of the laminated electrode body", and such arrangement of the suppressing member 31B with respect to the innermost circumference portion of the wound laminated electrode body, for convenience, will be referred to as "arrangement of the suppressing member with respect to a region -C of the laminated electrode body". A schematic partial sectional view illustrating the arrangement of the suppressing member with respect to the region -C of the laminated electrode body is omitted, but in a case where the configuration or the structure illustrated in FIG. 2B is rotated around an axis line perpendicular to the paper of FIG. 2B by 180 degrees, the arrangement of the suppressing member with respect to the region -C of the laminated electrode body is obtained.

As the schematic partial sectional view of the suppressing member 31 illustrated in FIG. 1C, the suppressing member 31 includes a tape-like base material 32, and an adhesive layer (an adhesive agent layer) 33 disposed on one surface 32A of the base material 32, and the suppressing member 31 adheres to the laminated electrode body 20 through the adhesive layer 33. Here, the secondary battery further includes an electrolytic solution, the other surface 32B of the base material 32 exhibits pressure-sensitive adhesiveness (adhesiveness) by being in contact with the electrolytic solution, and the other surface 32B of the base material pressure-sensitively adheres (adheres) to the separator 26. The base material 32, for example, includes an OPS film having a thickness of 25 μm, 50 μm, or 100 μm, and the adhesive layer 33 includes an acrylic adhesive agent having a thickness of 10 μm.

A secondary battery (a lithium ion battery) having specification shown in Table 1 described below was experimentally prepared.

TABLE 1

| | |
|---|---|
| Positive electrode current collector 22A | Aluminum foil having thickness of 20 μm |
| Positive electrode active material layer 22B | Thickness of 50 μm per one surface |
| Positive electrode lead portion 23 | Aluminum (Al) foil having thickness of 100 μm |

TABLE 1-continued

| | |
|---|---|
| Negative electrode current collector 24A | Copper foil having thickness of 20 μm |
| Negative electrode active material layer 24B | Thickness of 50 μm per one surface |
| Negative electrode lead portion 25 | Nickel (Ni) foil having thickness of 100 μm |

In a case of preparing the positive electrode member 22, first, 91 parts by mass of a positive electrode active material <$LiCoO_2$>, 3 parts by mass of a positive electrode binder (polyvinylidene fluoride), and 6 parts by mass of a positive electrode conductive agent (black lead, graphite) are mixed together, and thus, a positive electrode mixture is obtained. Then, the positive electrode mixture is mixed with an organic solvent (N-methyl-2-pyrrolidone), and thus, paste-like positive electrode mixture slurry is obtained. Next, both surfaces of the strip-like positive electrode current collector 22A (an aluminum foil having a thickness of 20 μm) are coated with the positive electrode mixture slurry by using a coating device, and then, the positive electrode mixture slurry is dried, and thus, the positive electrode active material layer 22B is formed. Then, the positive electrode active material layer 22B is subjected to compression molding by using a roll pressing machine.

In a case of preparing the negative electrode member 24, first, 97 parts by mass of a negative electrode active material (black lead (graphite)), or a mixed material of black lead and silicon) and 3 parts by mass of a negative electrode binder (polyvinylidene fluoride) are mixed together, and thus, a negative electrode mixture is obtained. An average particle diameter $d_{50}$ of black lead is set to 20 μm. Next, the negative electrode mixture is mixed with an organic solvent (N-methyl-2-pyrrolidone), and thus, paste-like negative electrode mixture slurry is obtained. Then, both surfaces of the strip-like negative electrode current collector 24A (a copper foil having a thickness of 20 μm) are coated with the negative electrode mixture slurry by using a coating device, and then, the negative electrode mixture slurry is dried, and thus, the negative electrode active material layer 24B is formed. Then, the negative electrode active material layer 24B is subjected to compression molding by using a roll pressing machine.

The separator 26 includes a microporous polyethylene film having a thickness of 20 μm. In addition, a non-aqueous electrolytic solution having a composition shown in Table 2 or Table 3 described below is impregnated in the laminated electrode body 20. The electrolytic solution is in contact with the other surface 32B of the base material 32, and thus, the other surface 32B of the base material 32 exhibits pressure-sensitive adhesiveness (adhesiveness), and thus, the other surface 32B of the base material 32 pressure-sensitively adheres (adheres) to the separator 26. Alternatively, as described later, the other surface 32B of the base material 32 swells by being in contact with the electrolytic solution, and the other surface 32B of the base material 32 coheres to the separator 26. Furthermore, a solvent of the non-aqueous electrolytic solution is a broad concept including not only a liquid material, but also a material having ion conductivity, which is capable of disassociating an electrolyte salt. Accordingly, in a case of using a polymer compound having ion conductivity, the polymer compound is also included in the solvent.

TABLE 2

| | |
|---|---|
| Organic solvent | EC/PC of 1/1 at mass ratio |
| Lithium salt configuring non-aqueous electrolytic solution | 1.0 mol/liter of $LiPF_6$ |

TABLE 3

| | |
|---|---|
| Organic solvent | EC/DMC 3/5 at mass ratio |
| Lithium salt configuring non-aqueous electrolytic solution | 1.0 mol/liter of $LiPF_6$ |

In a case of preparing the non-aqueous electrolytic solution, the details will be described later, but a first compound, a second compound, a third compound, and other materials are mixed and stirred together. Bisfluorosulfonyl imide lithium <LiFSI> or bistrifluoromethyl sulfonyl imide lithium <LiTFSI> is used as the first compound. In addition, acetonitrile (AN), propionitrile (PN), or butyronitrile (BN), which is a non-oxygen-containing mononitrile compound, or methoxy acetonitrile (MAN), which is an oxygen-containing mononitrile compound, is used as the second compound. Further, vinylene carbonate (VC), vinyl ethylene carbonate (VEC), or methylene ethylene carbonate (MEC), which is unsaturated cyclic carbonate ester, or 4-fluoro-1,3-dioxolan-2-one (FEC), bis(fluoromethyl) carbonate (DFDMC), which is halogenated carbonate ester, or succinonitrile (SN), which is a polynitrile compound, is used as the third compound. Further, ethylene carbonate (EC), which is cyclic ester carbonate, dimethyl carbonate (DMC), which is chain ester carbonate, and lithium hexafluorophosphate <$LiPF_6$> and lithium tetrafluoroborate <$LiBF_4$>, which are an electrolyte salt, are used as the other materials.

The lithium ion battery, for example, can be manufactured on the basis of the following procedure.

That is, first, as described above, the positive electrode active material layer 22B is formed on both surfaces of the positive electrode current collector 22A, and the negative electrode active material layer 24B is formed on both surfaces of the negative electrode current collector 24A.

After that, the positive electrode lead portion 23 is attached to the positive electrode current collector 22A by using a welding method or the like. As illustrated in FIG. 1A, the positive electrode active material layer 22B is not formed in the portion 122A of the positive electrode current collector 22A positioned by being separated from the end portion of the positive electrode member 22. The positive electrode lead portion 23 is attached to the portion 122A of the positive electrode current collector 22A. Then, the suppressing member 31A is disposed between the positive electrode lead portion 23, the portion 122A of the positive electrode current collector positioned in the vicinity of the positive electrode lead portion 23, and the portion 122B of the positive electrode active material layer adjacent to the portion 122A of the positive electrode current collector positioned in the vicinity of the positive electrode lead portion 23, and the separator 26. Specifically, the suppressing member 31A is stuck to the portion 122A of the positive electrode current collector positioned in the vicinity of the positive electrode lead portion 23 and the portion 122B of the positive electrode active material layer adjacent to the portion 122A of the positive electrode current collector positioned in the vicinity of the positive electrode lead portion 23, through the adhesive layer 33. Furthermore, the positive electrode active material layer 22B is not also formed in a portion on a side opposite to the positive electrode current collector 22A side to which the positive electrode lead portion 23 is attached, and thus, such a portion is also an uneven portion. Therefore, a suppressing member 31A' is also disposed between the portion 122A of the positive electrode current collector and a portion 122B' of the positive electrode active material layer adjacent to the portion 122A of the positive electrode current collector, and the separator 26.

In addition, the negative electrode lead portion 25 is attached to the negative electrode current collector 24A by using a welding method or the like. As illustrated in FIG. 2B, the negative electrode lead portion 25 is attached in the vicinity of the end portion 124a of the negative electrode current collector where the negative electrode active material layer 24B is not formed. Then, a suppressing member 31B is disposed between a region between the negative electrode lead portion 25 and the end portion 124b of the negative electrode active material layer, and the separator 26. Specifically, the suppressing member 31B is stuck to the portion 124A of the negative electrode current collector 24A positioned between the negative electrode lead portion 25 and the end portion 124b of the negative electrode active material layer through the adhesive layer 33.

Next, the positive electrode member 22 and the negative electrode member 24 are laminated through the separator 26 including a microporous polyethylene film having a thickness of 20 μm, and wound, (more specifically, the laminated electrode body of the positive electrode member 22/the separator 26/the negative electrode member 24/the separator 26 (a laminated structure body) is wound), and thus, the laminated electrode body 20 is prepared, and then, a protective tape (not illustrated) is stuck to the outermost circumference portion. Furthermore, at this time, the suppressing member 31 exhibits pressure-sensitive adhesiveness, and thus, it is extremely difficult to wind the laminated electrode body. After that, the center pin 18 is inserted into the center of the laminated electrode body 20. Next, the laminated electrode body 20 is stored in the laminated electrode body storage member (the battery can) 11 while the laminated electrode body 20 is interposed between the pair of insulating plates 12 and 13. In this case, a tip end portion of the positive electrode lead portion 23 is attached to the safety valve mechanism 15, and a tip end portion of the negative electrode lead portion 25 is attached to the laminated electrode body storage member 11, by using a welding method or the like. After that, the organic electrolytic solution or the non-aqueous electrolytic solution is injected into an interior portion a product on the basis of a decompression method, and the organic electrolytic solution or the non-aqueous electrolytic solution is impregnated in the separator 26. Next, the battery lid 14, the safety valve mechanism 15, and the positive temperature coefficient element 16 are caulked with the opening end portion of the laminated electrode body storage member 11 through the gasket 17.

The lithium ion battery of the example, for example, is operated as follows. That is, in a case where a lithium ion is released from the positive electrode member 22 at the time of charge, the lithium ion is occluded in the negative electrode member 24 through the non-aqueous electrolytic solution. On the other hand, in a case where a lithium ion is released from the negative electrode member 24 at the time of discharge, the lithium ion is occluded in the positive electrode member 22 through the non-aqueous electrolytic solution. The lithium ion battery, for example, is designed such that an open-circuit voltage (a battery voltage) at the time of complete charge is $V_N$ volts. In this case, even in a case of using the same type of positive electrode active material, a release amount of lithium per unit mass increases, compared to a case where the lithium ion battery is designed such that the open-circuit voltage at the time of complete charge is 4.2 volts. Thus, the amount of the positive electrode active material and the amount of the negative electrode active material are adjusted, and the lithium ion battery is designed such that the open-circuit voltage (the battery voltage) at the time of complete charge is a predetermined voltage (an upper limit voltage), and thus, a high energy density can be obtained.

In Example 1, various lithium ion batteries shown in Table 4 described below were experimentally prepared. Then, an overload test of the secondary battery was performed, and time before a short circuit occurs in the secondary battery was measured. Relative time before a short circuit occurs in each experimental product of Example 1 at the time of setting time before a short circuit occurs to "1" in Comparative Example 1 is shown in Table 4. Furthermore, in Comparative Example 1, a polyimide film having a thickness of 50 μm (the adhesive layer 33 is formed on one surface, as with Example 1) is used as the base material 32 instead of the OPS film, and the polyimide film is disposed instead of the suppressing member 31. The polyimide film neither exhibits pressure-sensitive adhesiveness nor swells by the electrolytic solution.

TABLE 4

| Example | Arrangement of suppressing member with respect to region - A of laminated electrode body Thickness of base material (μm) | Arrangement of suppressing member with respect to region - B of laminated electrode body Thickness of base material (μm) | Arrangement of suppressing member with respect to region - C of laminated electrode body Thickness of base material (μm) | Relative time before short circuit Occurs |
|---|---|---|---|---|
| 1A | 50 | 50 | 50 | 15 |
| 1B | 50 | None | None | 5 |
| 1C | 50 | 50 | None | 10 |
| 1D | 50 | None | 50 | 10 |
| 1E | 25 | 50 | 50 | 15 |
| 1F | 100 | 50 | 50 | 15 |
| 1G | 50 | 25 | 50 | 13 |
| 1H | 50 | 100 | 50 | 15 |
| 1J | 50 | 50 | 25 | 13 |
| 1K | 50 | 50 | 100 | 15 |
| Comparative Example 1 | PI: 50 | None | None | 1 |

From Table 4, it was determined that in any secondary battery of Example 1 including the suppressing members 31A and 31B, the time before a short circuit occurs is longer than that of Comparative Example 1, and thus, it is possible to provide a secondary battery having high reliability.

Furthermore, it is possible to provide the positive electrode member 22 on the basis of the following method. That is, first, lithium carbonate <$Li_2CO_3$> and cobalt carbonate <$CoCO_3$> are mixed together, and then, a mixture is calcined in the air (900° C.×5 hours), and thus, a lithium-containing composite oxide ($LiCoO_2$) is obtained. In this case, a mixing ratio, for example, is set to $Li_2CO_3$:$CoO_3$=0.5:1 at a molar ratio. Then, 91 parts by mass of a positive electrode active material ($LiCoO_2$), 3 parts by mass of a positive electrode binder (polyvinylidene fluoride), and 6 parts by mass of a positive electrode conductive agent (black lead) are mixed together, and thus, a positive electrode mixture is obtained. Then, the positive electrode mixture is mixed with an organic solvent (N-methyl-2-pyrrolidone), and thus, paste-like positive electrode mixture slurry is obtained. After that, both surfaces of the strip-like positive electrode current collector 22A are coated with the positive electrode mixture slurry by using a coating device, and then, the positive electrode mixture slurry is dried, and thus, the positive electrode active material layer 22B is formed. Then, the positive electrode active material layer 22B is subjected to compression molding by using a roll pressing machine.

In a case where $Li_{1.15}(Mn_{0.65}Ni_{0.22}Co_{0.13})_{0.85}O_2$ is used as the positive electrode active material, first, nickel sulfate <$NiSO_4$>, cobalt sulfate <$CoSO_4$>, and manganese sulfate <$MnSO_4$> are mixed together. Then, a mixture was dispersed in water, and thus, an aqueous solution was prepared. Next, sodium hydroxide <NaOH> was added to the aqueous solution while the aqueous solution was sufficiently stirred, and thus, a coprecipitate (manganese.nickel.cobalt composite coprecipitated oxide) was obtained. After that, the coprecipitate was washed with water, and then dried, and then, a lithium hydroxide monohydrated salt was added to the coprecipitate, and thus, a precursor was obtained. Then, in the atmosphere, the precursor was calcined (800° C.×10 hours), and thus, the positive electrode active material described above was capable of being obtained.

In addition, in a case where $LiNi_{0.5}Mn_{1.50}O_4$ is used as the positive electrode active material, first, lithium carbonate <$Li_2CO_3$>, manganese oxide <$MnO_2$>, and nickel oxide <NiO> are weighed, and weighed substances are mixed by using a ball mill. In this case, a mixing ratio (a molar ratio) of main elements is set to Ni:Mn=25:75. Next, in the atmosphere, a mixture was calcined (800° C.×10 hours), and then, was cooled. Next, a calcined product is mixed again by using a ball mill, and then, in the atmosphere, the calcined product was calcined again (700° C.×10 hours), and thus, the positive electrode active material described above was capable of being obtained.

Alternatively, a compound represented by Formula (A) described below, or a LiNiMnO-based material can also be used as the positive electrode active material.

$$Li_{1+a}(Mn_bCo_cNi_{1-b-c})_{1-a}M^0{}_dO_{2-e} \qquad (A)$$

Here, "$M^0$" is at least one type of element belonging to a second group to a fifteenth group of a long-periodic table (here, excluding manganese, cobalt, and nickel), and satisfies $0<a<0.25$, $0.3\leq b<0.7$, $0\leq c<1-b$, $0\leq d\leq 1$, and $0\leq e\leq 1$. Specifically, $Li_{1.15}(Mn_{0.65}Ni_{0.22}Co_{0.13})_{0.85}O_2$ can be exemplified. In addition, specifically, $LiNi_{0.5}Mn_{1.50}O_4$ can be exemplified as the LiNiMnO-based material.

Alternatively, the negative electrode member 24 can also be prepared on the basis of the following method. That is, first, 97 parts by mass of a negative electrode active material (black lead, graphite) and 3 parts by mass of a negative electrode binder (polyvinylidene fluoride) are mixed together, and thus, a negative electrode mixture is obtained. An average particle diameter $d_{50}$ of black lead is set to 20 μm. In addition, for example, a mixture of 1.5 parts by mass of an acrylic modified body of a styrene-butadiene copolymer, and 1.5 parts by mass of carboxy methyl cellulose is used as the negative electrode binder. Then, the negative electrode mixture is mixed with water, and thus, paste-like negative electrode mixture slurry is obtained. After that, both surfaces of the strip-like negative electrode current collector 24A are coated with the negative electrode mixture slurry by using a coating device, and the negative electrode mixture slurry is dried, and thus, the negative electrode active material layer 24B is formed. Then, the negative electrode active material layer 24B is subjected to compression molding by using a roll pressing machine.

Alternatively, a negative electrode active material (silicon) and a precursor of a negative electrode binder (a polyamic acid) are mixed together, and thus, a negative electrode mixture can also be obtained. In this case, a mixing ratio is set to silicon:polyamic acid=80:20 at a drying mass ratio. An average particle diameter $d_{50}$ of silicon is set to 1 μm. N-methyl-2-pyrrolidone and N,N-dimethyl acetoamide are used as a solvent of the polyamic acid. In addition, compression molding is performed, and then, negative electrode mixture slurry is heated in a condition of 100° C.×12 hours in the vacuum atmosphere. Therefore, polyimide, which is the negative electrode binder, is formed.

An insulating material may be included in any region between the positive electrode active material contained in the positive electrode member 22 and the negative electrode active material contained in the negative electrode member 24 (a region between active materials). The region where the insulating material is disposed is not particularly limited insofar as being in any region between the active materials. That is, the insulating material may exist in the positive electrode member 22 (the positive electrode active material layer 22B), may exist in the negative electrode member 24 (the negative electrode active material layer 24B), or may exist between the positive electrode member 22 and the negative electrode member 24. Examples of the region where the insulating material is disposed are capable of including the following two aspects as described below.

Figure 4A:
FIG. 4A and FIG. 4B are respectively a schematic sectional view for illustrating a first aspect relevant to arrangement of an insulating material in the laminated electrode body and a schematic partial sectional view for illustrating a second aspect relevant to the arrangement of the insulating material in the laminated electrode body.

In a first aspect, as illustrated in FIG. 4A, the positive electrode active material layer 22B includes a particle-like positive electrode active material 222A. Then, a layer including an insulating material (an active material insulating layer 222B which is a first insulating layer) is formed on a front surface of the positive electrode active material 222A. The active material insulating layer 222B may cover only a part of the front surface of the positive electrode active material 222A, or may cover the entire front surface of the positive electrode active material 222A. In a case where the active material insulating layer 222B covers a part of the front surface of the positive electrode active material 222A, there may be a plurality of active material insulating layers 222B separated from each other. The active material insulating layer 222B may be a single layer, or may be a multilayer.

The active material insulating layer 222B includes an inorganic insulating material such as insulating ceramics, includes an organic insulating material such as an insulating polymer compound, or includes the inorganic insulating material and the organic insulating material. Specifically, aluminum oxide <$Al_2O_3$>, silicon oxide <$SiO_2$>, magnesium oxide <MgO>, titanium oxide <$TiO_2$>, and zirconium oxide <$ZrO_2$> can be exemplified as the insulating ceramics, and $LiNbO_3$, LIPON ($Li_{3+y}PO_{4-x}N_x$, here, $0.5\leq x\leq 1$, $-0.3<y<0.3$), a material referred to as a lithium-super-ion-conductor (LISICON), Thio-LISICON (for example, $Li_{3.25}Ge_{0.25}P_{0.75}S_4$), $Li_2S$, $Li_2S$—$P_2S_5$, $Li_2S$—$SiS_2$, $Li_2S$—$GeS_2$, $Li_2S$—$B_2S_5$, $Li_2S$—$Al_2S_5$, and $Li_2O$—$Al_2O_3$—$TiO_2$—$P_2O_5$ (LATP) can be exemplified. The insulating polymer compound can be similar to the material configuring the positive electrode binder or the negative electrode binder, and among them, a homopolymer of vinylidene fluoride (for example, polyvinylidene fluoride) or a copolymer (for example, a copolymer of vinylidene fluoride and hexafluoropropylene) is preferable. This is because a physical strength is excellent, and electrochemical stability is obtained. A monomer to be copolymerized with vinylidene fluoride may be a monomer other than hexafluoropropylene.

A procedure of forming the active material insulating layer 222B on the front surface of the positive electrode active material 222A, for example, is as follows. Furthermore, a case where the active material insulating layer 222B contains insulating ceramics will be described as an example. In a case where the active material insulating layer 222B is formed, particles of the positive electrode active material 222A and particles of the insulating ceramics are mixed together. Then, a mixture is pulverized and mixed by using a ball mill, a jet mill, a grinding machine, a fine powdering machine, or the like. In this case, a dispersion medium such as water or a solvent may be added to the mixture. Accordingly, the insulating ceramics adhere to the front surface of the positive electrode active material 222A, and thus, the active material insulating layer 222B is formed. In addition, the insulating ceramics may adhere to the front surface of the positive electrode active material 222A by using a mechanochemical treatment such as mechanofusion. In addition, the insulating ceramics may be deposited on the front surface of the positive electrode active material 222A on the basis of a PVD method such as a sputtering method or a CVD method. Alternatively, a sol-gel method may be used, and in this case, the positive electrode active material 222A may be immersed in an alkoxide solution containing aluminum, silicon, or the like, and a precursor layer may adhere to the front surface of the positive electrode active material 222A, and then, the precursor layer may be calcined.

Figure 4B:
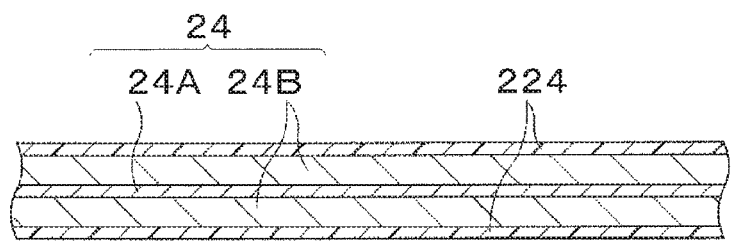

In a second aspect, as illustrated in FIG. 4B, a layer containing an insulating material (a negative electrode insulating layer 224 which is a second insulating layer) is disposed on the front surface of the negative electrode member 24 (the negative electrode active material layer 24B). The details of a covering state, a layer structure, a configuration material, or the like of the negative electrode insulating layer 224 are similar to those of the active material insulating layer 222B described above. Then, in this case, in particular, in a case where the negative electrode insulating layer 224 contains an insulating polymer compound, the cohesiveness of the separator 26 with respect to the negative electrode member 24 is improved, and thus, the laminated electrode body 20 is rarely deformed. Then, accordingly, a decomposition reaction of the organic electrolytic solution or the non-aqueous electrolytic solution is suppressed, and a liquid leakage of the organic electrolytic solution or the non-aqueous electrolytic solution to be impregnated in the separator 26 is also suppressed. Accordingly, even in a case of repeating charge and discharge, resistance rarely increases, and the lithium ion battery rarely swells.

A procedure of forming the negative electrode insulating layer 224 on the front surface of the negative electrode active material layer 24B, for example, is as follows. Furthermore, a case where the negative electrode insulating layer 224 contains the insulating ceramics and the insulating polymer compound will be described as an example. In a case where the negative electrode insulating layer 224 is formed, particles of the insulating ceramics, the insulating polymer compound, and a solvent such as N-methyl-2-pyrrolidone are mixed together, and thus, the particles of the insulating ceramics are dispersed in the solvent, and the insulating polymer compound is dissolved in the solvent. Then, the negative electrode member 24 is immersed in a mixed liquid, and then, the negative electrode member 24 is taken out from the mixed liquid and is dried. Accordingly, the solvent in the mixed liquid is volatilized, and the insulating polymer compound is formed into a film, and thus, the negative electrode insulating layer 224 is formed on the front surface of the negative electrode active material layer 24B. In this case, the negative electrode member 24 may be pressurized before being dried, and thus, the thickness of the negative electrode insulating layer 224 may be adjusted. The mixed liquid may be applied onto the front surface of the negative electrode active material layer 24B instead of immersing the negative electrode member 24 in the mixed liquid.

Alternatively, in a case where the negative electrode insulating layer 224 is formed, first, 80 parts by mass of powder-like insulating ceramics and 20 parts by mass of an insulating polymer compound (polyvinylidene fluoride) are mixed together, and then, a mixture is dispersed in an organic solvent, and thus, a treatment solution is prepared. Aluminum oxide <$Al_2O_3$> and silicon oxide <$SiO_2$> are used as the powder-like insulating ceramics. An average particle diameter $d_{50}$ of the insulating ceramics is set to 0.5 μm. Then, the negative electrode member 24 is immersed in the treatment solution, and then, the thickness of the treatment solution supplied onto the front surface of the negative electrode member 24 by using a gravure roller is adjusted. Then, the treatment solution is dried at 120° C. by using a dryer, and thus, the organic solvent in the treatment solution is volatilized. Thus, the negative electrode insulating layer 224 can be formed on the front surface of the negative electrode active material layer 24B.

As described above, in the secondary battery of Example 1, the suppressing member suppressing the movement of the separator with respect to the electrode member is disposed between the portion of the electrode member and the portion of the separator, in the uneven portion which exists in the laminated electrode body, and is insufficient for the cohesion of the separator with respect to the electrode member, and thus, even in a case where the internal temperature of the secondary battery increases, the separator is prevented from being in contract with the secondary battery, and as a result thereof, it is possible to provide a secondary battery having high reliability.

Furthermore, it is possible to set an aspect in which the other surface 32B of the base material 32 swells by being in contact with the electrolytic solution, and the other surface 32B of the base material 32 coheres to the separator 26. In this case, specifically, the base material 32 includes a film having a thickness of 40 μm, and the adhesive layer includes an acrylic adhesive agent having a thickness of 10 μm. More specifically, the base material 32 is formed by mixing a highly swellable resin material including polyvinylidene fluoride, and a high-melting-point resin material including polyethylene terephthalate (PET).

Example 2

Figure 5:
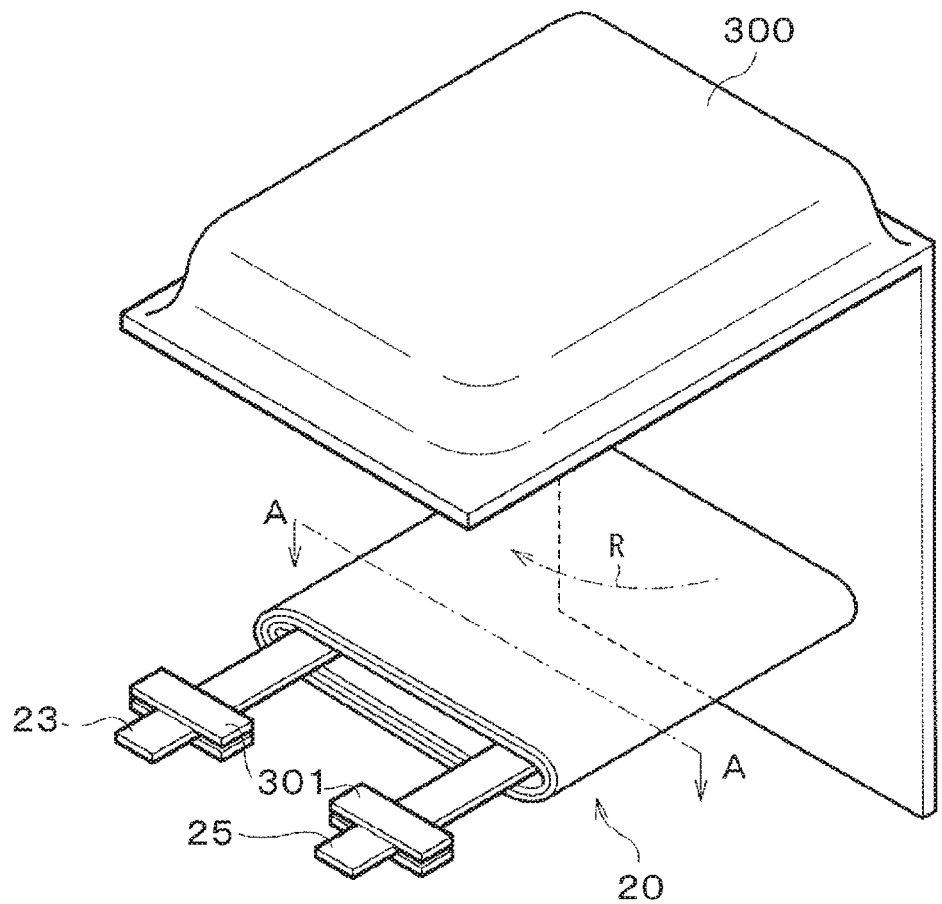
FIG. 5 is a schematic exploded perspective view of a laminated film type square secondary battery (a lithium ion battery) of Example 2.
Figure 6A:
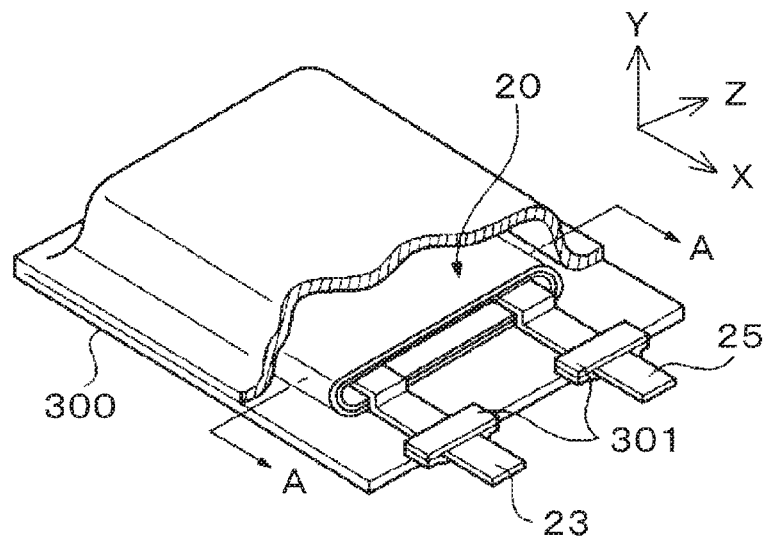
FIG. 6A is a schematic exploded perspective view of a laminated film type secondary battery (a lithium ion battery) of Example 2 in a state different from that illustrated in FIG. 5.
Figure 6B:
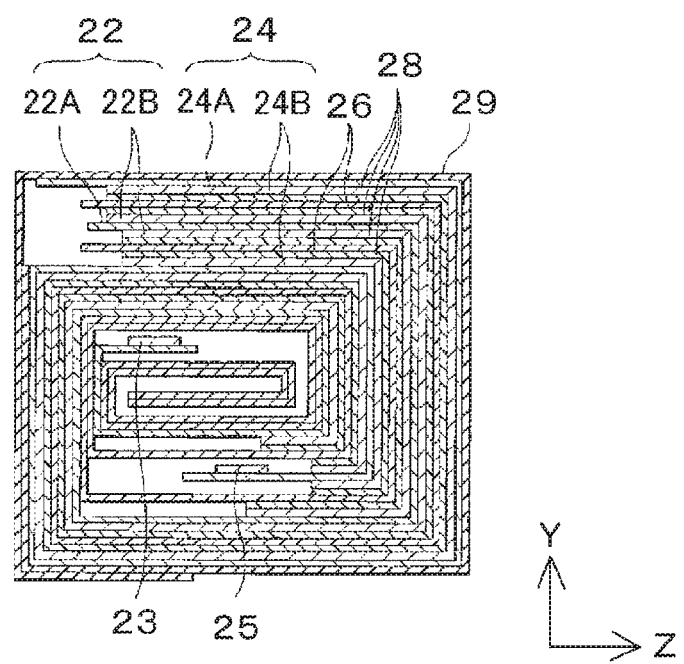
FIG. 6B is a schematic sectional view of a laminated electrode body in the laminated film type secondary battery (the lithium ion battery) of Example 2 along arrow A-A of FIG. 5 and FIG. 6A.

Example 2 is a modification of Example 1, is a planar laminated film type lithium ion battery in which a positive electrode member, a separator, and a negative electrode member are wound. FIG. 5 and FIG. 6A illustrate schematic exploded perspective views of the lithium ion battery, and FIG. 6B illustrates a schematic enlarged sectional view along arrow A-A of the laminated electrode body (the laminated structure body) illustrated in FIG. 1 and FIG. 6A (a schematic enlarged sectional view along a YZ plane). Further, a schematic partial sectional view enlargedly illustrating a part of the laminated electrode body illustrated in FIG. 6B (a schematic partial sectional view along an XY plane) is similar to that illustrated in FIG. 2A.

In the lithium ion battery of Example 2, the laminated electrode body 20 basically similar to that of Example 1 is stored in an exterior member 300 including a laminated film. The positive electrode member 22 and the negative electrode member 24 are laminated through the separator 26 and the electrolyte layer 28, and then, the laminated structure body is wound, and thus, the laminated electrode body 20 can be prepared. The positive electrode lead portion 23 is attached to the positive electrode member 22, and the negative electrode lead portion 25 is attached to the negative electrode member 24. The outermost circumference portion of the laminated electrode body 20 is protected with the protective tape 29.

The positive electrode lead portion 23 and the negative electrode lead portion 25 protrude towards the outside from the inside of the exterior member 300 in the same direction. The positive electrode lead portion 23 is formed of a conductive material such as aluminum. The negative electrode lead portion 25 is formed of a conductive material such as copper, nickel, and stainless steel. Such a conductive material, for example, is in the shape of a thin plate or a mesh.

The exterior member 300 is one film which can be folded back in a direction of an arrow R illustrated in FIG. 5, and a recess (an emboss) for storing the laminated electrode body 20 is provided in a part of the exterior member 300. The exterior member 300, for example, is a laminated film in which a fused layer, a metal layer, and a surface protective layer are laminated in this order. In a manufacturing process of the lithium ion battery, the exterior member 300 is folded back such that the fused layers face each other through the laminated electrode body 20, and then, outer circumferential edge portions of the fused layer are fused. Here, the exterior member 300 may be formed by bonding two laminated films through an adhesive agent or the like. The fused layer, for example, includes a film such as polyethylene and polypropylene. The metal layer, for example, includes an aluminum foil or the like. The surface protective layer, for example, includes nylon, polyethylene terephthalate, or the like. Among them, it is preferable that the exterior member 300 is an aluminum laminated film in which a polyethylene film, an aluminum foil, and a nylon film are laminated in this order. Here, the exterior member 300 may be a laminated film having other laminated structures, may be a polymer film such as polypropylene, or may be a metal film. Specifically, the exterior member 300 includes an aluminum laminated film (a total thickness of 100 µm) having humidity resistance in which a nylon film (a thickness of 30 µm), an aluminum foil (a thickness of 40 µm), and a non-stretched polypropylene film (a thickness of 30 µm) are laminated in this order from the outside.

A cohesive film 34 is inserted between the exterior member 300 and the positive electrode lead portion 23, and between the exterior member 300 and the negative electrode lead portion 25, in order to prevent the outside air from entering. The cohesive film 34 includes a material having cohesiveness with respect to the positive electrode lead portion 23 and the negative electrode lead portion 25, for example, a polyolefin resin, and more specifically, a polyolefin resin such as polyethylene, polypropylene, modified polyethylene, and modified polypropylene.

As illustrated in FIG. 6B, the positive electrode member 22 includes the positive electrode active material layer 22B on one surface or both surfaces of the positive electrode current collector 22A. In addition, the negative electrode member 24 includes the negative electrode active material layer 24B on one surface or both surfaces of the negative electrode current collector 24A.

Even through it is not illustrated, the suppressing member 31 is disposed in the portion where the positive electrode lead portion 23 is attached to the positive electrode current collector 22A, and in the portion where the negative electrode lead portion 25 is attached to the negative electrode current collector 24A, as with Example 1.

Example 3

In Example 3, an application example of the secondary battery of the present disclosure will be described.

The application of the secondary battery of the present disclosure is not particularly limited insofar being in as a machine, a device, an instrument, an apparatus, and a system (an assembly of a plurality of devices and the like) where the secondary battery of the present disclosure is capable of being used as a power source for driving or operating, or a power storage source for power storage. The secondary battery (specifically, the lithium ion battery) to be used as the power source may be a main power source (a power source to be preferentially used), or may be an auxiliary power source (a power source which is used instead of the main power source or is used by being switched from the main power source). In a case where the lithium ion battery is used as the auxiliary power source, the main power source is not limited to the lithium ion battery.

Specifically, the driving of a video camera or a camcorder, a digital still camera, a mobile phone, a personal computer, a television receiver, various display devices, various electronic devices such as a cordless phone, a headphone stereo, a music player, a portable radio, electronic paper such as an electronic book or electronic newspaper, and a portable information terminal including a personal digital assistant (PDA), and an electric device (including a portable electronic device); toys; a portable living appliance such as an electric shaver; a lighting instrument such as an interior light; a medical electronic device such as a pacemaker or an acoustic aid; a storage device such as a memory card; a battery pack to be used in a personal computer or the like as a detachable power source; an electric tool such as an electric drill or an electric saw; a power storage system or a home energy server (a domestic electric storage device) such as a domestic battery system which stores power for emergency; an electric storage unit or a backup power source; an electric car, an electric motorcycle, an electric bicycle, an electric vehicle such as Segway (registered trademark); and a power driving force conversion device of aircraft or a ship (specifically, for example, a power motor) can be exemplified as the application of the secondary battery (specifically, the lithium ion battery) of the present disclosure, but the application of the secondary battery of the present disclosure is not limited to such application.

Among them, the secondary battery (specifically, the lithium ion battery) of the present disclosure is effective to be applied to a battery pack, an electric vehicle, a power storage system, an electric tool, an electronic device, an electric device, and the like. Excellent battery characteristics are required, and thus, it is possible to effective improve performance by using the lithium ion battery of the present disclosure. The battery pack is a power source using the lithium ion battery, and is a so-called assembled battery or the like. The electric vehicle is a vehicle which operates (travels) by using the lithium ion battery as a driving power source, and may be a car (a hybrid car or the like) including a driving source other than the secondary battery. The power storage system is a system using the lithium ion battery as a power storage source. For example, in a domestic power storage system, power is stored in the lithium ion battery, which is a power storage source, and thus, a domestic electric product or the like can be used by using power. The electric tool is a tool in which a movable portion (for example, a drill or the like) is capable of being moved by using the lithium ion battery as a driving power source. The electronic device or the electric device is a device which exhibits various functions by using the lithium ion battery as an operating power source (a power supply source).

Hereinafter, several application examples of the lithium ion battery will be described in detail. Furthermore, the configuration of each of the application examples described below is merely an example, and the configuration can be suitably changed.

Figure 7:
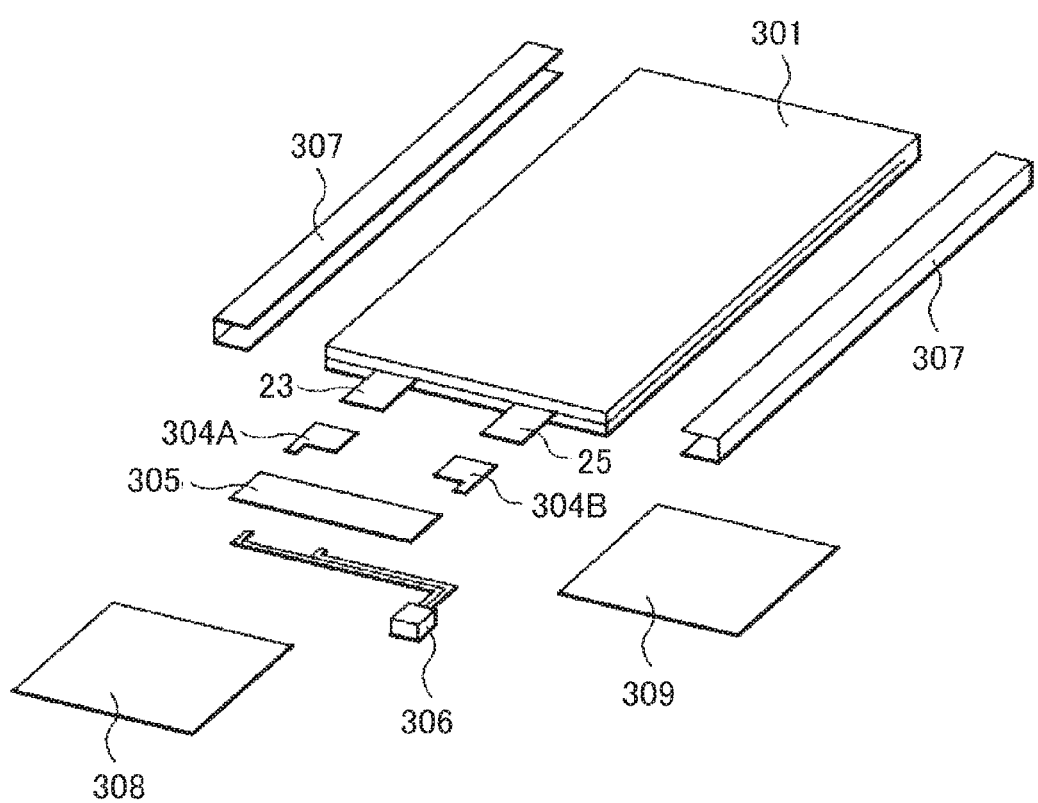
FIG. 7 is a schematic exploded perspective view of an application example (a battery pack: a single battery) of the secondary battery (the lithium ion battery) of the present disclosure in Example 1 and Example 2.
Figure 8A:
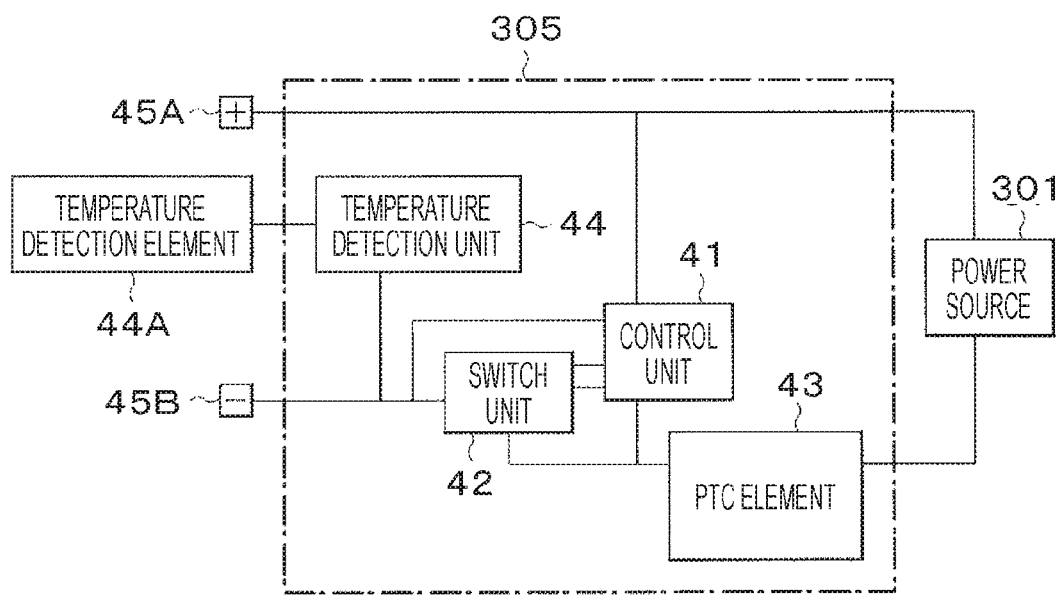
FIG. 8A and FIG. 8B are block diagrams illustrating a configuration of the application example (the battery pack: the single battery) of the present disclosure (the lithium ion battery) in Example 1 and Example 2 illustrated in FIG. 7.

FIG. 7 illustrates a schematic exploded perspective view of a battery pack using a single battery, and FIG. 8A illustrates a block diagram illustrating the configuration of the battery pack (the single battery). The battery pack is a simple battery pack (a so-called software pack) using one lithium ion battery, and for example, is mounted on an electronic device or the like represented by a smart phone. The battery pack includes a power source 301 including the lithium ion battery of Example 1 and Example 2 (in the illustrated example, Example 2), and a circuit substrate 305 connected to the power source 301. The positive electrode lead portion 23 and the negative electrode lead portion 25 are attached to the power source 301.

A pair of pressure-sensitive adhesive tapes 307 is stuck to both side surfaces of the power source 301. A protection circuit module (PCM) is disposed on the circuit substrate 305. The circuit substrate 305 is connected to the positive electrode lead portion 23 through a tab 304A, and is connected to the negative electrode lead portion 25 through a tab 304B. In addition, a lead line 306 with a connector for external connection is connected to the circuit substrate 305. In a state where the circuit substrate 305 is connected to the power source 301, the circuit substrate 305 is protected with a label 308 and an insulating sheet 309 from an upper portion and a lower portion. The circuit substrate 305 and the insulating sheet 309 are fixed to each other by sticking the label 308 thereto. The circuit substrate 305 includes a control unit 41, a switch unit 42, a PTC element 43, a temperature detection unit 44, and a temperature detection element 44A. The power source 301 can be connected to the outside through a positive electrode terminal 45A and a negative electrode terminal 45B, and is charged and discharged. The power source 301 is charged and discharged through the positive electrode terminal 45A and the negative electrode terminal 45B. The temperature detection unit 44 is capable of detecting a temperature through the temperature detection element 44A.

The control unit 41 controlling the entire operation of the battery pack (including a use state of the power source 301) includes a central processing unit (CPU), a memory, and the like. In a case where a battery voltage reaches an over charge detection voltage, the control unit 41 disconnects the switch unit 42, and thus, a charge current does not flow into a current pathway of the power source 301. In addition, in a case where a high current flows at the time of charge, the control unit 41 disconnects the switch unit 42, and blocks a charge current. In addition, in a case where a battery voltage reaches an over discharge detection voltage, the control unit 41 disconnects the switch unit 42, and thus, a discharge current does not flow into the current pathway of the power source 301. In addition, in a case where a high current flows at the time of discharge, the control unit 41 disconnects the switch unit 42, and blocks a discharge current.

The over charge detection voltage of the lithium ion battery, for example, is 4.20 volts±0.05 volts, and the over discharge detection voltage, for example, is 2.4 volts±0.1 volts.

The switch unit 42 switches the use state of the power source 301 (the presence or absence of the connection between the power source 301 and the external device) according to an instruction of the control unit 41. The switch unit 42 includes a charge control switch, a discharge control switch, and the like. The charge control switch and the discharge control switch, for example, include a semiconductor switch such as a field-effect transistor (MOSFET) using a metal oxide semiconductor. The charge and discharge current, for example, is detected on the basis of on resistance of the switch unit 42. The temperature detection unit 44 including the temperature detection element 44A such as a thermistor, measures the temperature of the power source 301, and outputs a measurement result to the control unit 41. The measurement result of the temperature detection unit 44 is used for charge and discharge control of the control unit 41 at the time of abnormal heat generation, correction processing at the time of calculating residual capacitance by the control unit 41, or the like. The circuit substrate 305 may not include the PTC element 43, and in this case, the PTC element may be separately disposed in the circuit substrate 305.

Figure 8B:
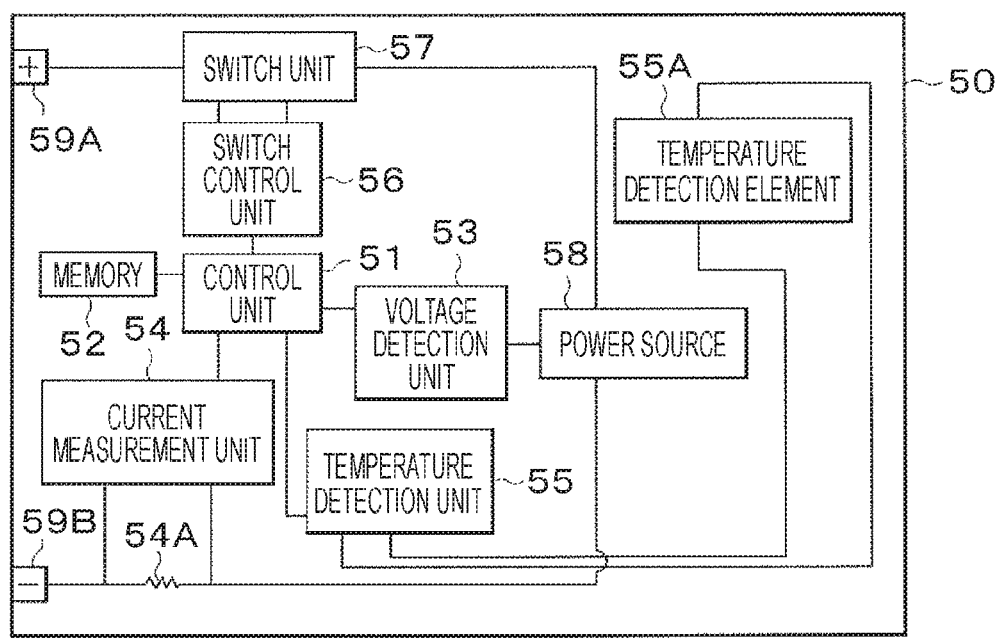

Next, FIG. 8B illustrates a block diagram illustrating a configuration of a battery pack (an assembled battery) which is different from that illustrated in FIG. 8A. Such a battery pack, for example, includes a control unit 51, a memory 52, a voltage detection unit 53, a current measurement unit 54, a current detection resistor 54A, a temperature detection unit 55, a temperature detection element 55A, a switch control unit 56, a switch unit 57, a power source 58, a positive electrode terminal 59A, and a negative electrode terminal 59B in a housing 50 prepared from a plastic material or the like.

The control unit 51 controls the entire operation of the battery pack (including a use state of the power source 58), and for example, includes a CPU or the like. The power source 58, for example, is an assembled battery including two or more lithium ion batteries (not illustrated) described in Example 1 and Example 2, and a connection manner of the lithium ion battery may be in series, may be in parallel, or may be in a mixed manner of series and parallel. The power source 58 includes six lithium ion batteries connected in 2-parallel and 3-series, as an example.

The switch unit 57 switches the use state of the power source 58 (the presence or absence of the connection between the power source 58 and the external device) according to an instruction of the control unit 51. The switch unit 57, for example, includes a charge control switch, a discharge control switch, a charging diode, and a discharging diode (all are not illustrated). The charge control switch and the discharge control switch, for example, include a semiconductor switch such as MOSFET.

The current measurement unit 54 measures a current by using the current detection resistor 54A, and outputs a measurement result to the control unit 51. The temperature detection unit 55 measures a temperature by using the temperature detection element 55A, and outputs a measurement result to the control unit 51. The temperature measurement result, for example, is used for charge and discharge control of the control unit 51 at the time of abnormal heat generation, correction processing at the time of calculating residual capacitance by the control unit 51, or the like. The voltage detection unit 53 measures the voltage of the lithium ion battery in the power source 58, performs analog-digital conversion with respect to the measured voltage, and supplies the converted voltage to the control unit 51.

The switch control unit 56 controls the operation of the switch unit 57 according to a signal input from the current measurement unit 54 and the voltage detection unit 53. For example, in a case where a battery voltage reaches an over charge detection voltage, the switch control unit 56 disconnects the switch unit 57 (the charge control switch), and performs control such that a charge current does not flow into a current pathway of the power source 58. Accordingly, in the power source 58, only discharge can be performed through the discharging diode. In addition, for example, in a case where a high current flows at the time of charge, the switch control unit 56 blocks the charge current. Further, for example, in a case where a battery voltage reaches an over discharge detection voltage, the switch control unit 56 disconnects the switch unit 57 (the discharge control switch), and a discharge current does not flow into the current pathway of the power source 58. Accordingly, in the power source 58, only charge can be performed through the charging diode. In addition, for example, in a case where a high current flows at the time of discharge, the switch control unit 56 blocks the discharge current.

The over charge detection voltage of the lithium ion battery, for example, is 4.20 volts±0.05 volts, and the over discharge detection voltage, for example, is 2.4 volts±0.1 volts.

The memory 52, for example, includes EEPROM or the like, which is a non-volatile memory. The memory 52, for example, stores a numerical value calculated by the control unit 51, information of the lithium ion battery measured in a manufacturing process step (for example, internal resistance of an initial state, or the like), and the like. In a case where full charge capacitance of the lithium ion battery is stored in the memory 52, it is possible for the control unit 51 to grasp information such as residual capacitance. The temperature detection element 55A including a thermistor and the like, measures the temperature of the power source 58, and outputs a measurement result to the control unit 51. The positive electrode terminal 59A and the negative electrode terminal 59B are a terminal connected to an external device operated by the battery pack (for example, a personal computer or the like), or an external device or the like used for charging the battery pack (for example, a charger or the like). The power source 58 is charged and discharged through the positive electrode terminal 59A and the negative electrode terminal 59B.

Figure 9A:
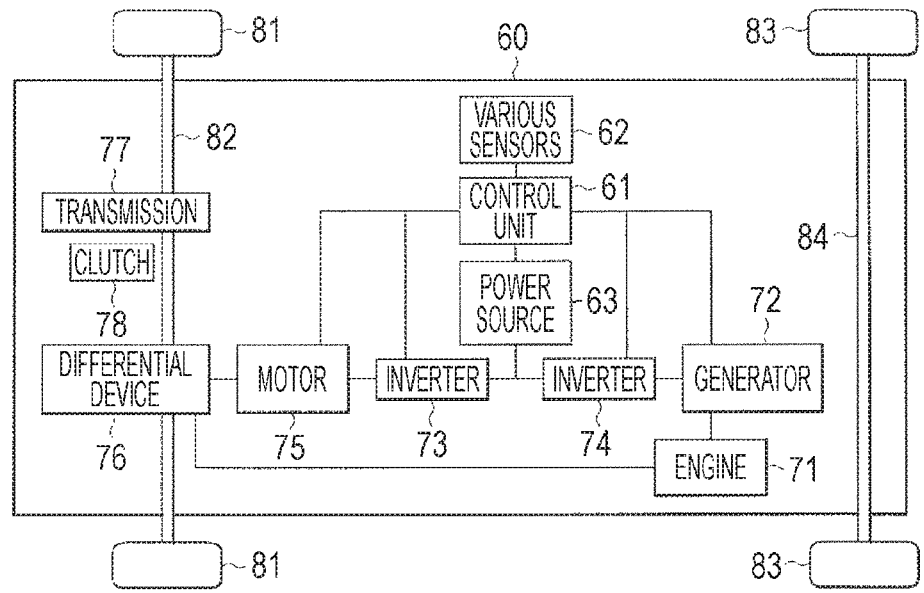
FIG. 9A, FIG. 9B, and FIG. 9C are respectively a block diagram illustrating the configuration of the application example (an electric vehicle) of the secondary battery (the lithium ion battery) of the present disclosure in Example 1 and Example 2, a block diagram illustrating the configuration of the application example (a power storage system) of the secondary battery (the lithium ion battery) of the present disclosure in Example 1 and Example 2, and a block diagram illustrating the configuration of the application example (an electric tool) of the secondary battery (the lithium ion battery) of the present disclosure in Example 1 and Example 2.

Next, FIG. 9A illustrates a block diagram illustrating a configuration of an electric vehicle such as a hybrid car, which is an example of an electric vehicle. The electric vehicle, for example, includes a control unit 61, various sensors 62, a power source 63, an engine 71, a generator 72, inverters 73 and 74, a driving motor 75, a differential device 76, a transmission 77, and a clutch 78 in a metal housing 60. In addition, the electric vehicle, for example, includes a driving shaft 81 for a front wheel, a front wheel 82, a driving shaft 83 for a rear wheel, and a rear wheel 84, which are connected to the differential device 76 or the transmission 77.

The electric vehicle, for example, is capable of traveling by using any one of the engine 71 and the motor 75 as a driving source. The engine 71 is a main power source, and for example, is a gasoline engine or the like. In a case where the engine 71 is used as a power source, a driving force (a rotative force) of the engine 71, for example, is transmitted to the front wheel 82 or the rear wheel 84 through the differential device 76, the transmission 77, and the clutch 78, which are a driving unit. The rotative force of the engine 71 is also transmitted to the generator 72, the generator 72 generates alternating current power by using the rotative force, and the alternating current power is converted into direct current power through the inverter 74, and is stored in the power source 63. On the other hand, in a case where the motor 75, which is a conversion unit, is used as a power source, power supplied from the power source 63 (direct current power) is converted into alternating current power through the inverter 73, and the motor 75 is driven by using the alternating current power. A driving force (a rotative force) converted from the power by the motor 75, for example, is transmitted to the front wheel 82 or the rear wheel 84 through the differential device 76, the transmission 77, and the clutch 78, which are the driving unit.

In a case where the electric vehicle is decelerated through a braking mechanism not illustrated, a resistance force at the time of deceleration may be transmitted to the motor 75 as a rotative force, and the motor 75 may generate an alternating current power by using the rotative force. The alternating current power is converted into direct current power through the inverter 73, and direct current regenerative power is stored in the power source 63.

The control unit 61 controls the entire operation of the electric vehicle, and for example, includes a CPU and the like. The power source 63 includes one or two or more lithium ion batteries (not illustrated) described in Example 1 and Example 2. The power source 63 is connected to an external power source, and receives power supplied from the external power source, and thus, it is possible to store power. The various sensors 62, for example, are used for controlling the number of rotations of the engine 71, and for controlling a position of a throttle valve (not illustrated) (a throttle position). The various sensors 62, for example, include a speed sensor, an acceleration sensor, an engine speed sensor, and the like.

Furthermore, a case where the electric vehicle is a hybrid car will be described, but the electric vehicle may be a vehicle (an electric vehicle) which is operated by using the power source 63 and the motor 75 without using the engine 71.

Figure 9B:
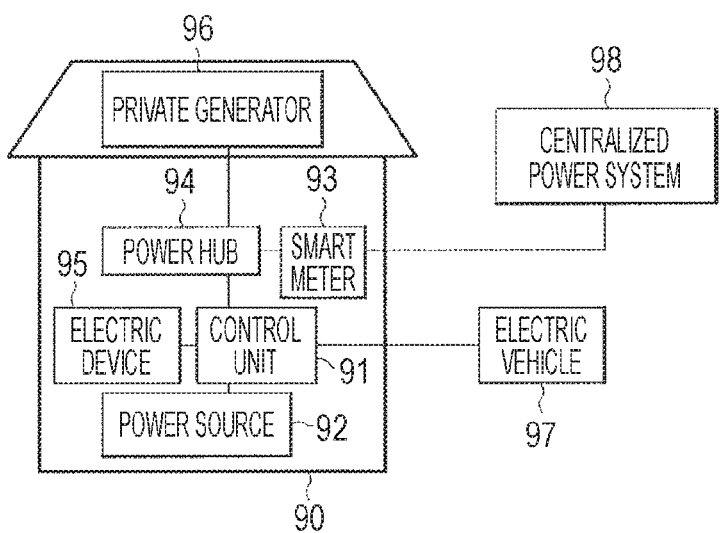

Next, FIG. 9B illustrates a block diagram of a configuration of a power storage system. The power storage system, for example, includes a control unit 91, a power source 92, a smart meter 93, and a power hub 94 in a residential building 90 such as a conventional home and a commercial building.

The power source 92, for example, is connected to an electric device (an electronic device) 95 disposed in the residential building 90, and is capable of being connected to the electric vehicle 97 which is parked outside the residential building 90. In addition, the power source 92, for example, is capable of being connected to a private generator 96 disposed in the residential building 90 through the power hub 94, and is capable of being connected to an external centralized power system 98 through the smart meter 93 and the power hub 94. The electric device (the electronic device) 95, for example, includes one or two or more home electric appliances. Examples of the home electric appliances are capable of including a refrigerator, an air conditioner, a television receiver, a water heater, and the like. The private generator 96, for example, includes a solar power generator, a wind generator, or the like. Examples of the electric vehicle 97 are capable of including an electric car, a hybrid car, an electric motorcycle, an electric bicycle, Segway (registered trademark), and the like. Examples of the centralized power system 98 are capable of including a commercial power source, a power generating device, a transmission network, and a smart grid (a next-generation transmission network), and of including a thermal power generating station, an atomic power generating station, a hydraulic power generating station, a wind power generating station, and the like, and various solar batteries, a fuel battery, a wind power generating device, a microhydraulic power generating device, a geothermal power generating device, and the like can be exemplified as the power generating device of the centralized power system 98, but the power generating device is not limited thereto.

The control unit 91 controls the entire operation of the power storage system (including a use state of the power source 92), and for example, includes a CPU and the like. The power source 92 includes one or two or more lithium ion batteries (not illustrated) described in Example 1 and Example 2. The smart meter 93, for example, is a network-compatible power meter disposed in the residential building 90 on a power demand side, and is capable of communicating with a power supply side. Then, the smart meter 93, for example, controls a balance between demand and supply of the residential building 90 while communicating with the outside, and thus, it is possible to efficiently supply stable energy.

In the power storage system, for example, power is stored in the power source 92 from the centralized power system 98, which is the external power source, through the smart meter 93 and the power hub 94, and power is stored in the power source 92 from the private generator 96, which is an independent power source, through the power hub 94. The power stored in the power source 92 is supplied to the electric device (the electronic device) 95 and the electric vehicle 97 according to an instruction of the control unit 91, and thus, the electric device (the electronic device) 95 can be operated, and the electric vehicle 97 can be charged. That is, the power storage system is a system which is capable of performing power storage and power supply in the residential building 90 by using the power source 92.

The power stored in the power source 92 can be arbitrarily used. For this reason, for example, power can be stored in the power source 92 from the centralized power system 98 at night when an electricity rate is low, and the power stored in the power source 92 can be used in the day time when the electricity rate is high.

The power storage system described above may be disposed in each single house (single-family), or may be disposed in each of a plurality of houses (multifamily).

Figure 9C:
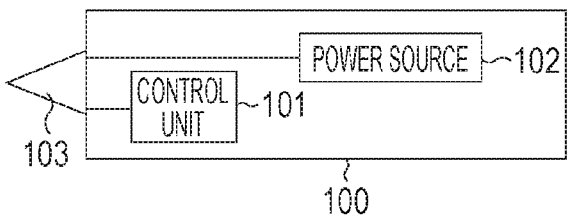

Next, FIG. 9C illustrates a block diagram illustrating a configuration of an electric tool. The electric tool, for example, is an electric drill, and includes a control unit 101 and a power source 102 in a tool main body 100 prepared from a plastic material or the like. For example, a drill portion 103, which is a movable portion, is rotatably attached to the tool main body 100. The control unit 101 controls the entire operation of the electric tool (including a use state of the power source 102), and for example, includes a CPU and the like. The power source 102 includes one or two or more lithium ion batteries (not illustrated) described in Example 1 and Example 2. The control unit 101 supplies power to the drill portion 103 from the power source 102 according to a manipulation of an operation switch (not illustrated).

As described above, the present disclosure has been described on the basis of the preferred examples, but the present disclosure is not limited to such examples, and is capable of including various modifications. The configuration and the structure of the lithium ion battery described in the examples are an example, and can be suitably changed. The laminated electrode body may be in a stacked state in addition to the wound state. In addition, the secondary battery is not limited to the lithium ion battery.

Hereinafter, the positive electrode member, the negative electrode member, the non-aqueous electrolytic solution, and the like configuring the lithium ion battery described above will be described in detail.

The details of the lithium-containing composite oxide and the lithium-containing phosphate compound, which are a preferred material configuring the positive electrode active material, are as follows. Furthermore, other elements configuring the lithium-containing composite oxide or the lithium-containing phosphate compound are not particularly limited, but examples of the other elements are capable of including one type or two or more types of elements belonging to a second group to a fifteenth group of a long-periodic table, and it is preferable to use nickel <Ni>, cobalt <Co>, manganese <Mn>, and iron <Fe> from the viewpoint of obtaining a high voltage.

Specifically, compounds represented by Formula (B), Formula (C), and Formula (D) can be exemplified as the lithium-containing composite oxide having a bedded salt type crystal structure.

$$Li_aMn_{1-b-c}Ni_bM^{11}_cO_{2-d}F_e \qquad (B)$$

Here, $M^{11}$ is at least one type of element selected from the group consisting of cobalt <Co>, magnesium <Mg>, aluminum <Al>, boron <B>, titanium <Ti>, vanadium <V>, chromium <Cr>, iron <Fe>, copper <Cu>, zinc <Zn>, zirconium <Zr>, molybdenum <Mo>, tin <Sn>, calcium <Ca>, strontium <Sr>, and tungsten <W>, and values of a, b, c, d, and e satisfy:

$$0.8 \leq a \leq 1.2;$$

$$0 < b < 0.5;$$

$$0 \leq c \leq 0.5;$$

$$b + c < 1;$$

$$-0.1 \leq d \leq 0.2; \text{ and}$$

$$0 \leq e \leq 0.1.$$

Here, a composition is different according to a charge and discharge state, and a is a value in a complete discharge state.

$$Li_aNi_{1-b}M^{12}_bO_{2-c}F_d \qquad (C)$$

Here, $M^{12}$ is at least one type of element selected from the group consisting of cobalt <Co>, manganese <Mn>, magnesium <Mg>, aluminum <Al>, boron <B>, titanium <Ti>, vanadium <V>, chromium <Cr>, iron <Fe>, copper <Cu>, zinc <Zn>, molybdenum <Mo>, tin <Sn>, calcium <Ca>, strontium <Sr>, and tungsten <W>, and values of a, b, c, and d satisfy:

$$0.8 \leq a \leq 1.2;$$

$$0.005 \leq b \leq 0.5;$$

$$-0.1 \leq c \leq 0.2; \text{ and}$$

$$0 \leq d \leq 0.1.$$

Here, a composition is different according to a charge and discharge state, and a is a value in a complete discharge state.

$$Li_aCo_{1-b}M^{13}_bO_{2-c}F_d \qquad (D)$$

Here, $M^{13}$ is at least one type of element selected from the group consisting of nickel <Ni>, manganese <Mn>, magnesium <Mg>, aluminum <Al>, boron <B>, titanium <Ti>, vanadium <V>, chromium <Cr>, iron <Fe>, copper <Cu>, zinc <Zn>, molybdenum <Mo>, tin <Sn>, calcium <Ca>, strontium <Sr>, and tungsten <W>, and values of a, b, c, and d satisfy:

$0.8 \leq a \leq 1.2$;

$0 \leq b < 0.5$;

$-0.1 \leq c \leq 0.2$; and $0 \leq d \leq 0.1$.

Here, a composition is different according to a charge and discharge state, and a is a value in a complete discharge state.

Specifically, $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$ can be exemplified as the lithium-containing composite oxide having a bedded salt type crystal structure.

In addition, a compound represented by Formula (E) can be exemplified as the lithium-containing composite oxide having a spinel type crystal structure.

$$Li_aMn_{2-b}M^{14}{}_bO_cF_d \qquad (E)$$

Here, $M^{14}$ is at least one type of element selected from the group consisting of cobalt <Co>, nickel <Ni>, magnesium <Mg>, aluminum <Al>, boron <B>, titanium <Ti>, vanadium <V>, chromium <Cr>, iron <Fe>, copper <Cu>, zinc <Zn>, molybdenum <Mo>, tin <Sn>, calcium <Ca>, strontium <Sr>, and tungsten <W>, and values of a, b, c, and d satisfy:

$0.9 \leq a \leq 1.1$;

$0 \leq b \leq 0.6$;

$3.7 \leq c \leq 4.1$; and $0 \leq d \leq 0.1$.

Here, a composition is different according to a charge and discharge state, and a is a value in a complete discharge state. Specifically, $LiMn_2O_4$ can be exemplified as the lithium-containing composite oxide having a spinel type crystal structure.

Further, a compound represented by Formula (F) can be exemplified as the lithium-containing phosphate compound having an olivine type crystal structure.

$$Li_aM^{15}PO_4 \qquad (F)$$

Here, $M^{15}$ is at least one type of element selected from the group consisting of cobalt <Co>, manganese <Mn>, iron <Fe>, nickel <Ni>, magnesium <Mg>, aluminum <Al>, boron <B>, titanium <Ti>, vanadium <V>, niobium <Nb>, copper <Cu>, zinc <Zn>, molybdenum <Mo>, calcium <Ca>, strontium <Sr>, tungsten <W>, and zirconium <Zr>, and a value of a satisfies:

$0.9 \leq a \leq 1.1$.

Here, a composition is different according to a charge and discharge state, and a is a value in a complete discharge state. Specifically, $LiFePO_4$, $LiMnPO_4$, $LiFe_{0.5}Mn_{0.5}PO_4$, $LiFe_{0.3}Mn_{0.7}PO_4$ can be exemplified as the lithium-containing phosphate compound having an olivine type crystal structure.

Alternatively, a compound represented by Formula (G) can be exemplified as the lithium-containing composite oxide.

$$(Li_2MnO_3)_x(LiMnO_2)_{1-x} \qquad (G)$$

Here, a value of x satisfies:

$0 \leq x \leq 1$.

Here, a composition is different according to a charge and discharge state, and x is a value in a complete discharge state.

Alternatively, examples of a metal sulfide or a metal oxide not containing lithium are capable of including $TiS_2$, $MoS_2$, $NbSe_2$, $V_2O_5$, and the like.

The positive electrode active material layer, for example, may further contain an oxide such as titanium oxide, vanadium oxide, and manganese dioxide; a disulfide such as titanium disulfide and molybdenum sulfide; a chalcogenide such as niobium selenide; and a conductive polymer such as sulfur, polyaniline, and polythiophene.

Specifically, a polymer material or the like, for example synthetic rubber such as styrene butadiene-based rubber, fluorine-based rubber, and ethylene propylene diene; a fluorine-based resin such as polyvinylidene fluoride, polyvinyl fluoride, polyimide, and polytetrafluoroethylene, can be exemplified as the binder of the positive electrode member and the negative electrode member. In addition, for example, a carbon material such as black lead, carbon black, graphite, acetylene black, and Ketjen black can be exemplified as the conductive agent of the positive electrode member and the negative electrode member, and a metal material, a conductive polymer, and the like can be used insofar as being a material having conductivity.

The details of a material configuring the negative electrode member are as follows.

Examples of a material configuring the negative electrode active material layer are capable of including a carbon material. In the carbon material, a change in a crystal structure at the time of occluding or releasing lithium is extremely small, and thus, a high energy density can be stably obtained. In addition, the carbon material also functions as the negative electrode conductive agent, and thus, the conductivity of the negative electrode active material layer is improved. Examples of the carbon material are capable of including easily graphitizable carbon (soft carbon), non-graphitizable carbon (hard carbon), black lead (graphite), and a high-crystalline carbon material in which a crystal structure is developed. Here, it is preferable that a surface separation of a (002) surface in non-graphitizable carbon is greater than or equal to 0.37 nm, and it is preferable that a surface separation of a (002) surface in black lead is less than or equal to 0.34 nm. More specifically, examples of the carbon material are capable of including pyrolytic carbons; cokes such as pitch coke, needle coke, and petroleum coke; black leads; a glass-like carbon fiber; an organic polymer compound calcined body which can be obtained by calcining (carbonizing) a polymer compound such as a phenolic resin and a furan resin at a suitable temperature; a carbon fiber; activated carbon; carbon blacks; a polymer such as polyacetylene, and the like. In addition, examples of the carbon material are capable of further including low-crystalline carbon which is subjected to a heat treatment at a temperature of approximately lower than or equal to 1000° C., and the carbon material can be amorphous carbon. The carbon material may be in the shape of any one of a fiber, a sphere, a granule, and a scale.

Alternatively, examples of the material configuring the negative electrode active material layer are capable of including a material containing one type or two or more types of elements of a metal element and semimetal element as a constituent element (hereinafter, referred to as a "metal-based material"), and thus, a high energy density can be obtained. The metal-based material may be any one of a single body, an alloy, and a compound, may be a material containing two or more types thereof, or may be a material having one type or two or more types of phases thereof in at least a part. The alloy also contains a material containing one or more types of metal elements and one or more types of semimetal elements in addition to the material containing two or more types of metal elements. In addition, the alloy may contain a non-metal element. Examples of the structure of the metal-based material are capable of including a solid solution, an eutectic (an eutectic mixture), an intermetallic compound, and a coexisting substance of two or more types thereof.

Examples of the metal element and the semimetal element are capable of including a metal element and a semimetal element, which are capable of forming an alloy with lithium. Specifically, for example, magnesium <Mg>, boron <B>, aluminum <Al>, gallium <Ga>, indium <In>, silicon <Si>, germanium <Ge>, tin <Sn>, lead <Pb>, antimony <Sb>, bismuth <Bi>, cadmium <Cd>, silver <Ag>, zinc <Zn>, hafnium <Hf>, zirconium <Zr>, yttrium <Y>, palladium <Pd>, and platinum <Pt> can be exemplified, and among them, silicon <Si> or tin <Sn> is preferable from the viewpoint of obtaining an excellent ability of occluding or releasing lithium and a significantly high energy density.

Examples of a material containing silicon as a constituent element are capable of including a single body of silicon, a silicon alloy, and a silicon compound, may be a material containing two or more types thereof, or may be a material having one type or two or more types of phases thereof in at least a part. Examples of a material containing tin as a constituent element are capable of including a single body of tin, a tin alloy, and a tin compound, may be a material containing two or more types thereof, or may be a material having one type or two or more types of phases thereof in at least a part. The single body indicates a single body in a general meaning, may contain a small amount of impurities, and does not necessarily indicate that a purity is 100%.

Examples of an element other than silicon, configuring the silicon alloy or the silicon compound are capable of including tin <Sn>, nickel <Ni>, copper <Cu>, iron <Fe>, cobalt <Co>, manganese <Mn>, zinc <Zn>, indium <In>, silver <Ag>, titanium <Ti>, germanium <Ge>, bismuth <Bi>, antimony <Sb>, and chromium <Cr>, and are also capable of including carbon <C> and oxygen <O>. Specifically, $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq 2$, preferably, $0.2<v<1.4$), and LiSiO can be exemplified as the silicon alloy or the silicon compound.

Examples of an element other than tin, configuring the tin alloy or the tin compound are capable of including silicon <Si>, nickel <Ni>, copper <Cu>, iron <Fe>, cobalt <Co>, manganese <Mn>, zinc <Zn>, indium <In>, silver <Ag>, titanium <Ti>, germanium <Ge>, bismuth <Bi>, antimony <Sb>, and chromium <Cr>, and are also capable of including carbon <C> and oxygen <O>. Specifically, $SnO_w$ ($0<w\leq 2$), $SnSiO_3$, LiSnO, and $Mg_2Sn$ can be exemplified as the tin alloy or the tin compound. In particular, it is preferable that a material containing tin as a constituent element, for example, is material containing a second constituent element and a third constituent element along with tin (a first constituent element) (hereinafter, referred to as an "Sn-containing material"). Examples of the second constituent element are capable of including cobalt <Co>, iron <Fe>, magnesium <Mg>, titanium <Ti>, vanadium <V>, chromium <Cr>, manganese <Mn>, nickel <Ni>, copper <Cu>, zinc <Zn>, gallium <Ga>, zirconium <Zr>, niobium <Nb>, molybdenum <Mo>, silver <Ag>, indium <In>, cesium <Ce>, hafnium <Hf>, tantalum <Ta>, tungsten <W>, bismuth <Bi>, and silicon <Si>, and examples of the third constituent element are capable of including boron <B>, carbon <C>, aluminum <Al>, and phosphorus <P>. In a case where the Sn-containing material contains the second constituent element and the third constituent element, high battery capacitance, excellent cycle characteristics, and the like can be obtained.

Among them, it is preferable that the Sn-containing material is a material containing tin <Sn>, cobalt <Co>, and carbon <C> as a constituent element (referred to as an "SnCoC-containing material"). In the SnCoC-containing material, for example, the content of carbon is 9.9 mass % to 29.7 mass %, and a content ratio of tin and cobalt {Co/(Sn+Co)} is 20 mass % to 70 mass %. This is because a high energy density can be obtained. The SnCoC-containing material has a phase including tin, cobalt, and carbon, and it is preferable that the phase is a low-crystalline or amorphous phase. The phase is a reaction phase which is capable of reacting with lithium, and thus, excellent characteristics can be obtained according to the reaction phase. It is preferable that a half width of a diffraction peak (a diffraction angle 2θ) obtained by X-ray diffraction of the reaction phase, is greater than or equal to 1 degree in a case where a CuKα ray is used as a specific X-ray, and an insertion rate is set to 1 degree/minute. This is because lithium is more smoothly occluded or released, and a reaction with the organic electrolytic solution or the non-aqueous electrolytic solution is reduced. There is a case where the SnCoC-containing material has a phase including a single body of each constituent element or a part thereof, in addition to the low-crystalline or amorphous phase.

Whether or not the diffraction peak obtained by the X-ray diffraction corresponds to the reaction phase which is capable of reacting with lithium, can be easily determined in a case of comparing X-ray diffraction charts before and after an electrochemical reaction with lithium. For example, in a case where there is a change in the position of the diffraction peak before and after the electrochemical reaction with lithium, it is determined that the diffraction peak corresponds to the reaction phase which is capable of reacting with lithium. In this case, for example, the diffraction peak of the low-crystalline or amorphous reaction phase appears in a range of 2θ=20 degrees to 50 degrees. It is considered that such a reaction phase, for example, includes each of the constituent elements described above, and is mainly subjected to low crystallization or amorphization due to the existence of carbon.

In the SnCoC-containing material, it is preferable that at least a part of carbon, which is a constituent element, is bonded to the metal element or the semimetal element. This is because aggregation and crystallization of tin or the like are suppressed. It is possible to confirm a bonding state of an element, for example, by using an X-ray photoelectron spectroscopy (XPS) using an Al-Kα ray, an Mg-Kα ray, or the like as a soft X-ray source. In a case where at least a part of carbon is bonded to the metal element, the semimetal element, or the like, a peak of a synthetic wave on a 1s orbit (C1s) of carbon appears in a region lower than 284.5 eV.

Furthermore, energy calibration is performed such that a peak of a 4f orbit (Au4f) of a gold atom is obtained at 84.0 eV. At this time, in general, surface contaminated carbon exists on a substance surface, and thus, a peak of C1s of surface contaminated carbon is set to 284.8 eV, and the peak is set to an energy standard. In the XPS measurement, a waveform of the peak of C1s is obtained in a form including a peak of surface contaminated carbon and a peak of carbon in the SnCoC-containing material. For this reason, for example, analysis may be performed by using commercially available software, and both peaks may be separated from each other. In the analysis of the waveform, a position of a main peak existing on the lowest bound energy side is set to an energy standard (284.8 eV).

The SnCoC-containing material is not limited to a material (SnCoC) where a constituent element is only tin, cobalt, and carbon. The SnCoC-containing material, for example, may contain one type or two or more types of silicon <Si>, iron <Fe>, nickel <Ni>, chromium <Cr>, indium <In>, niobium <Nb>, germanium <Ge>, titanium <Ti>, molybdenum <Mo>, aluminum <Al>, phosphorus <P>, gallium <Ga>, bismuth <Bi>, and the like as a constituent element, in addition to tin, cobalt, and carbon.

A material containing tin, cobalt, iron, and carbon as a constituent element (hereinafter, referred to as an "SnCoFeC-containing material") other than the SnCoC-containing material is also a preferred material. The composition of the SnCoFeC-containing material is arbitrary. As an example, in a case where the content of iron is set to be small, the content of carbon is 9.9 mass % to 29.7 mass %, the content of iron is 0.3 mass % to 5.9 mass %, and a content ratio of tin and cobalt {Co/(Sn+Co)} is 30 mass % to 70 mass %. In addition, in a case where the content of iron is set to be large, the content of carbon is 11.9 mass % to 29.7 mass %, a content ratio of tin, cobalt, and iron {(Co+Fe)/(Sn+Co+Fe)} is 26.4 mass % to 48.5 mass %, and a content ratio of cobalt and iron {Co/(Co+Fe)} is 9.9 mass % to 79.5 mass %. This is because, a high energy density can be obtained in such a composition range. Physical properties (a half width or the like) of the SnCoFeC-containing material are similar to the physical properties of the SnCoC-containing material described above.

In addition, examples of the material configuring the negative electrode active material layer are capable of including a metal oxide such as iron oxide, ruthenium oxide, and molybdenum oxide; and a polymer compound such as polyacetylene, polyaniline, and polypyrrole.

Among them, it is preferable that the material configuring the negative electrode active material layer includes both of a carbon material and a metal-based material, for the following reasons. That is, the metal-based material, in particular, a material containing at least one of silicon and tin as a constituent element, has an advantage that theoretical capacitance is high but easily vigorously expands or contracts at the time of charge and discharge. On the other hand, the carbon material has low theoretical capacitance, but has an advantage that the carbon material rarely expands or contracts at the time of charge and discharge. Accordingly, by using both of the carbon material and the metal-based material, the expansion or the contraction at the time of charge and discharge is suppressed while high theoretical capacitance (in other words, battery capacitance) is obtained.

As described above, the non-aqueous electrolytic solution suitable to be used in the lithium ion battery is not limited, but examples of the non-aqueous electrolytic solution are capable of including a non-aqueous electrolytic solution containing:

a compound represented by Formula (1);

at least one compound of a compound represented by Formula (2-A) and a compound represented by Formula (2-B); and at least one type of compound of compounds represented by Formula (3-A) to Formula (3-F).

Furthermore, it is desirable that the content of the compound represented by Formula (1) in the non-aqueous electrolytic solution is 2.5 mol/liter to 6 mol/liter, and is preferably 3 mol/liter to 6 mol/liter.

$$M^+[(Z^1Y^1)(Z^2Y^2)N]^- \quad (1)$$

Here, M is a metal element, and each of $Z^1$ and $Z^2$ is any one of a fluorine group <—F>, a monovalent hydrocarbon group, and a monovalent fluorinated hydrocarbon group, at least one of $Z^1$ and $Z^2$ is any one of a fluorine group <—F> and a monovalent fluorinated hydrocarbon group, and each of $Y^1$ and $Y^2$ is any one of a sulfonyl group <—S(=O)$_2$—> and a carbonyl group <—C(=O)—>.

$$R^1\text{—CN} \quad (2\text{-A})$$

$$R^2\text{—X—CN} \quad (2\text{-B})$$

Here, $R^1$ is a monovalent hydrocarbon group, $R^2$ is a monovalent hydrocarbon group, and X is a group in which one or two or more ether bonds <—O—> and one or two or more divalent hydrocarbon groups are bonded together in an arbitrary order.

(3-A)

(3-B)

(3-C)

(3-D)

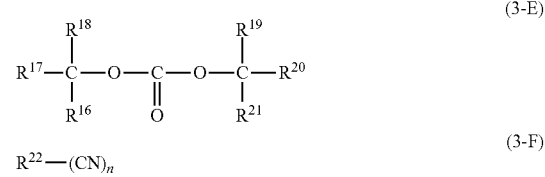

(3-E)

$$R^{22}\text{—(CN)}_n \quad (3\text{-F})$$

Here, in Formula (3-A), each of $R^3$ and $R^4$ is any one of a hydrogen group <—H> and a monovalent hydrocarbon group. In addition, in Formula (3-B), each of $R^5$, $R^6$, $R^7$, and $R^8$ is any one of a hydrogen group, a monovalent saturated hydrocarbon group, and a monovalent unsaturated hydrocarbon group, and at least one of $R^5$, $R^6$, $R^7$, and $R^8$ is a monovalent unsaturated hydrocarbon group. Further, in Formula (3-C), $R^9$ is a group represented by >$CR^{10}R^{11}$, and each of $R^{10}$ and $R^{11}$ is any one of a hydrogen group and a monovalent hydrocarbon group. In addition, in Formula (3-D), each of $R^{12}$, $R^{13}$, $R^{14}$, and $R^{15}$ is any one of a hydrogen group, a halogen group, a monovalent hydrocarbon group, and a monovalent halogenated hydrocarbon group, and at least one of $R^{12}$, $R^{13}$, $R^{14}$, and $R^{15}$ is any one of a halogen group and a monovalent halogenated hydrocarbon group. Further, in Formula (3-E), each of $R^{16}$, $R^{17}$, $R^{18}$, $R^{19}$, $R^{20}$, and $R^{21}$ is any one of a hydrogen group, a halogen group, a monovalent hydrocarbon group, and a monovalent halogenated hydrocarbon group, and at least one of $R^{16}$, $R^{17}$, $R^{18}$, $R^{19}$, $R^{20}$, and $R^{21}$ is any one of a halogen group and a monovalent halogenated hydrocarbon group. In addition, in Formula (3-F), $R^{22}$ is an n-valent (here, n is an integer of greater than or equal to 2) hydrocarbon group. Furthermore, ">C" and "C<" represent that two bonding hands extend from a carbon atom.

specifically, the non-aqueous electrolytic solution described above contains a first compound having a sulfonyl imide type structure, a second compound having an acetonitrile type structure, and a third compound having a reactive group such as an unsaturated hydrocarbon group. Here, the reason that the non-aqueous electrolytic solution has such a composition is because the following advantages can be obtained. That is, in a case where the non-aqueous electrolytic solution contains the first compound, the second compound, and the third compound together, and the content of the first compound in the non-aqueous electrolytic solution is within the range described above (2.5 mol/liter to 6 mol/liter), chemical stability of the non-aqueous electrolytic solution is uniquely improved, and a decomposition reaction of the non-aqueous electrolytic solution at the time of charge and discharge is suppressed, according to a synergistic interaction of the first compound, the second compound, and the third compound. Accordingly, discharge capacitance is rarely reduced even in a case where charge and discharge are repeated, and thus, it is possible to improve battery characteristics of the lithium ion battery. In particular, herein, whether or not a unique synergistic interaction is obtained depends on the content of the first compound. For this reason, the unique synergistic interaction is obtained only in a case where the content of the first compound is within the range described above.

The first compound contains one type or two or more types of compounds represented by Formula (1). The first compound is a salt having a cation ($M^+$) and an anion ($[(Z^1Y^1)(Z^2Y^2)N]^-$), and thus, is capable of functioning as a part of an electrolyte salt in the lithium ion battery.

In Formula (1), "M" is not particularly limited insofar as being a metal element, and an alkali metal element and an alkali earth metal element can be exemplified, and among them, it is preferable that "M" is the alkali metal element, and thus, a high energy density can be obtained. Examples of the alkali metal element are capable of including lithium <Li>, sodium <Na>, potassium <K>, rubidium <Rb>, cesium <Cs>, and the like, and among them, lithium <Li> is preferable. It is preferable that the alkali metal element is the same as the alkali metal element configuring the electrode reactive substance, and thus, a high energy density can be obtained. The electrode reactive substance is a substance relevant to an electrode reaction, and for example, is lithium in the lithium ion battery. For this reason, in a case where the electrode reactive substance is used the lithium ion battery, it is preferable that "M" is lithium.

$Z^1$ and $Z^2$ may be the same group, or may be different groups. The monovalent hydrocarbon group of $Z^1$ and $Z^2$ is a general term for a monovalent group configured of carbon <C> and hydrogen <H>, may be a linear monovalent hydrocarbon group, or may be a branched monovalent hydrocarbon group having one or two or more side chains. In addition, the monovalent saturated hydrocarbon group may be a saturated hydrocarbon group not having an unsaturated bond, or may be an unsaturated hydrocarbon group having one or two or more unsaturated bonds. The unsaturated bond is one or both of a carbon-carbon double bond (>C=C<) and carbon-carbon triple bond (—C≡C—).

Examples of the monovalent hydrocarbon group are capable of including an alkyl group, an alkenyl group, an alkynyl group, a cycloalkyl group, an aryl group, and a group in which two or more types thereof are bonded to have a monovalence. In other words, examples of the monovalent saturated hydrocarbon group are capable of including an alkyl group, a cycloalkyl group, and a group in which two or more types thereof are bonded to have a monovalence. Examples of the monovalent unsaturated hydrocarbon group are capable of including an alkenyl group, an alkynyl group, an aryl group, a group including one or more types thereof, and a group in which two or more types thereof are bonded to have a monovalence. A group in which an alkyl group and an alkenyl group are bonded together, a group in which alkyl group and an alkynyl group are bonded together, a group in which an alkenyl group and an alkynyl group are bonded together, a group in which an alkyl group and a cycloalkyl group are bonded together, and a group in which an alkyl group and an aryl group are bonded together can be exemplified as the group in which two or more types of groups are bonded together in the monovalent hydrocarbon group. A group in which an alkyl group and a cycloalkyl group are bonded together can be exemplified as the group in which two or more types of groups are bonded together in the monovalent saturated hydrocarbon group. A group in which an alkyl group and an alkenyl group are bonded together, and a group in which an alkyl group and an alkenyl group are bonded together can be exemplified as the group in which two or more types of groups are bond together in the monovalent unsaturated hydrocarbon group.

Specifically, a methyl group <—$CH_3$>, an ethyl group <—$C_2H_5$>, a propyl group <—$C_3H_7$>, an n-butyl group <—$C_4H_8$>, and a t-butyl group <—$C(CH_3)_2$—$CH_3$> can be exemplified as the alkyl group. Specifically, a vinyl group <—CH=$CH_2$> and an allyl group <—$CH_2$—CH=$CH_2$> can be exemplified as the alkenyl group. Specifically, an ethynyl group <—C≡CH> can be exemplified as the alkynyl group. Specifically, a cyclopropyl group, a cyclobutyl group, a cyclopentyl group, a cycloheptyl group, a cycloheptyl group, and a cyclooctyl group can be exemplified as the cycloalkyl group. Specifically, a phenyl group and a naphthyl group can be exemplified as the aryl group. Specifically, a group in which a methyl group and an ethynyl group are bonded together, a group in which a vinyl group and an ethynyl group are bonded together, a group in which a methyl group and a cyclopropyl group are bonded together, and a group in which a methyl group and a phenyl group are bonded together can be exemplified as the group in which two or more types of groups are bonded together.

The monovalent fluorinated hydrocarbon group is a group in which or two or more hydrogen groups <—H> are substituted with a fluorine group <—F> in the monovalent hydrocarbon group described above. Specifically, a fluorinated alkyl group, a fluorinated alkenyl group, a fluorinated alkynyl group, a fluorinated cycloalkyl group, a fluorinated aryl group, and a group in which two or more types thereof are bonded to have a monovalence can be exemplified as the monovalent fluorinated hydrocarbon group.

Specifically, a fluoromethyl group <—CH$_2$F>, a difluoromethyl group <—CHF$_2$>, a perfluoromethyl group <—CF$_3$>, a perfluoroethyl group <—C$_2$F$_5$>, a perfluoropropyl group <—C$_3$F$_7$>, an n-perfluorobutyl group <—C$_4$F$_8$>, and a t-perfluorobutyl group <—C(CF$_3$)$_2$—CF$_3$> can be exemplified as the fluorinated alkyl group. Specifically, a perfluorovinyl group <—CF=CF$_2$> and a perfluoroallyl group <—CF$_2$—CF=CF$_2$> can be exemplified as the fluorinated alkenyl group. Specifically, a perfluoroethynyl group <—F≡CF> can be exemplified as the fluorinated alkynyl group. Specifically, a perfluorocyclopropyl group, a perfluorocyclobutyl group, a perfluorocyclopentyl group, a perfluorocycloheptyl group, a perfluorocycloheptyl group, and a perfluorocyclooctyl group can be exemplified as the fluorinated cycloalkyl group. Specifically, a perfluorophenyl group and a perfluoronaphthyl group can be exemplified as the fluorinated aryl group. Among them, the fluorinated alkyl group, the fluorinated alkenyl group, the fluorinated alkynyl group, the fluorinated cycloalkyl group, and the fluorinated aryl group are preferably a perfluoro group, and are more preferably a perfluoroalkyl group. This is because synthesis can be easily performed, a synergistic interaction as described later can be easily obtained.

The number of carbon atoms of the monovalent hydrocarbon group and the monovalent fluorinated hydrocarbon group is not particularly limited, but it is preferable that the number of carbon atoms is not extremely large. This is because solubility, compatibility, and the like of the first compound are improved. Specifically, it is preferable that the number of carbon atoms of the fluorinated alkyl group is 1 to 4. It is preferable that the number of carbon atoms of the fluorinated alkenyl group and the fluorinated alkynyl group is 2 to 4. It is preferable that the number of carbon atoms of the fluorinated cycloalkyl group and the fluorinated aryl group is 6 to 12.

In Formula (1), one or both of $Z^1$ and $Z^2$ are any one of a fluorine group <—F> and a monovalent fluorinated hydrocarbon group. This is because synthesis can be easily performed, and the synergistic interaction as described later can be easily obtained. Accordingly, in a case where one of $Z^1$ and $Z^2$ is the monovalent hydrocarbon group, the other is any one of a fluorine group <—F> and a monovalent fluorinated hydrocarbon group. That is, both of $Z^1$ and $Z^2$ are not the monovalent hydrocarbon group.

In Formula (1), each of $Y^1$ and $Y^2$ is not particularly limited insofar as being any one of a sulfonyl group and a carbonyl group. $Y^1$ and $Y^2$ may be the same group, or may be different groups.

Specifically, bisfluorosulfonyl imide lithium <LiN(FSO$_2$)$_2$>, bistrifluoromethyl sulfonyl imide lithium <LiN(CF$_3$SO$_2$)$_2$>, fluorosulfonyl trifluoromethyl sulfonyl imide lithium <LiN(FSO$_2$)(CF$_3$SO$_2$)>, fluorosulfonyl pentafluoroethyl sulfonyl imide lithium <LiN(FSO$_2$)(C$_2$F$_5$SO$_2$)>, fluorosulfonyl nonafluorobutyl sulfonyl imide lithium <LiN(FSO$_2$)(C$_4$F$_9$SO$_2$)>, fluorosulfonyl phenyl sulfonyl imide lithium <LiN(FSO$_2$)(C$_6$H$_5$SO$_2$)>, fluorosulfonyl pentafluorophenyl sulfonyl imide lithium <LiN(FSO$_2$)(C$_6$F$_5$SO$_2$)>, fluorosulfonyl vinyl sulfonyl imide lithium <LiN(FSO$_2$)(C$_2$F$_3$SO$_2$)> can be exemplified as the first compound.

The second compound described above contains any one or both of the compounds represented by Formula (2-A) and Formula (2-B). Here, the second compound may contain two or more types of the compounds represented by Formula (2-A), or may contain two or more types of the compounds represented by Formula (2-B).

The compound represented by Formula (2-A) is a mononitrile compound not having an ether bond (a non-oxygen-containing mononitrile compound). $R^1$ is not particularly limited insofar as being a monovalent hydrocarbon group. The details of the monovalent hydrocarbon group are as described above. Specifically, acetonitrile <CH$_3$CN>, propionitrile <C$_3$H$_7$CN>, and butyronitrile <C$_4$H$_9$CN> can be exemplified as the non-oxygen-containing mononitrile compound.

The compound represented by Formula (2-B) is a mononitrile compound having an ether bond (an oxygen-containing mononitrile compound). $R^2$ is not particularly limited insofar as being a monovalent hydrocarbon group. The details of the monovalent hydrocarbon group are as described above. In "X" of Formula (2-B), the divalent hydrocarbon group is a general term for a divalent group configured of carbon and hydrogen, may be a linear divalent hydrocarbon group, or may be a branched divalent hydrocarbon group having one or two or more side chains. Specifically, an alkylene group, an alkenylene group, an alkynylene group, a cycloalkylene group, an arylene group, and a group in which two or more types thereof are bonded to have a divalence can be exemplified as the divalent hydrocarbon group. Specifically, a group in which an alkylene group and an alkenylene group are bonded together, a group in which an alkyl group and an alkynylene group are bonded together, a group in which an alkenylene group and an alkynylene group are bonded together, a group in which an alkylene group and a cycloalkylene group are bonded together, and a group in which an alkylene group and an arylene group are bonded together can be exemplified as the group in which two or more types of groups are bonded together.

Specifically, a methylene group <—CH$_2$—>, an ethylene group <—C$_2$H$_4$—>, a propylene group <—C$_3$H$_6$—>, an n-butylene group <—C$_4$H$_8$—>, and a t-butylene group <—C(CH$_3$)$_2$—CH$_2$—> can be exemplified as the alkylene group. Specifically, a vinylene group <—CH=CH—> and an allylene group <—CH$_2$—CH=CH—> can be exemplified as the alkenylene group. Specifically, an ethynylene group <—C≡C—> can be exemplified as the alkynylene group. Specifically, a cyclopropylene group, a cyclobutylene group, a cyclopentylene group, a cyclohexylene group, a cycloheptylene group, and a cyclooctylene group can be exemplified as the cycloalkylene group. Specifically, a phenylene group and a naphthylene group can be exemplified as the arylene group. Specifically, a group in which a methylene group and an ethynylene group are bonded together, a group in which a vinylene group and an ethynylene group are bonded together, a group in which a methylene group a cyclopropylene group are bonded together, and a group in which a methylene group a phenylene group are bonded together can be exemplified as the group in which two or more types of groups are bonded together.

The number of carbon atoms of the divalent hydrocarbon group is not particularly limited, but it is preferable that the number of carbon atoms is not extremely large. This is because the solubility, the compatibility, and the like of the second compound are improved. Specifically, it is preferable that the number of carbon atoms of the alkylene group is 1 to 4. It is preferable that the number of carbon atoms of the alkenylene group and the alkynylene group is 2 to 4. It is preferable that the number of carbon atoms of the cycloalkylene group and the arylene group is 6 to 12.

"X" is not particularly limited insofar as being a group in which one or two or more ether bonds and one or two or more divalent hydrocarbon groups are bonded together in an arbitrary order. That is, the number of ether bonds in "X" may be 1, or may be greater than or equal to 2. Similarly, the number of divalent hydrocarbon groups in "X" may be 1, or may be greater than or equal to 2. In a case where the number of divalent hydrocarbon groups is greater than or equal to 2, two or more divalent hydrocarbon groups may be the same group, or may be different groups. A part of two or more divalent hydrocarbon groups may be the same group. The order of bonding the ether bond and the divalent hydrocarbon group together may be arbitrary, and thus, the ether bonds may be bonded together, the divalent hydrocarbon groups may be bonded together, or the ether bond and the divalent hydrocarbon group may be bonded together.

Among them, it is preferable that "X" is a group represented by —O—Y— (Y is a divalent hydrocarbon group). This is because synthesis can be easily performed, and a synergistic interaction as described later can be easily obtained. The details of the divalent hydrocarbon group are as described above. Here, in X described herein (that is, —O—Y—), the ether bond (—O—) is bonded to $R^2$, and Y is bonded to the cyano group <—CN>. Specifically, —O—CH$_2$—, —CH$_2$—O—, —O—CH$_2$—O—, and —O—C$_2$H$_5$— can be exemplified as "X".

Methoxy acetonitrile <CH$_3$—O—CH$_2$—CN>, ethoxy acetonitrile <C$_2$H$_5$—O—CH$_2$—CN>, and propoxy acetonitrile <C$_3$H$_7$—O—CH$_2$—CN> can be exemplified as a specific example of the oxygen-containing mononitrile compound.

The content of the second compound in the non-aqueous electrolytic solution is not particularly limited, and for example, is preferably 20 mass % to 100 mass %. This is because the synergistic interaction as described later can be easily obtained. In a case the second compound contains both of the non-oxygen-containing mononitrile compound and the oxygen-containing mononitrile compound, the content of the second compound described above is the sum of the content of the non-oxygen-containing mononitrile compound and the content of the oxygen-containing mononitrile compound. As described above, the content indicates the sum in the following description.

The third compound described above contains one type or two or more types of unsaturated cyclic carbonate ester, halogenated cyclic carbonate ester, and polynitrile compound. Here, the third compound may contain two or more types of unsaturated cyclic carbonate esters. Containing two or more types of unsaturated cyclic carbonate esters is similar in the halogenated cyclic carbonate ester and the polynitrile compound.

The unsaturated cyclic carbonate ester contains one type or two or more types of compounds represented by Formula (3-A), Formula (3-B), and Formula (3-C). Here, the unsaturated cyclic carbonate ester is cyclic carbonate ester having one or two or more unsaturated bonds (carbon-carbon double bonds).

The compound represented by Formula (3-A) is a vinylene carbonate-based compound. Each of $R^3$ and $R^4$ is not particularly limited insofar as being any one of a hydrogen group and a monovalent hydrocarbon group. The details of the monovalent hydrocarbon group as described above. $R^3$ and $R^4$ may be the same group, or may be different groups.

Vinylene carbonate (1,3-dioxol-2-one), methyl vinylene carbonate (4-methyl-1,3-dioxol-2-one), ethyl vinylene carbonate (4-ethyl-1,3-dioxol-2-one), 4,5-dimethyl-1,3-dioxol-2-one, 4,5-diethyl-1,3-dioxol-2-one, 4-fluoro-1,3-dioxol-2-one, and 4-trifluoromethyl-1,3-dioxol-2-one can be exemplified as a specific example of the vinylene carbonate-based compound, and among them, vinylene carbonate is preferable from the viewpoint of being capable of easily performing synthesis.

The compound represented by Formula (3-B) is a vinyl ethylene carbonate-based compound. Each of $R^5$, $R^6$, $R^7$, and $R^8$ is not particularly limited insofar as being any one of a hydrogen group, a monovalent saturated hydrocarbon group, and a monovalent unsaturated hydrocarbon group. The details of the monovalent saturated hydrocarbon group and the monovalent unsaturated hydrocarbon group are as described above. Here, one or two or more of $R^5$, $R^6$, $R^7$, and $R^8$ are the monovalent unsaturated hydrocarbon group. This is because it is necessary for the vinyl ethylene carbonate-based compound to have one or two or more unsaturated bonds (carbon-carbon double bonds). $R^5$, $R^6$, $R^7$, and $R^8$ may be the same group, or may be different groups. A part of $R^5$, $R^6$, $R^7$, and $R^8$ may be the same group.

Specifically, vinyl ethylene carbonate (4-vinyl-1,3-dioxolan-2-one), 4-methyl-4-vinyl-1,3-dioxolan-2-one, 4-ethyl-4-vinyl-1,3-dioxolan-2-one, 4-n-propyl-4-vinyl-1,3-dioxolan-2-one, 5-methyl-4-vinyl-1,3-dioxolan-2-one, 4,4-divinyl-1,3-dioxolan-2-one, and 4,5-divinyl-1,3-dioxolan-2-one can be exemplified as the vinyl ethylene carbonate-based compound, and among them, vinyl ethylene carbonate is preferable from the viewpoint of being capable of easily performing synthesis.

The compound represented by Formula (3-C) is a methylene ethylene carbonate-based compound. $R^9$ is not particularly limited insofar as being a group represented by >CR$^{10}$R$^{11}$. The details of the monovalent hydrocarbon group are as described above. $R^{10}$ and $R^{11}$ may be the same group, or may be different groups.

Specifically, methylene ethylene carbonate (4-methylene-1,3-dioxolan-2-one), 4,4-dimethyl-5-methylene-1,3-dioxolan-2-one, and 4,4-diethyl-5-methylene-1,3-dioxolan-2-one can be exemplified as the methylene ethylene carbonate-based compound.

In addition, the unsaturated cyclic carbonate ester may be a compound having two methylene groups, or may be catechol carbonate having a benzene ring, or the like. In Formula (3-C), the compound having two methylene groups is a compound which has >C=CH$_2$ instead of >C=R$^9$ and has >C=CH$_2$ instead of >CH$_2$.

The content of the unsaturated cyclic carbonate ester in the non-aqueous electrolytic solution is not particularly limited, and for example, is preferable 0.01 mass % to 20 mass % with respect to the total excluding the unsaturated cyclic carbonate ester.

The halogenated cyclic carbonate ester contains one type or two or more types of compounds represented by Formula (3-D) and Formula (3-E). The halogenated carbonate ester is carbonate ester having one or two or more halogen groups.

The compound represented by Formula (3-D) is halogenated cyclic carbonate ester. $R^{12}$ to $R^{15}$ are not particularly limited insofar as being any one of a hydrogen group, a halogen group, a monovalent hydrocarbon group, and a monovalent halogenated hydrocarbon group. The details of the monovalent hydrocarbon group are as described above.

Here, one or two or more of $R^{12}$ to $R^{15}$ are any one of the halogen group and the monovalent halogenated hydrocarbon group. This is because it is necessary for the halogenated cyclic carbonate ester to have one or two or more halogen groups. $R^{12}$ to $R^{15}$ may be the same group, or may be different groups. A part of $R^{12}$ to $R^{15}$ may be the same group.

In the monovalent hydrocarbon group described above, the monovalent halogenated hydrocarbon group is a group in which one or two or more hydrogen groups are substituted with a halogen group. The halogen group is not particularly limited, and for example, is any one of a fluorine group <—F>, a chlorine group <—Cl>, a bromine group <—Br>, an iodine group <—I>, and the like, and among them, the fluorine group <—F> is preferable. This is because synthesis can be easily performed, and the synergistic interaction as described later can be easily obtained. The number of halogen groups is more preferably 2 than 1, and may be greater than or equal to 3. This is because a higher effect can be obtained.

Specifically, a halogenated alkyl group, a halogenated alkenyl group, a halogenated alkynyl group, a halogenated cycloalkyl group, a halogenated aryl group, and a group in which two or more types thereof are bonded to have a monovalence can be exemplified as the monovalent halogenated hydrocarbon group.

In the halogenated alkyl group, specific examples of the fluorinated alkyl group, the fluorinated alkenyl group, the fluorinated alkynyl group, the fluorinated cycloalkyl group, and the fluorinated aryl group are as described above. Specific examples of the chlorinated alkyl group, the brominated alkyl group, and the iodinated alkyl group are a compound in which the fluorine group in the specific example of the fluorinated alkyl group described above is changed to the chlorine group, the bromine group, and the iodine group. The fluorine group being changed to the chlorine group, the bromine group, and the iodine group is similar in the chlorinated alkenyl group, the chlorinated alkynyl group, the chlorinated cycloalkyl group, the chlorinated aryl group, the brominated alkenyl group, the brominated alkynyl group, the brominated cycloalkyl group, the brominated aryl group, the iodinated alkenyl group, the iodinated alkynyl group, the iodinated cycloalkyl group, and the iodinated aryl group.

4-fluoro-1,3-dioxolan-2-one, 4-chloro-1,3-dioxolan-2-one, 4,5-difluoro-1,3-dioxolan-2-one, tetrafluoro-1,3-dioxolan-2-one, 4-chloro-5-fluoro-1,3-dioxolan-2-one, 4,5-dichloro-1,3-oxolan-2-one, tetrachloro-1,3-dioxolan-2-one, 4,5-bistrifluoromethyl-1,3-dioxolan-2-one, 4-trifluoromethyl-1,3-dioxolan-2-one, 4,5-difluoro-4,5-dimethyl-1,3-dioxolan-2-one, 4,4-difluoro-5-methyl-1,3-dioxolan-2-one, 4-ethyl-5,5-difluoro-1,3-dioxolan-2-one, 4-fluoro-5-trifluoromethyl-1,3-dioxolan-2-one, 4-methyl-5-trifluoromethyl-1,3-dioxolan-2-one, 4-fluoro-4,5-dimethyl-1,3-dioxolan-2-one, 5-1,1-difluoroethyl-4,4-difluoro-1,3-dioxolan-2-one, 4,5-dichloroethyl-4,5-dimethyl-1,3-dioxolan-2-one, 4-ethyl-5-fluoro-1,3-dioxolan-2-one, 4-ethyl-4,5-difluoro-1,3-dioxolan-2-one, 4-ethyl-4,5,5-trifluoro-1,3-dioxolan-2-one, and 4-fluoro-4-methyl-1,3-dioxolan-2-one can be exemplified as a specific example of the halogenated cyclic carbonate ester. An isomer (a cis isomer and a trans isomer) is included in the specific example of the halogenated cyclic carbonate ester described herein.

The compound represented by Formula (3-E) is halogenated chain carbonate ester. $R^{16}$ to $R^{21}$ are not particularly limited insofar as any one of a hydrogen group, a halogen group, a monovalent hydrocarbon group, or a monovalent halogenated hydrocarbon group. The details of the monovalent hydrocarbon group and the monovalent halogenated hydrocarbon group are as described above. Here, one or two or more of $R^{16}$ to $R^{21}$ are any one of a halogen group and a monovalent halogenated hydrocarbon group for the reason similar to that of the halogenated cyclic carbonate ester described above. $R^{16}$ to $R^{21}$ may be the same group, or may be different groups. A part of $R^{16}$ to $R^{21}$ may be the same group. Specifically, fluoromethyl methyl carbonate, bisfluoromethyl carbonate, and difluoromethyl methyl carbonate can be exemplified as the halogenated chain carbonate ester. The content of the halogenated cyclic carbonate ester in the non-aqueous electrolytic solution is not particularly limited, and for example, is preferably 0.01 mass % to 20 mass % with respect to the total excluding the halogenated cyclic carbonate ester.

The polynitrile compound contains one type or two or more types of compounds represented by Formula (3-F). The polynitrile compound is a compound having two or more nitrile groups, and the second compound described above may not be contained in the polynitrile compound described herein. This is because the second compound does not have two or more nitrile groups.

$R^{22}$ is not particularly limited insofar as an n-valent hydrocarbon group. As an example, in a case where the number of carbon atoms of $R^{22}$ is 1, —$CH_2$— can be exemplified as a divalent hydrocarbon group, >CH— or the like can be exemplified as a trivalent hydrocarbon group. Similarly, in a case where the number of carbon atoms of $R^{22}$ is 2, —$CH_2$—$CH_2$— can be exemplified as a divalent hydrocarbon group, and >CH—$CH_2$— or the like can be exemplified as a trivalent hydrocarbon group. Among them, it is preferable that $R^{22}$ is a divalent hydrocarbon group. This is because the number of cyano groups <—CN> is 2, and thus, the synergistic interaction as described later can be easily obtained. The details of the divalent hydrocarbon group are as described above.

Specifically, malononitrile, succinonitrile, glutaronitrile, adiponitrile, pimelonitrile, suberonitrile, azelanitrile, sebaconitrile, undecane dinitrile, dodecane dinitrile, phthalonitrile, and tetracyanoquinodimethane can be exemplified as the polynitrile compound. The content of the polynitrile compound in the non-aqueous electrolytic solution is not particularly limited, and for example, is preferably 0.01 mass % to 10 mass % with respect to the total excluding the polynitrile compound.

The non-aqueous electrolytic solution may contain one type or two or more types of other materials in addition to the first compound, the second compound, and the third compound described above. Specifically, one type or two or more types of sulfonate ester, an acid anhydride, cyclic carboxylate ester (lactone), dialkyl sulfoxide, chain dicarbonate ester (refer to Formula (10) described below), aromatic carbonate ester (refer to Formula (11) described below), cyclic carbonate ester (refer to Formula (12) described below), chain monocarbonate ester (refer to Formula (13) described below), chain carboxylate ester (refer to Formula (14) described below), phosphate ester (refer to Formula (15) described below), lithium monofluorophosphate <$Li_2PO_3F$>, and lithium difluorophosphate <$LiPO_2F_2$> can be exemplified as the other materials.

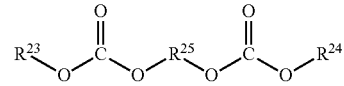

(10)

-continued

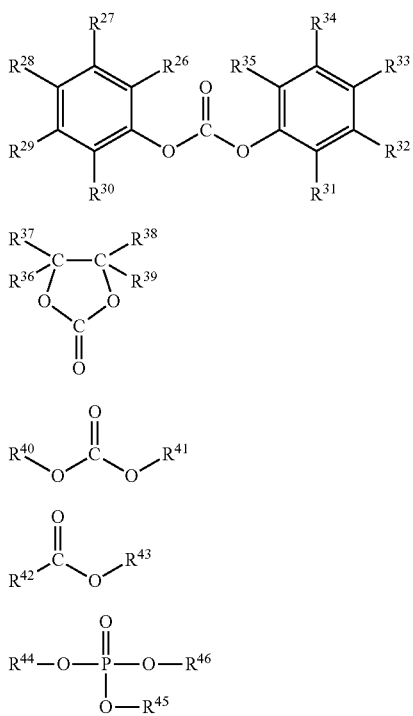

(11)

(12)

(13)

(14)

(15)

Here, each of $R^{23}$ and $R^{24}$ is any one of a monovalent hydrocarbon group and a monovalent halogenated hydrocarbon group, and $R^{25}$ is any one of a divalent hydrocarbon group and a divalent halogenated hydrocarbon group. In addition, each of $R^{26}$, $R^{27}$, $R^{28}$, $R^{29}$, $R^{30}$, $R^{31}$, $R^{32}$, $R^{33}$, $R^{34}$, and $R^{35}$ is any one of a monovalent hydrocarbon group, a monovalent oxygen-containing hydrocarbon group, a monovalent nitrogen-containing hydrocarbon group, a monovalent halogenated hydrocarbon group, a monovalent halogenated oxygen-containing hydrocarbon group, a monovalent halogenated nitrogen-containing hydrocarbon group, and a group in which two or more types thereof are bonded to have a monovalence. Further, each of $R^{36}$, $R^{37}$, $R^{38}$, and $R^{39}$ is any one of a hydrogen group and a monovalent hydrocarbon group. In addition, each of $R^{40}$ and $R^{41}$ is any one of a hydrogen group and a monovalent hydrocarbon group. Further, each of $R^{42}$ and $R^{43}$ is any one of a hydrogen group and a monovalent hydrocarbon group. In addition, each of $R^{44}$, $R^{45}$, and $R^{46}$ is any one of a monovalent hydrocarbon group and a monovalent halogenated hydrocarbon group.

Specifically, monosulfonate ester and disulfonate ester can be exemplified as the sulfonate ester. The content of the sulfonate ester in the non-aqueous electrolytic solution is not particularly limited, and for example, is preferably 0.01 mass % to 10 mass % with respect to the total excluding the sulfonate ester.

The monosulfonate ester may be cyclic monosulfonate ester, or may be chain monosulfonate ester. Specifically, sultone such as propane sultone and propene sultone can be exemplified as the cyclic monosulfonate ester. Specifically, a compound having a structure in which the cyclic monosulfonate ester is cut in the middle can be exemplified as the chain monosulfonate ester. As an example, $CH_3$—$CH_2$—$CH_2$—$SO_3$—$CH_3$ can be exemplified as a compound in which propane sultone is cut in the middle. The direction of —$SO_3$—(—$S(=O)_2$—$O$—) is not particularly limited. That is, $CH_3$—$CH_2$—$CH_2$—$SO_3$—$CH_3$ described above may be $CH_3$—$CH_2$—$CH_2$—$S(=O)_2$—$O$—$CH_3$, or may be $CH_3$—$CH_2$—$CH_2$—$O$—$S(=O)_2$—$CH_3$.

The disulfonate ester may be cyclic disulfonate ester, or may be chain disulfonate ester. Specifically, compounds represented by Formula (16-1), Formula (16-2), and Formula (16-3) can be exemplified as the cyclic disulfonate ester. The chain disulfonate ester is a compound in which the cyclic disulfonate ester is cut in the middle. Specifically, $CH_3$—$SO_3$—$CH_2$—$CH_2$—$SO_3$—$CH_3$ can be exemplified as a compound in which the compound represented by Formula (16-2) is cut in the middle. The direction of two —$SO_3$—(—$S(=O)_2$—$O$—)s is not particularly limited. That is, $CH_3$—$SO_3$—$CH_2$—$CH_2$—$SO_3$—$CH_3$ described above may be $CH_3$—$S(=O)_2$—$O$—$CH_2$—$CH_2$—$S(=O)_2$—$O$—$CH_3$, may be $CH_3$—$O$—$S(=O)_2$—$CH_2$—$CH_2$—$S(=O)_2$—$O$—$CH_3$, or may be $CH_3$—$S(=O)_2$—$O$—$CH_2$—$CH_2$—$O$—$S(=O)_2$—$CH_3$.

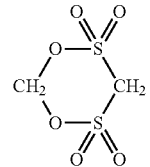

(16-1)

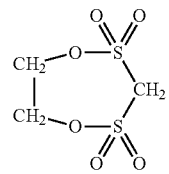

(16-2)

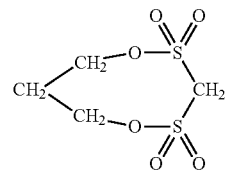

(16-3)

Specifically, a carboxylic anhydride such as a benzoic anhydride, a succinic anhydride, a glutaric anhydride, and a maleic anhydride; a disulfonate anhydride such as an ethane disulfonate anhydride and a propane disulfonate anhydride; and a carboxylate sulfonate anhydride such as a sulfobenzoic anhydride, a sulfopropionate anhydride, and a sulfobutyrate anhydride can be exemplified as the acid anhydride. The content of the acid anhydride in the non-aqueous electrolytic solution is not particularly limited, and for example, is preferably 0.01 mass % to 10 mass % with respect to the total excluding the acid anhydride.

Specifically, γ-butyrolactone and γ-valerolactone can be exemplified as the cyclic carboxylate ester. The content of the cyclic carboxylate ester in the non-aqueous electrolytic solution is not particularly limited, and for example, is preferably 0.01 mass % to 10 mass % with respect to the total excluding the cyclic carboxylate ester.

Specifically, dimethyl sulfoxide <$(CH_3)_2SO$> and diethyl sulfoxide <$(C_2H_5)_2SO$> can be exemplified as the dialkyl sulfoxide. The content of the dialkyl sulfoxide in the non-aqueous electrolytic solution is not particularly limited, and for example, is preferably 0.01 mass % to 10 mass % with respect to the total excluding the dialkyl sulfoxide.

The chain dicarbonate ester is one type or two or more types of the compounds represented by Formula (10)

described above. $R^{23}$ and $R^{24}$ are not particularly limited insofar as being any one of a monovalent hydrocarbon group and a monovalent halogenated hydrocarbon group. $R^{23}$ and $R^{24}$ may be the same group, or may be different groups. $R^{25}$ is not particularly limited insofar as being any one of a divalent hydrocarbon group and a divalent halogenated hydrocarbon group. The details of the monovalent hydrocarbon group and the monovalent halogenated hydrocarbon group are as described above. The divalent halogenated hydrocarbon group is a group in which one or two or more hydrogen groups of the divalent hydrocarbon group are substituted with a halogen group. The details of the divalent hydrocarbon group and the halogen group are as described above. Specifically, a perfluoromethylene group <—$CF_2$—>, a perfluoroethylene group <—$C_2F_4$—>, a perfluoropropylene group <—$C_3F_6$—>, an n-perfluorobutylene group <—$C_4F_8$—>, and a t-perfluorobutylene group <—C$(CF_3)_2$—$CF_2$—> can be exemplified as the divalent halogenated hydrocarbon group. Specifically, ethane-1,2-diyl dimethyl dicarbonate, ethane-1,2-diyl ethyl methyl dicarbonate, ethane-1,2-diyl diethyl dicarbonate, dimethyl oxybisethane-2,1-diyl dicarbonate, ethyl methyl oxybisethane-2,1-diyl dicarbonate, and diethyl oxybisethane-2,1-diyl dicarbonate can be exemplified as the chain dicarbonate ester. The content of the chain dicarbonate ester in the non-aqueous electrolytic solution is not particularly limited, and for example, is preferably 0.01 mass % to 10 mass % with respect to the total excluding the chain dicarbonate ester.

The aromatic carbonate ester is one type or two or more types of compounds of the compounds represented by Formula (11) described above. $R^{26}$ to $R^{35}$ are not particularly limited insofar as being any one of a monovalent hydrocarbon group, a monovalent oxygen-containing hydrocarbon group, a monovalent nitrogen-containing hydrocarbon group, a monovalent halogenated hydrocarbon group, a monovalent halogenated oxygen-containing hydrocarbon group, a monovalent halogenated nitrogen-containing hydrocarbon group, and a group in which two or more types thereof are bonded to have a monovalence. $R^{26}$ to $R^{35}$ may be the same group, or may be different groups. A part of $R^{26}$ to $R^{35}$ may be the same group. The details of the monovalent hydrocarbon group and the monovalent halogenated hydrocarbon group are as described above.

The monovalent oxygen-containing hydrocarbon group is a general term for a monovalent group configured of carbon, hydrogen, and oxygen, may be a linear monovalent oxygen-containing hydrocarbon group, or may be a branched monovalent oxygen-containing hydrocarbon group having one or two or more side chains. Specifically, an alkoxy group can be exemplified as the monovalent oxygen-containing hydrocarbon group, and specifically, a methoxy group <—$OCH_3$>, an ethoxy group <—$OC_2H_5$>, propoxy group <—$OC_3H_7$> can be exemplified as the alkoxy group.

The monovalent nitrogen-containing hydrocarbon group is a general term for a monovalent group configured of carbon, hydrogen, and nitrogen, may be a linear monovalent nitrogen-containing hydrocarbon group, or may be a branched monovalent nitrogen-containing hydrocarbon group having one or two or more side chains. Specifically, an amino group <—$NH_2$> can be exemplified as the monovalent nitrogen-containing hydrocarbon group.

The monovalent halogenated oxygen-containing hydrocarbon group is a group in which one or two or more hydrogen groups of the monovalent oxygen-containing hydrocarbon group are substituted with a halogen group. The details of the monovalent oxygen-containing hydrocarbon group and the halogen group are as described above. Specifically, a perfluoromethoxy group <—$OCF_3$—> and a perfluoroethoxy group <—$OC_2F_4$—> can be exemplified as the monovalent halogenated oxygen-containing hydrocarbon group.

The monovalent halogenated nitrogen-containing hydrocarbon group is a group in which one or two or more hydrogen groups of the monovalent nitrogen-containing hydrocarbon group are substituted with a halogen group. The details of the monovalent nitrogen-containing hydrocarbon group and the halogen group are as described above. Specifically, a perfluoroamino group <—$NF_2$> and a perfluoromethyl amino group <—$CF_2$—$NF_2$> can be exemplified as the monovalent halogenated nitrogen-containing hydrocarbon group.

Specifically, a group in which an alkyl group and an alkoxy group are bonded to have a monovalence (an alkyl alkoxy group) and a group in which an alkyl group and an amino group are bonded to have a monovalence (an alkyl amino group) can be exemplified as the group in which two or more types of groups are bonded together. Specifically, a methyl methoxy group <—$CH_2$—$OCH_3$> can be exemplified as the alkyl alkoxy group. Specifically, a methyl amino group <—$CH_2$—$NH_2$> can be exemplified as the alkyl amino group.

Specifically, diphenyl carbonate, bis4-methyl phenyl carbonate, bispentafluorophenyl carbonate can be exemplified as the aromatic carbonate ester.

The content of the aromatic carbonate ester in the non-aqueous electrolytic solution is not particularly limited, and for example, is preferably 0.01 mass % to 10 mass % with respect to the total excluding the aromatic carbonate ester.

The cyclic carbonate ester is one type or two or more types of compounds of the compounds represented by Formula (12) described above. $R^{36}$ to $R^{39}$ are not particularly limited insofar as being any one of a hydrogen group and a monovalent hydrocarbon group. $R^{36}$ to $R^{39}$ may be the same group, or may be different groups. A part of $R^{36}$ to $R^{39}$ may be the same group. The details of the monovalent hydrocarbon group are as described above. Specifically, ethylene carbonate, propylene carbonate, and butylene carbonate can be exemplified as the cyclic carbonate ester. The content of the cyclic carbonate ester in the non-aqueous electrolytic solution is not particularly limited, and for example, is preferably 0.01 mass % to 80 mass %.

The chain monocarbonate ester is one type or two or more types of compounds of the compounds represented by Formula (13) described above. $R^{40}$ and $R^{41}$ are not particularly limited insofar as being any one of a hydrogen group and a monovalent hydrocarbon group. $R^{40}$ and $R^{41}$ may be the same group, or may be different groups. A part of $R^{40}$ and $R^{41}$ may be the same group. The details of the monovalent hydrocarbon group are as described above. Specifically, dimethyl carbonate, diethyl carbonate, methyl ethyl carbonate, and methyl propyl carbonate can be exemplified as the chain monocarbonate ester. The content of the chain monocarbonate ester in the non-aqueous electrolytic solution is not particularly limited, and for example, is preferably 0.01 mass % to 70 mass %.

The chain carboxylate ester is one type or two or more types of compounds of the compounds represented by Formula (14) described above. $R^{42}$ and $R^{43}$ are not particularly limited insofar as being any one of a hydrogen group and a monovalent hydrocarbon group. $R^{42}$ and $R^{43}$ may be the same group, or may be different groups. The details of the monovalent hydrocarbon group are as described above. Specifically, methyl acetate, ethyl acetate, methyl propionate, ethyl propionate, methyl butyrate, methyl isobutyrate, trimethyl methyl acetate, and trimethyl ethyl acetate can be exemplified as the chain carboxylate ester. The content of the chain carboxylate ester in the non-aqueous electrolytic solution is not particularly limited, and for example, is preferably 0.01 mass % to 50 mass % with respect to the total excluding the chain carboxylate ester.

The phosphate ester is one type or two or more types of compounds of the compounds represented by Formula (15) described above. $R^{44}$ to $R^{46}$ are not particularly limited insofar as being any one of a monovalent hydrocarbon group and a monovalent halogenated hydrocarbon group. $R^{44}$ to $R^{46}$ may be the same group, or may be different groups. A part of $R^{44}$ to $R^{46}$ may be the same group. The details of the monovalent hydrocarbon group and the monovalent halogenated hydrocarbon group are as described above. Specifically, methyl phosphate, triethyl phosphate, trifluoroethyl phosphate, and tripropyl phosphate can be exemplified as the phosphate ester. The content of the phosphate ester in the non-aqueous electrolytic solution is not particularly limited, and for example, is preferably 0.01 mass % to 50 mass % with respect to the total excluding the phosphate ester.

Further, examples of the other materials are capable of including one type or two or more types of solvents such as a non-aqueous solvent (an organic solvent). Here, the other materials such as sulfonate ester described above is excluded from the non-aqueous solvent described herein.

In addition, for example, one type or two or more types of electrolyte salts such as a lithium salt can be exemplified as the other material. Here, the electrolyte salt, for example, may include a salt other than the lithium salt. The salt other than the lithium salt, for example, is a light metal salt or the like other than the lithium salt.

Hereinafter, the lithium salt will be described as a specific example of the electrolyte salt, but the lithium salt may be changed to the salt other than the lithium salt. That is, for example, lithium hexafluorophosphate described below may be changed to other light metal salts such as sodium hexafluorophosphate or potassium hexafluorophosphate.

Specifically, various lithium salts described above can be exemplified as the lithium salt, and thus, it is possible to decrease internal resistance. Among them, one type or two or more types of hexafluorophosphate lithium <$LiPF_6$>, tetrafluoroborate lithium <$LiBF_4$>, $LiB(C_6H_5)_4$, LiCl, LiBr, lithium perchlorate <$LiClO_4$>, lithium hexafluoroarsenate <$LiAsF_6$>, $CH_3SO_3Li$, $CF_3SO_3Li$, and $N(CnF_{2n+1}SO_2)_2Li$ are preferable. This is because the internal resistance further decreases. In particular, hexafluorophosphate lithium <$LiPF_6$> and tetrafluoroborate lithium <$LiBF_4$> are more preferable, and hexafluorophosphate lithium <$LiPF_6$> is even more preferable.

The electrolyte salt may be one type or two or more types of compounds represented by Formula (17), Formula (18), and Formula (19). $R^{51}$ and $R^{53}$ may be the same group, or may be different groups. The same applies to $R^{61}$, $R^{62}$, and $R^{63}$, and to $R^{71}$ and $R^{72}$. Two of $R^{61}$, $R^{62}$, and $R^{63}$ may be the same group.

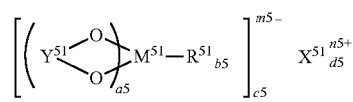

(17)

Here, $X^{51}$ is any one of a first group element, a second group element, and Al of a long-periodic table. $M^{51}$ is any one of a transition metal, and a thirteenth group element, a fourteenth group element, and a fifteenth group element of the long-periodic table. $R^{51}$ is a halogen group. In addition, $Y^{51}$ is any one of —C(=O)—$R^{52}$—C(=O)—, —C(=O)—$CR^{53}_2$—, and —C(=O)—C(=O)—. Here, $R^{52}$ is any one of an alkylene group, a halogenated alkylene group, an arylene group, and a halogenated arylene group, and $R^{53}$ is any one of an alkyl group, a halogenated alkyl group, an aryl group, and a halogenated aryl group. In addition, a5 is an integer of 1 to 4, b5 is any one of 0, 2, and 4, and c5, d5, m5, and n5 are an integer of 1 to 3.

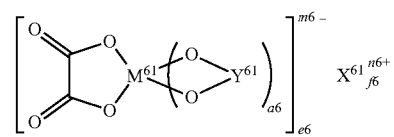

(18)

Here, $X^{61}$ is any one of a first group element and a second group element of the long-periodic table. $M^{61}$ is any one of a transition metal, and a thirteenth group element, a fourteenth group element, and a fifteenth group element of the long-periodic table. $Y^{61}$ is any one of —C(=O)—$(CR^{61}_2)_{b6}$—C(=O)—, —$R^{63}_2$C—$(CR^{62}_2)_{c6}$-C(=O)—$R^{63}_2$C—$(CR^{62}_2)_{c6}$—$CR^{63}_2$—, —$R^{63}_2$C—$(CR^{62}_2)_{c6}$—S(=O)$_2$—, —S(=O)$_2$—$(CR^{62}_2)_{d6}$—S(=O)$_2$—, and —C(=O)—$(CR^{62}_2)_{d6}$—S(=O)$_2$—. Here, each of $R^{61}$ and $R^{63}$ is any one of a hydrogen group, an alkyl group, a halogen group, and a halogenated alkyl group. Here, $R^{61}$ is any one of a halogen group and a halogenated alkyl group, and $R^{63}$ is any one of a halogen group and a halogenated alkyl group. $R^{62}$ is any one of a hydrogen group, an alkyl group, a halogen group, and a halogenated alkyl group. In addition, a6, e6, and n6 are an integer of 1 or 2, b6 and d6 are an integer of 1 to 4, c6 is an integer of 0 to 4, and f6 and m6 are an integer of 1 to 3.

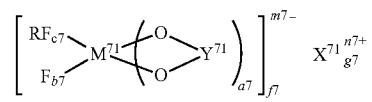

(19)

Here, $X^{71}$ is any one of a first group element and a second group element of the long-periodic table. $M^{71}$ is any one of a transition metal, and a thirteenth group element, a fourteenth group element, and a fifteenth group element of the long-periodic table. $R_f$ is any one of a fluorinated alkyl group and a fluorinated aryl group, and the number of carbon atoms of the fluorinated alkyl group and the fluorinated aryl group is 1 to 10. $Y^{71}$ is any one of —C(=O)—$(CR^{71}_2)_{d7}$—C(=O)—$R^{72}_2$C—$(CR^{71}_2)_{d7}$—C(=O)—$R^{72}_2$C—$(CR^{71}_2)_{d7}$—$CR^{72}_2$—, —$R^{72}_2$C—$(CR^{71}_2)_{d7}$—S(=O)$_2$—, —S(=O)$_2$—$(CR^{71}_2)_{e7}$—S(=O)$_2$—, and —C(=O)—$(CR^{71}_2)_{e7}$—S(=O)$_2$—. Here, $R^{71}$ is any one of a hydrogen group, an alkyl group, a halogen group, and a halogenated alkyl group, $R^{72}$ is any one of a hydrogen group, an alkyl group, a halogen group, and a halogenated alkyl group, and $R^{72}$ is any one of a halogen group and a halogenated alkyl group. In addition, a7, f7, and n7 are an integer of 1 or 2, b7, c7, and e7 are an integer of 1 to 4, d7 is an integer of 0 to 4, and g7 and m7 are an integer of 1 to 3.

The first group element is hydrogen <H>, lithium <Li>, sodium <Na>, potassium <K>, rubidium <Rb>, cesium <Cs>, and francium <Fr>. The second group element is beryllium <Be>, magnesium <Mg>, calcium <Ca>, strontium <Sr>, barium <Ba>, and radium <Ra>. The thirteenth group element is boron <B>, aluminum <Al>, gallium <Ga>, indium <In>, and thallium <Tl>. The fourteenth group element is carbon <C>, silicon <Si>, germanium <Ge>, tin <Sn>, and lead <Pb>. The fifteenth group element is nitrogen <N>, phosphorus <P>, arsenic <As>, antimony <Sb>, and bismuth <Bi>.

Specifically, compounds represented by Formula (17-1) to Formula (17-6) can be exemplified as the compound represented by Formula (17). Specifically, compounds represented by Formula (18-1) to Formula (18-8) can be exemplified as the compound represented by Formula (18). Specifically, compounds represented by Formula (19-1) can be exemplified as the compound represented by Formula (19).

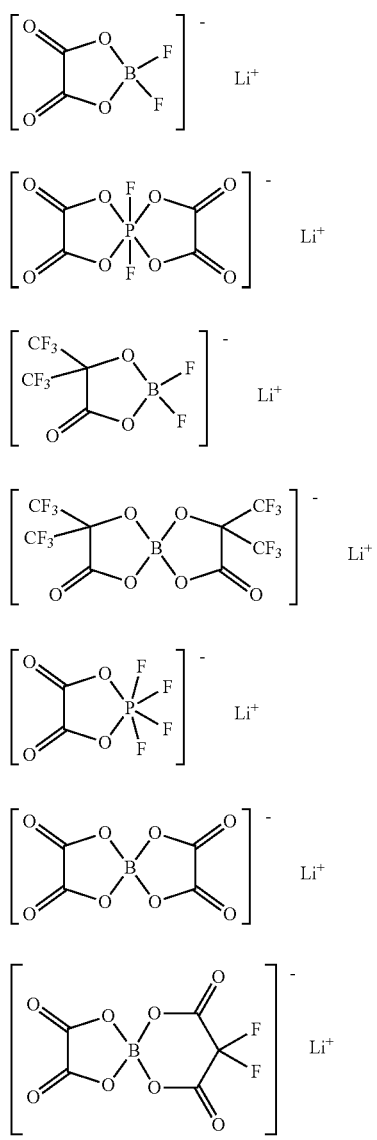

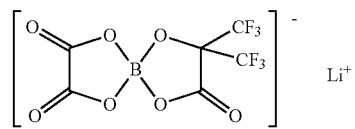

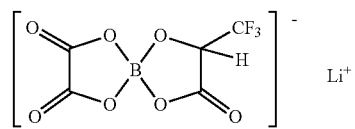

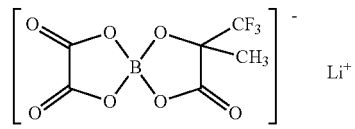

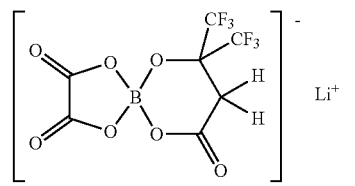

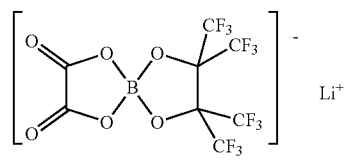

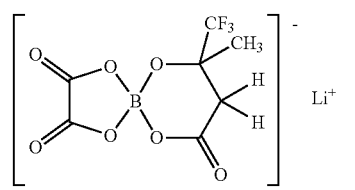

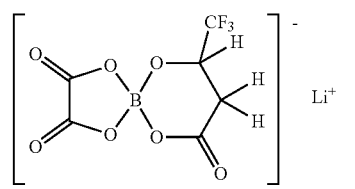

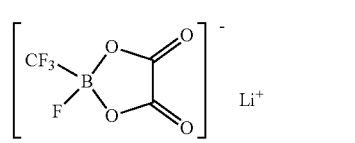

In addition, compounds represented by Formula (20) or Formula (21) can be exemplified as the electrolyte salt. p, q, and r may be the same value, or may be different values. Two of p, q, and r may be the same value.

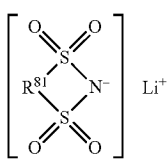
(20)

Here, $R^{81}$ is a linear or branched perfluoroalkylene group having 2 to 4 carbon atoms.

$$LiC(C_pF_{2p+1}SO_2)(C_qF_{2q+1}SO_2)(C_rF_{2r+1}SO_2) \quad (21)$$

Here, p, q, and r are integers of greater than or equal to 1.

The compound represented by Formula (20) is a cyclic imide compound. Specifically, compounds represented by Formula (20-1) to Formula (20-4) can be exemplified as the cyclic imide compound.

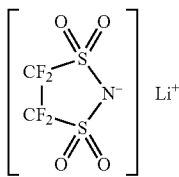
(20-1)

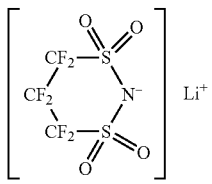
(20-2)

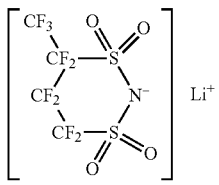
(20-3)

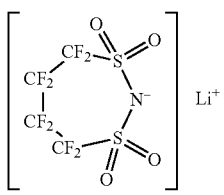
(20-4)

The compound represented by Formula (21) is a chain methide compound. Specifically, lithium tristrifluoromethane sulfonyl methide <LiC(CF$_3$SO$_2$)$_3$> can be exemplified as the chain methide compound.

The content of the electrolyte salt is not particularly limited, but is preferably 0.3 mol/kg to 3.0 mol/kg with respect to a solvent, from the viewpoint of obtaining high ion conductivity. In a case where the content of the electrolyte salt is calculated, the amount of electrolyte salt may include the amount of the first compound, the lithium monofluorophosphate, and the lithium difluorophosphate described above. In addition, the amount of the solvent may include the amount of the second compound, the third compound, the sulfonate ester, the acid anhydride, the cyclic carboxylate ester, the dialkyl sulfoxide, the chain dicarbonate ester, the aromatic carbonate ester, the cyclic carbonate ester, the chain monocarbonate ester, the chain carboxylate ester, and the phosphate ester.

An intrinsic viscosity of the non-aqueous electrolytic solution is not particularly limited, but is preferably less than or equal to 10 mPa/s at 25° C., from the viewpoint of ensuring dissociativity and an ion mobility of the electrolyte salt or the like.

In particular, in a case where the non-aqueous electrolytic solution contains one type or two or more types of the sulfonate ester, the acid anhydride, the cyclic carboxylate ester, the dialkyl sulfoxide, the chain dicarbonate ester, the aromatic carbonate ester, the cyclic carbonate ester, the chain monocarbonate ester, the chain carboxylate ester, the phosphate ester, the lithium monofluorophosphate, and the lithium difluorophosphate, it is possible to obtain a higher effect.

In addition, in a case where the non-aqueous electrolytic solution contains at least one of the lithium hexafluorophosphate and the lithium tetrafluoroborate, it is possible to obtain a higher effect.

Furthermore, the following configurations can be adopted in the present disclosure.

[A01] <<Secondary Battery>>

A secondary battery, including at least:

a laminated electrode body in which an electrode member and a separator are laminated, in which a suppressing member suppressing a movement of the separator with respect to the electrode member is disposed between a portion of the electrode member and a portion of the separator, in an uneven portion existing in the laminated electrode body.

[A02] The secondary battery according to [A01], in which the suppressing member includes a tape-like base material, and an adhesive layer disposed on one surface of the base material, and the suppressing member adheres to the laminated electrode body through the adhesive layer.

[A03] The secondary battery according to [A02], further including:

an electrolytic solution, in which the other surface of the base material exhibits pressure-sensitive adhesiveness by being in contact with the electrolytic solution, and the other surface of the base material pressure-sensitively adheres to the separator.

[A04] The secondary battery according to [A02], further including:

an electrolytic solution, in which the other surface of the base material swells by being in contact with the electrolytic solution, and the other surface of the base material coheres to the separator.

[A05] The secondary battery according to any one of [A01] to [A04], further including:

a laminated electrode body storage member, in which a strip-like laminated electrode body is stored in the laminated electrode body storage member in a wound state.

[A06] The secondary battery according to [A05], in which an outer shape of the laminated electrode body storage member is a cylindrical shape or a square shape.

[A07] The secondary battery according to any one of [A01] to [A06], further including:

a lead portion attached to the laminated electrode body, in which the lead portion is included in the uneven portion, and the suppressing member is disposed between the portion of the electrode member and the lead portion, and the portion of the separator, in the uneven portion.

[A08] The secondary battery according to any one of [A01] to [A06], further including:

a lead portion attached to the laminated electrode body, in which the uneven portion is positioned in the vicinity of the portion of the electrode member to which the lead portion is attached.

[A09] The secondary battery according to any one of [A01] to [A08], further including:

a lead portion attached to the laminated electrode body, in which the lead portion includes a positive electrode lead portion attached to a positive electrode current collector and a negative electrode lead portion attached to a negative electrode current collector.

[A010] The secondary battery according to any one of [A01] to [A09], in which in the laminated electrode body, a positive electrode member in which a positive electrode active material layer is formed on a positive electrode current collector, and a negative electrode member in which a negative electrode active material layer is formed on a negative electrode current collector, are laminated through the separator.

[A11] The secondary battery according to [A05] or [A06], in which an end portion of the laminated electrode body is included in the uneven portion.

[A12] The secondary battery according to any one of [A01] to [A04], in which in the laminated electrode body, a positive electrode member in which a positive electrode active material layer is formed on a positive electrode current collector, and a negative electrode member in which a negative electrode active material layer is formed on a negative electrode current collector, are laminated through the separator, the laminated electrode body further includes a lead portion including a positive electrode lead portion attached to the positive electrode current collector and a negative electrode lead portion attached to the negative electrode current collector, and a laminated electrode body storage member, the laminated electrode body is stored in the laminated electrode body storage member in a wound state, the positive electrode lead portion is attached to a portion of the positive electrode current collector positioned by being separated from an end portion of the positive electrode member, and the suppressing member is disposed between the positive electrode lead portion, the portion of the positive electrode current collector positioned in the vicinity of the positive electrode lead portion, and a portion of the positive electrode active material layer adjacent to the portion of the positive electrode current collector positioned in the vicinity of the positive electrode lead portion, and the separator.

[A13] The secondary battery according to any one of [A01] to [A04], in which in the laminated electrode body, a positive electrode member in which a positive electrode active material layer is formed on a positive electrode current collector, a negative electrode member in which a negative electrode active material layer is formed on a negative electrode current collector, are laminated through the separator, the laminated electrode body further includes a lead portion including a positive electrode lead portion attached to the positive electrode current collector and a negative electrode lead portion attached to the negative electrode current collector, and a laminated electrode body storage member, the laminated electrode body is stored in the laminated electrode body storage member in a wound state, an end portion of the laminated electrode body includes an end portion of the negative electrode current collector, and when a direction separated from the end portion of the laminated electrode body is set to an inside direction, an end portion of the negative electrode active material layer is disposed by being separated from the end portion of the negative electrode current collector in the inside direction, an end portion of the positive electrode active material layer and an end portion of the positive electrode current collector are disposed by being separated from the end portion of the negative electrode active material layer in the inside direction, the negative electrode lead portion is attached in the vicinity of the end portion of the negative electrode current collector, and the suppressing member is disposed between a region between the negative electrode lead portion and the end portion of the negative electrode active material layer, and the separator.

[B01] The secondary battery according to any one of [A01] to [A13], in which the electrolyte includes a non-aqueous electrolytic solution, the non-aqueous electrolytic solution includes a compound represented by Formula (1), at least one compound of a compound represented by Formula (2-A) and a compound represented by Formula (2-B), and at least one type of compound of compounds represented by Formula (3-A) to Formula (3-F), and the content of the compound represented by Formula (1) is 2.5 mol/liter to 6 mol/liter, and is preferably 3 mol/liter to 6 mol/liter.

$M^+ \ [(Z^1Y^1)(Z^2Y^2)N]^-$ \hfill (1)

$R^1-CN$ \hfill (2-A)

$R^2-X-CN$ \hfill (2-B)

(3-A)

(3-B)

(3-C)

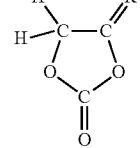

-continued

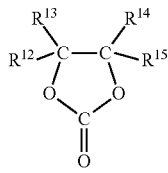
(3-D)

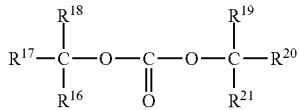
(3-E)

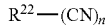
(3-F)

Here, in Formula (1), M is a metal element, each of $Z^1$ and $Z^2$ is any one of a fluorine group, a monovalent hydrocarbon group, and a monovalent fluorinated hydrocarbon group, at least one of $Z^1$ and $Z^2$ is any one of a fluorine group and a monovalent fluorinated hydrocarbon group, and each of $Y^1$ and $Y^2$ is any one of a sulfonyl group and a carbonyl group, in Formula (2-A), $R^1$ is a monovalent hydrocarbon group, in Formula (2-B), $R^2$ is a monovalent hydrocarbon group, and X is a group in which one or two or more ether bonds and one or two or more divalent hydrocarbon groups are bonded together in an arbitrary order, in Formula (3-A), each of $R^3$ and $R^4$ is any one of a hydrogen group and a monovalent hydrocarbon group, in Formula (3-B), each of $R^5$, $R^6$, $R^7$, and $R^8$ is any one of a hydrogen group, a monovalent saturated hydrocarbon group, and a monovalent unsaturated hydrocarbon group, and at least one of $R^5$, $R^6$, $R^7$, and $R^8$ is a monovalent unsaturated hydrocarbon group, in Formula (3-C), $R^9$ is a group represented by $>CR^{10}R^{11}$, and each of $R^{10}$ and $R^{11}$ is any one of a hydrogen group and a monovalent hydrocarbon group, in Formula (3-D), each of $R^{12}$, $R^{13}$, $R^{14}$, and $R^{15}$ is any one of a hydrogen group, a halogen group, a monovalent hydrocarbon group, and a monovalent halogenated hydrocarbon group, and at least one of $R^{12}$, $R^{13}$, $R^{14}$, and $R^{15}$ is any one of a halogen group and a monovalent halogenated hydrocarbon group, in Formula (3-E), each of $R^{16}$, $R^{17}$, $R^{18}$, $R^{19}$, $R^{20}$, and $R^{21}$ is any one of a hydrogen group, a halogen group, a monovalent hydrocarbon group, and a monovalent halogenated hydrocarbon group, and at least one of $R^{16}$, $R^{17}$, $R^{18}$, $R^{19}$, $R^{20}$, and $R^{21}$ is any one of a halogen group and a monovalent halogenated hydrocarbon group, and in Formula (3-F), $R^{22}$ is an n-valent (here, n is an integer of greater than or equal to 2) hydrocarbon group.

[B02] The secondary battery according to [B01], in which M is an alkali metal element, the monovalent hydrocarbon group is any one of an alkyl group, an alkenyl group, an alkynyl group, a cycloalkyl group, an aryl group, and a group in which two or more types thereof are bonded to have a monovalence, the monovalent fluorinated hydrocarbon group is a group in which at least one hydrogen group of the monovalent hydrocarbon group is substituted with a fluorine group, the divalent hydrocarbon group is any one of an alkylene group, an alkenylene group, an alkynylene group, a cycloalkylene group, an arylene group, and a group in which two or more types thereof are bonded together, the monovalent saturated hydrocarbon group is any one of an alkyl group, a cycloalkyl group, and a group in which such groups are bonded to have a monovalence, the monovalent unsaturated hydrocarbon group is any one of an alkenyl group, an alkynyl group, an aryl group, a group having one or more types thereof, and a group in which two or more types thereof are bonded to have a monovalence, the halogen group is any one of a fluorine group, a chlorine group, a bromine group, and an iodine group, and the monovalent halogenated hydrocarbon group is a group in which at least one hydrogen group of the monovalent hydrocarbon group is substituted with a halogen group.

[B03] The secondary battery according to [B01] or [B02], in which M is lithium, the monovalent fluorinated hydrocarbon group is a perfluoroalkyl group, and X is a group represented by —O—Y— (here, Y is a divalent hydrocarbon group).

[B04] The secondary battery according to any one of [B01] to [B03], in which the non-aqueous electrolytic solution contains at least one type of sulfonate ester, an acid anhydride, cyclic carboxylate ester, dialkyl sulfoxide, compounds represented by Formula (10) to Formula (15), lithium monofluorophosphate, and lithium difluorophosphate.

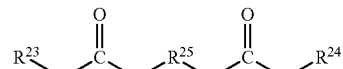
(10)

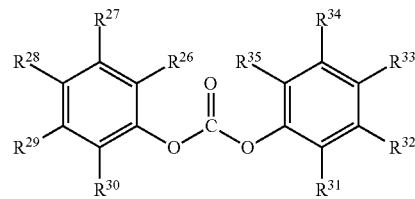
(11)

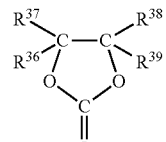
(12)

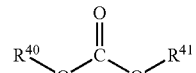
(13)

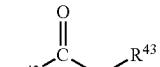
(14)

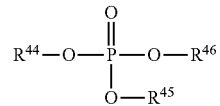
(15)

Here, each of $R^{23}$ and $R^{24}$ is any one of a monovalent hydrocarbon group and a monovalent halogenated hydrocarbon group, $R^{25}$ is any one of a divalent hydrocarbon group and a divalent halogenated hydrocarbon group, each of $R^{26}$, $R^{27}$, $R^{28}$, $R^{29}$, $R^{30}$, $R^{31}$, $R^{32}$, $R^{33}$, $R^{34}$, and $R^{35}$ is any one of a monovalent hydrocarbon group, a monovalent oxygen-containing hydrocarbon group, a monovalent nitrogen-containing hydrocarbon group, a monovalent halogenated hydrocarbon group, a monovalent halogenated oxygen-containing hydrocarbon group, a monovalent halogenated nitrogen-containing hydrocarbon group, and a group in which two or more types thereof are bonded to have a monovalence, each of $R^{36}$, $R^{37}$, $R^{38}$, and $R^{39}$ is any one of a hydrogen group and a monovalent hydrocarbon group, each of $R^{40}$ and $R^{41}$ is any one of a hydrogen group and a monovalent hydrocarbon group, each of $R^{42}$ and $R^{43}$ is any one of a hydrogen group and a monovalent hydrocarbon group, and each of $R^{44}$, $R^{45}$, and $R^{46}$ is any one of a monovalent hydrocarbon group and a monovalent halogenated hydrocarbon group.

[B05] secondary battery according to [B04], in which the divalent halogenated hydrocarbon group is a group in which at least one hydrogen group of the divalent hydrocarbon group is substituted with a halogen group, the halogen group is any one of a fluorine group, a chlorine group, a bromine group, and an iodine group, the monovalent oxygen-containing hydrocarbon group is an alkoxy group, the monovalent nitrogen-containing hydrocarbon group is an alkyl amino group, the monovalent halogenated oxygen-containing hydrocarbon group is a group in which at least one hydrogen group of the monovalent oxygen-containing hydrocarbon group is substituted with a halogen group, and the monovalent halogenated nitrogen-containing hydrocarbon group is a group in which at least one hydrogen group of the monovalent nitrogen-containing hydrocarbon group is substituted with a halogen group.

[B06] The secondary battery according to any one of [B01] to [B05], in which the non-aqueous electrolytic solution contains at least one of lithium hexafluorophosphate and lithium tetrafluoroborate.

[B07] The secondary battery according to any one of [B01] to [B06], in which the positive electrode contains a positive electrode active material which is capable of occluding or releasing an electrode reactive substance, the negative electrode contains a negative electrode active material which is capable of occluding or releasing the electrode reactive substance, an insulating material is provided between the positive electrode active material and the negative electrode active material, and the insulating material contains at least one of insulating ceramics and an insulating polymer compound.

[B08] The secondary battery according to [B07], in which the insulating ceramics contain at least one type of aluminum oxide, silicon oxide, magnesium oxide, titanium oxide, and zirconium oxide, and the insulating polymer compound contains at least one of a homopolymer and a copolymer of vinylidene fluoride.

[B09] The secondary battery according to [B07] or [B08], in which a first insulating layer containing the insulating material is disposed on a front surface of the positive electrode active material.

[B10] The secondary battery according to [B07] or [B08], in which a second insulating layer containing the insulating material is disposed on a front surface of the negative electrode.

[C01] <<Battery Pack>>
A battery pack, including: the secondary battery according to any one of [A01] to [B10]; a control unit controlling an operation of the secondary battery; and a switch unit switching the operation of the secondary battery according to an instruction of the control unit.

[C02] <<Electric Vehicle>>
An electric vehicle, including: the secondary battery according to any one of [A01] to [B10]; a conversion unit converting power supplied from the secondary battery into a driving force; a driving unit driven by the driving force; and a control unit controlling an operation of the secondary battery.

[C03] <<Power Storage System>>
A power storage system, including: the secondary battery according to any one of [A01] to [B10]; one or two or more electric devices to which power is supplied from the secondary battery; and a control unit controlling power supplied to the electric device from the secondary battery.

[C04] <<Electric Tool>>
An electric tool, including: the secondary battery according to any one of [A01] to [B10]; and a movable portion to which power is supplied from the secondary battery.

[C05] <<Electronic Device>>
An electronic device, including the secondary battery according to any one of [A01] to [B10] as a power supply source.

REFERENCE SIGNS LIST

11 Laminated electrode body storage member
12, 13 Insulating plate
14 Battery lid
15 Safety valve mechanism
15A Disk plate
16 Positive temperature coefficient element (PTC element)
17 Gasket
18 Center pin
20 Laminated electrode body
20A, 20B Portion of electrode member in which uneven portion exists
20C Portion of electrode member in which uneven portion does not exist
21 Electrode member
21A Portion of electrode member in uneven portion
21B Portion of electrode member to which lead portion is attached
22 Positive electrode member
22A Positive electrode current collector
122A Portion of positive electrode current collector positioned by being separated from end portion of positive electrode member
122a End portion of positive electrode current collector
22B Positive electrode active material layer
122B Portion of positive electrode active material layer adjacent to portion of positive electrode current collector
122b End portion of positive electrode active material layer
23 Positive electrode lead portion
24 Negative electrode member
24A Negative electrode current collector
124A Portion of negative electrode current collector positioned between negative electrode lead portion and end portion of negative electrode active material layer
124a End portion of negative electrode current collector
24B Negative electrode active material layer
124b End portion of negative electrode active material layer
25 Negative electrode lead portion
26 Separator
26A, 26B Portion of separator in which uneven portion exists
27A, 27B Uneven portion
28 Electrolyte layer
29 Protective tape
31, 31A, 31A', 31B Suppressing member (movement preventing member)
32 Base material
32A One surface of base material 32B The other surface of base material
33 Adhesive layer (adhesive agent layer)
34 cohesive film
41 Control unit
42 Switch unit
43 PTC element
44 Temperature detection unit
44A Temperature detection element
45A Positive electrode terminal
45B Negative electrode terminal
50 Housing
51 Control unit
52 Memory
53 Voltage detection unit
54 Current measurement unit
54A Current detection resistor
55 Temperature detection unit
55A Temperature detection element
56 Switch control unit
57 Switch unit
58 Power source
59A Positive electrode terminal
59B Negative electrode terminal
60 Housing
61 Control unit
62 Various sensors
63 Power source
71 Engine
72 Generator
73, 74 Inverter
75 Motor
76 Differential device
77 Transmission
78 Clutch
81 Driving shaft for front wheel
82 Front wheel
83 Driving shaft for rear wheel
84 Rear wheel
90 Residential building
91 Control unit
92 Power source
93 Smart meter
94 Power hub
95 Electric device (electronic device)
96 Private generator
97 Electric vehicle
98 Centralized power system
100 Tool main body
101 Control unit
102 Power source
103 Drill portion
222A Positive electrode active material
222B Active material insulating layer
224 Negative electrode insulating layer
301 Power source
304A, 304B Tab
305 Circuit substrate
306 Lead line with connector
307 Pressure-sensitive adhesive tape
308 Label
309 Insulating sheet

The invention claimed is:

1. A secondary battery, comprising:
a laminated electrode body including a positive electrode member, a negative electrode member, a separator provided between the positive electrode member and the negative electrode member, a positive electrode lead portion, and a suppressing member being configured to suppress a movement of the separator, wherein
the positive electrode member includes a positive electrode active material layer formed on a positive electrode current collector,
the positive electrode lead portion attached to the positive electrode current collector, and
the suppressing member is disposed between the positive electrode lead portion and the separator, between a first portion of the positive electrode current collector positioned in vicinity of the positive electrode lead portion and the separator, and between a second portion of the positive electrode active material layer adjacent to the first portion and the separator, respectively.

2. The secondary battery according to claim 1, wherein the suppressing member includes a tape-like base material, and an adhesive layer disposed on one surface of the base material.

3. The secondary battery according to claim 2, further comprising:
an electrolytic solution,
wherein an other surface of the base material exhibits adhesiveness by being in contact with the electrolytic solution, and the other surface of the base material adheres to the separator.

4. The secondary battery according to claim 2, further comprising:
an electrolytic solution,
wherein an other surface of the base material swells by being in contact with the electrolytic solution, and the other surface of the base material coheres to the separator.

5. The secondary battery according to claim 1, further comprising:
a laminated electrode body storage member,
wherein the laminated electrode body is wounded, and stored in the laminated electrode body storage member.

6. The secondary battery according to claim 5,
wherein an outer shape of the laminated electrode body storage member is a cylindrical shape or a square shape.

7. The secondary battery according to claim 1, wherein the negative electrode member includes a negative electrode active material layer formed on a negative electrode current collector,
in the laminated electrode body, the positive electrode member and the negative electrode member are laminated through the separator,
the laminated electrode body further includes a negative electrode lead portion attached to the negative electrode current collector, and a laminated electrode body storage member,
the laminated electrode body is wounded, and stored in the laminated electrode body storage member, and
the positive electrode lead portion is attached to a portion of the positive electrode current collector positioned by being separated from an end portion of the positive electrode member.

8. A secondary battery, comprising:
a laminated electrode body including a positive electrode member, a negative electrode member, a separator provided between the positive electrode member and the negative electrode member, a negative electrode lead portion, and a suppressing member being configured to suppress a movement of the separator, wherein the negative electrode member includes a negative electrode active material layer formed on a negative electrode current collector, the negative electrode lead portion attached to the negative electrode current collector, the suppressing member is disposed between the negative electrode lead portion and the separator, between a first portion of the negative electrode current collector positioned in vicinity of the negative electrode lead portion and the separator, and between a second portion of the negative electrode active material layer adjacent to the first portion and the separator, respectively.

9. The secondary battery according to claim 8, wherein the positive electrode member includes a positive electrode active material layer formed on a positive electrode current collector, in the laminated electrode body, the positive electrode member and the negative electrode member are laminated through the separator, the laminated electrode body further includes a positive electrode lead portion attached to the positive electrode current collector, and a laminated electrode body storage member, the laminated electrode body is wounded, and stored in the laminated electrode body storage member, an end portion of the laminated electrode body includes an end portion of the negative electrode current collector, and when a direction separated from the end portion of the laminated electrode body is set to an inside direction:
an end portion of the negative electrode active material layer is disposed by being separated from the end portion of the negative electrode current collector in the inside direction;
an end portion of the positive electrode active material layer and an end portion of the positive electrode current collector are disposed by being separated from the end portion of the negative electrode active material layer in the inside direction; and
the negative electrode lead portion is attached in vicinity of the end portion of the negative electrode current collector.

10. The secondary battery according to claim 8, wherein the suppressing member includes a tape-like base material, and an adhesive layer disposed on one surface of the base material.

11. The secondary battery according to claim 10, further comprising:
an electrolytic solution,
wherein an other surface of the base material exhibits adhesiveness by being in contact with the electrolytic solution, and the other surface of the base material adheres to the separator.

12. The secondary battery according to claim 10, further comprising:
an electrolytic solution,
wherein an other surface of the base material swells by being in contact with the electrolytic solution, and the other surface of the base material coheres to the separator.

13. The secondary battery according to claim 8, further comprising:
a laminated electrode body storage member,
wherein the laminated electrode body is wounded, and stored in the laminated electrode body storage member.

14. The secondary battery according to claim 13, wherein an outer shape of the laminated electrode body storage member is a cylindrical shape or a square shape.

15. A secondary battery, comprising:
a laminated electrode body including a positive electrode member, a negative electrode member, a separator provided between the positive electrode member and the negative electrode member, a positive electrode lead portion, a negative electrode lead portion, a first suppressing member, and a second suppressing member, wherein
the first suppressing member and the second suppressing member are configured to suppress a movement of the separator,
the positive electrode member includes a positive electrode active material layer formed on a positive electrode current collector,
the negative electrode member includes a negative electrode active material layer formed on a negative electrode current collector,
the positive electrode lead portion is attached to the positive electrode current collector,
the negative electrode lead portion is attached to the negative electrode current collector,
the first suppressing member is disposed between the positive electrode lead portion and the separator, between a first portion of the positive electrode current collector positioned in vicinity of the positive electrode lead portion and the separator, and between a second portion of the positive electrode active material layer adjacent to the first portion and the separator, respectively, and
the second suppressing member is disposed between the negative electrode lead portion and the separator, between a third portion of the negative electrode current collector positioned in vicinity of the negative electrode lead portion and the separator, and between a fourth portion of the negative electrode active material layer adjacent to the third portion and the separator, respectively.

* * * * *